(12) United States Patent
Honda et al.

(10) Patent No.: US 6,710,997 B2
(45) Date of Patent: Mar. 23, 2004

(54) LAYERED PRODUCT AND CAPACITOR

(75) Inventors: Kazuyoshi Honda, Takatsuki (JP); Noriyasu Echigo, Kobe (JP); Masaru Odagiri, Kawanishi (JP); Nobuki Sunagare, Matsue (JP); Shinichi Suzawa, Nita-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/138,227

(22) Filed: May 1, 2002

(65) Prior Publication Data

US 2002/0159219 A1 Oct. 31, 2002

Related U.S. Application Data

(62) Division of application No. 09/554,582, filed as application No. PCT/JP98/05155 on Nov. 16, 1998, now Pat. No. 6,388,865.

(30) Foreign Application Priority Data

Nov. 18, 1997 (JP) .............................. 9/317414
Nov. 18, 1997 (JP) .............................. 9/317415

(51) Int. Cl.$^7$ .......................... H01G 4/06; H01G 4/228; H01G 4/30
(52) U.S. Cl. ..................... 361/311; 361/309; 361/301.4
(58) Field of Search .......................... 361/301.1, 301.2, 361/301.4, 303–304, 306.1–306.3, 307, 308.1–308.2, 309, 311–313, 323–325, 328

(56) References Cited

U.S. PATENT DOCUMENTS

| | | | |
|---|---|---|---|
| 4,959,748 A | 9/1990 | Kimura et al. |
| 5,043,843 A | 8/1991 | Kimura et al. |
| 5,168,421 A | 12/1992 | Suzuki et al. |
| 5,440,446 A | 8/1995 | Shaw et al. |
| 5,540,974 A | 7/1996 | Hoseki et al. |
| 6,184,324 B1 | 2/2001 | Benz et al. |

FOREIGN PATENT DOCUMENTS

| | | |
|---|---|---|
| JP | 61-183913 | 8/1986 |
| JP | 64-77913 | 3/1989 |
| JP | 2-98912 | 4/1990 |
| JP | 3-201421 | 3/1991 |
| JP | 3-241806 | 10/1991 |
| JP | 4-53217 | 2/1992 |
| JP | 5-267091 | 10/1993 |

*Primary Examiner*—Dean A. Reichard
*Assistant Examiner*—Eric Thomas
(74) *Attorney, Agent, or Firm*—Merchant & Gould, P.C.

(57) ABSTRACT

A layered product including a plurality of deposition units, each having a thin resin layer and a thin metal layer wherein the surface roughness of the thin resin layer is 0.1 μm or below, a protrusion forming component is not added to the thin resin layer or the surface roughness of the thin metal layer is 0.1 μm or below. The surface characteristics are improved regardless of the thickness of the layered product and the requirement of high performance thin film can be satisfied because the layered product contains no foreign matter. The layered product is suitably applicable to electronic parts, e.g., a capacitor, especially a chip capacitor.

28 Claims, 38 Drawing Sheets

LAYERED PRODUCT AND CAPACITOR

"This application is a divisional of application Ser. No. 09/554,582, filed May 16, 2000, now U.S. Pat. No. 6,388,865, which is a 371 of PCT/JP98/05155 filed Nov. 16, 1998, which application(s) are incorporated herein by reference."

TECHNICAL FIELD

A first aspect of the present inventions relates to a layered product formed by depositing a plurality of deposition units, each of which includes a resin thin film layer and a metal thin film layer.

A second aspect of the present inventions relates to a layered product including dielectric layers and metal thin films, in particular, a layered product suitably used for an electronic component such as a capacitor.

BACKGROUND ART

Regarding the First Invention

A layered product comprising resin thin film layers and metal thin film layers are used in a wide range of applications, for example, as a magnetic recording medium such as a magnetic tape, a wrapping material or an electronic component.

The resin thin film layers used in such a layered product are manufactured by melting and stretching a resin material into a self-supported film or by applying a solution of a resin material diluted with a solvent to a supporting base and drying the resin for curing. However, the resin thin film layers obtained by the former method are provided with slight roughness on a surface of the film for a small coefficient of friction by allowing a protrusion forming component (e.g., externally added particles) to be contained in the film in order to provide the film with the conveyance properties. Moreover, the former method tends to require large scale equipment to manufacture the resin thin film layers. On the other hand, the resin thin film layers obtained by the latter method may have large protrusions on the surfaces thereof caused by defects generated in the coating film after drying. Moreover, some solvent may cause environmental problems. Furthermore, the smallest thickness of the resin thin film obtained by the above methods is only 1 $\mu$m, and neither of the above methods can produce thinner thin films stably.

To obtain thin resin layers stably, a method of forming a resin thin film on a supporting base in a vacuum has been proposed. In this method, a resin thin film is evaporated in a vacuum and adhered to a supporting base to produce thin films. It is said that this method allows resin thin films to be formed with relatively small equipment that less adversely affects the environment.

On the other hand, for formation of metal thin film layers, a method of vacuum evaporation on a surface of a base that is moving at high speed is advantageous for mass production and is put in industrially practical use. The thickness of the metal thin film layer produced by this method is very thin, so that the shape of the surface of the base is reflected exactly on the surface of the metal thin film.

The recent needs for a layered product including resin thin film layers and metal thin films are directed to further degrees of compactness and high performance. Therefore, the tendency of forming thinner resin thin films and metal thin films and eliminating factors causing instability such as abnormal protrusions or foreign substances is increasingly strengthened.

However, the layered product obtained by forming a metal thin film layer, for example by evaporation, on a resin thin film layer obtained by melting and stretching a resin material, or applying a solution of a resin material diluted with a solvent to a supporting base and drying for curing have the following disadvantages. The resin thin films cannot have a small thickness, and may contain foreign substances or have protrusions inhibiting various characteristics on the surface thereof. Thus, a layered product that can satisfy the need for thinness and high performance has not been obtained.

Furthermore, a layered product comprising metal thin film layers formed, for example by evaporation on resin thin film layers formed on a supporting base in a vacuum can have a small thickness. However, the surface characteristics are not sufficient so that various characteristics are not stable. Thus, this layered product cannot satisfy the characteristics strictly required by the current need.

Regarding the Second Invention

The current need for compactness and high performance of electronic components is increasingly strengthened, and this is the case for capacitors as well. The capacitance of the capacitor is in proportion to the area of the dielectric and in inverse proportion to the square of the thickness of the dielectric layer when the dielectric constant of the dielectric is the same. Therefore, in order to achieve a compact capacitor and maintain or increase the capacitance thereof, it is effective to make the dielectric layer thin and increase an effective area of a region where capacitance is generated.

One known example of a layered product comprising dielectric layers and metal thin film layers used for electronic components such as capacitors is a layered product for a film capacitor. This layered product is formed by layering or winding a metallized film obtained by depositing a metal thin film such as aluminum on a resin film such as polyester (e.g., PEN, PET), polyolefin (e.g., PP) or PPS by vacuum evaporation, sputtering or the like.

However, there is a limit for the thickness of the resin film due to various constraints such as handling properties or processability of the film during or after production. The thickness of currently used film capacitors can be as small as about 1.2 $\mu$m. Therefore, in order to increase the capacitance of the capacitors further, it is necessary to increase the effective area of the capacitance generation portion, namely, increase the number of times of layering or winding. However, this contradicts the requirement for compactness of the capacitor. In other words, for film capacitors, the achievement of high levels of both compactness and large capacitance has reached the limit at the moment.

On the other hand, a layered product for a capacitor comprising a dielectric layer and a metal thin film layer produced by a method totally different from that for the conventional film capacitor, which allows the thickness of a dielectric layer to be about 1 $\mu$m, has been proposed (U.S. Pat. No. 5,125,138). The layered product has the same layered structure where dielectric resin layers and metal thin film layers are deposited sequentially as the conventional layered product for layered type film capacitors. However, the layered product has about 1000 depositions or more and has a thickness on the order of several mm.

However, the examination by the inventors of the present invention revealed that various problems arise in production of a capacitor with such a layered product in the same manner as with the conventional layered product for layered type film capacitors.

For example, when thermal load or external pressure is applied to the layered product in a pressurizing and heating press process during production of the layered product or a process for mounting a capacitor formed of the layered product on a printed circuit board or the like, the layered product is damaged easily. Furthermore, in order to use the layered product as a capacitor, it is necessary to form external electrodes on the sides of the layered product. Conventionally, for the layered type film capacitors, the external electrodes are formed by metal spraying. When this technique is applied to the above-described layered product, the adhesion strength between the metal thin films and the external electrodes is poor so that failure of electrical connection or falling of the external electrodes may occur.

It has turned out that these problems become more serious when the thickness of the dielectric layer is made even smaller to the extent that cannot be achieved for the conventional film capacitor. These problems cannot be avoided to achieve compactness and high capacitance of a capacitor with the above-described layered product.

DISCLOSURE OF INVENTION

Regarding the First Invention

It is an object of the first invention to provide a layered product formed by depositing a plurality of deposition units each of which includes a resin thin film layer and a metal thin film layer that has good surface properties and contains no foreign substance, regardless the deposition thickness, and that therefore can satisfy the current need for a high performance thin film.

In order to achieve the above object, the first invention has the following embodiments.

A layered product according to a first embodiment of the first present invention includes a plurality of deposition units, each of which includes a resin thin film layer and a metal thin film layer. The surface roughness of the resin thin film layer is not more than 0.1 $\mu$m.

A layered product according to a second embodiment of the first present invention includes a plurality of deposition units, each of which includes a resin thin film layer and a metal thin film layer. The resin thin film layer contains no protrusion forming component.

A layered product according to a third embodiment of the first present invention includes a plurality of deposition units, each of which includes a resin thin film layer and a metal thin film layer. The surface roughness of the metal thin film layer is not more than 0.1 $\mu$m.

The layered product according to the first present invention includes a plurality of deposition units, each of which includes a resin thin film layer and a metal thin film layer, and the surface roughness of the resin thin film layer is not more than 0.1 $\mu$m, the resin thin film layer contains no protrusion forming component, or the surface roughness of the metal thin film layer is not more than 0.1 $\mu$m. Therefore, the layered product of the first present invention has good surface properties and contains no foreign substance therein, regardless of the deposition thickness. Thus, the requirement for a higher performance thin layered product can be met sufficiently.

Regarding the Second Invention

It is an object of the second invention to provide a layered product that has strong resistance against thermal load and external pressure and has high adhesion strength with external electrodes formed thereon and that can achieve high levels of compactness and high capacitance when it is used as a capacitor, and to provide a capacitor using such a layered product.

In order to achieve the above object, the second invention has the following embodiments.

A layered product according to a first embodiment of the second present invention includes an element layer, reinforcement layers deposited on both sides of the element layer, and protective layers deposited further on both sides of the reinforcement layers. The element layer satisfies A or B below, and the reinforcement layer satisfies C or D below:

A: A plurality of deposition units, each of which comprises a dielectric layer, a first metal thin film layer and a second metal thin film layer that are deposited on one surface of the dielectric layer and separated by a belt-shaped electrically insulating portion, are deposited in such a manner that the electrically insulating portions of adjacent deposition units are deposited in different positions;

B: A plurality of deposition units, each of which comprises a dielectric layer and a metal thin film layer that is deposited on one surface of the dielectric layer and in a portion except a belt-shaped electrically insulating portion on one end of the surface of the dielectric layer, are deposited in such a manner that the electrically insulating portions of adjacent deposition units are positioned in opposite sides;

C: comprising a deposition unit that comprises a resin layer, a first metal layer and a second metal layer that are deposited on one surface of the resin layer and separated by a belt-shaped electrically insulating band; and D: comprising a deposition unit that comprises a resin layer and a metal layer that is deposited on one surface of the resin layer and in a portion except a belt-shaped electrically insulating band on one end of the surface of the resin layer.

A layered product according to a second embodiment of the second present invention includes an element layer and reinforcement layers deposited on both sides of the element layer. The element layer satisfies A or B below, the reinforcement layer satisfies C or D below, and further at least one of E or F is satisfied:

A: A plurality of deposition units, each of which comprises a dielectric layer, a first metal thin film layer and a second metal thin film layer that are deposited on one surface of the dielectric layer and separated by a belt-shaped electrically insulating portion, are deposited in such a manner that the electrically insulating portions of adjacent deposition units are deposited in different positions;

B: A plurality of deposition units, each of which comprises a dielectric layer and a metal thin film layer that is deposited on one surface of the dielectric layer and in a portion except a belt-shaped electrically insulating portion on one end of the surface of the dielectric layer, are deposited in such a manner that the electrically insulating portions of adjacent deposition units are positioned in opposite sides;

C: comprising a deposition unit that comprises a resin layer, a first metal layer and a second metal layer that are deposited on one surface of the resin layer and separated by a belt-shaped electrically insulating band;

D: comprising a deposition unit that comprises a resin layer and a metal layer that is deposited on one surface of the resin layer and in a portion except a belt-shaped electrically insulating band on one end of the surface of the resin layer;

E: The thickness of the dielectric layer is different from that of the resin layer; and F: The thickness of the metal thin film layer is different from that of the metal layer.

Furthermore, a capacitor of the present invention is produced using any one of the above-described layered products.

With such embodiments, the layered product of the second present invention has strong resistance against thermal load or external pressure, and has high adhesion strength with external electrodes when they are formed therein. In the case where it is used as a capacitor, high levels of compactness and high capacitance can be achieved.

BEST MODE FOR CARRYING OUT THE INVENTION

Regarding the First Invention

Figure 1:
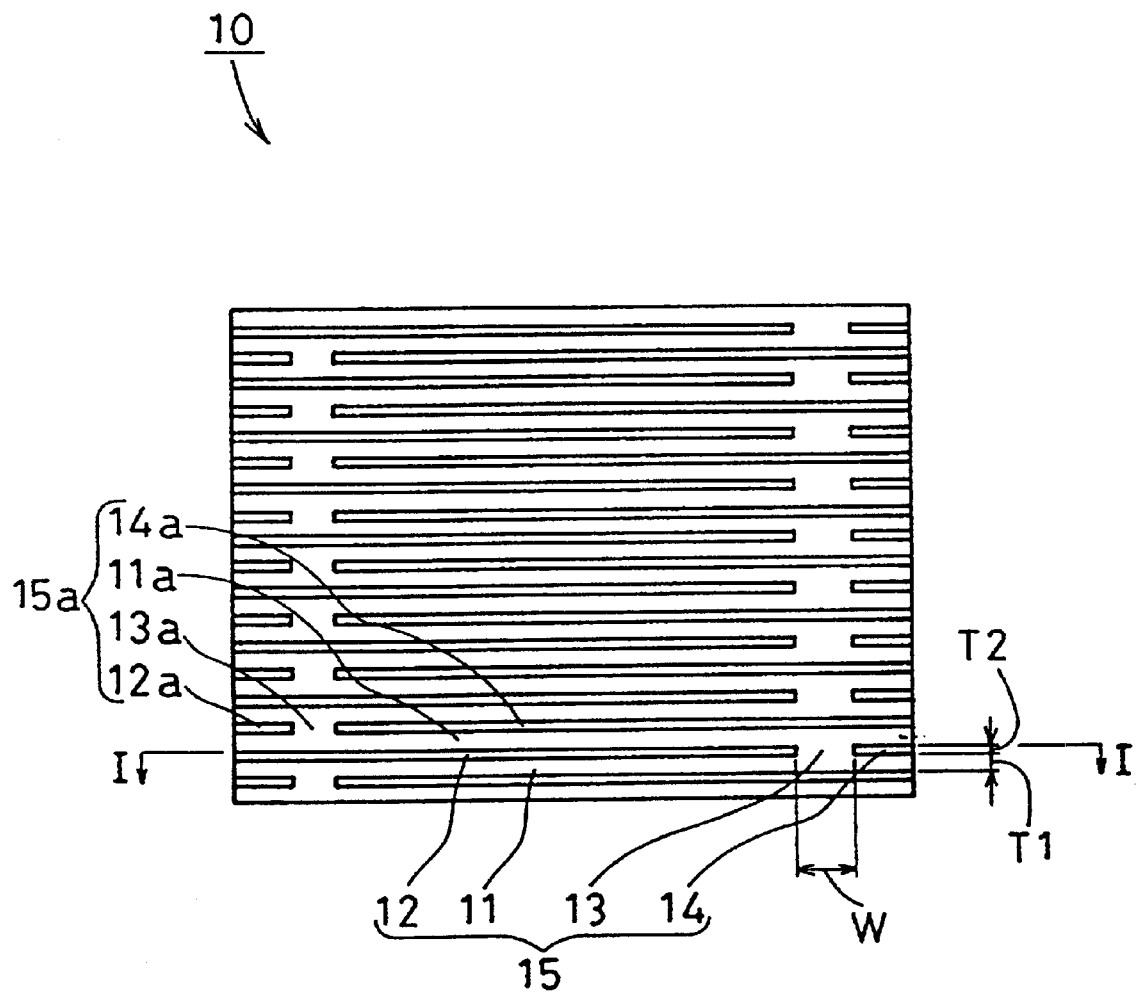
FIG. 1 is a cross-sectional view taken in the thickness direction (deposition direction) schematically illustrating an example of a layered product of the first invention.

The layered product of the first invention is formed by depositing a plurality of deposition units, each of which includes a resin thin film layer and a metal thin film layer. The layered product formed by depositing a plurality of deposition units is used in a wide range of applications such as magnetic recording materials, wrapping materials, electronic component materials or the like, and small deposition thickness and stability of the characteristics are significantly required. In the deposition unit, a resin thin film layer and a metal thin film layer may be deposited successively, or another layer can be interposed therebetween. Other layers can be deposited on and below or between the layered product(s) of the present invention.

The surface roughness of the resin thin film layer of the layered product of the present invention is required to be 0.1 $\mu$m or less, preferably 0.04 $\mu$m or less, and most preferably 0.02 $\mu$m or less. The surface roughness of the metal thin film layer of the layered product of the present invention is required be 0.1 $\mu$m or less, preferably 0.04 $\mu$m or less, most preferably 0.02 $\mu$m or less. If the surface roughness is larger than these ranges, no improvement of characteristics of the resultant layered product can be achieved for various applications, and its characteristics become unstable. For example, when applied to a magnetic recording medium, high-density recording becomes difficult, large surface protrusions cause dropout, and the reliability of the recording decreases. When applied to electronic components, high-density integration becomes difficult, an electric field is concentrated on large surface protrusions, and the resin thin film may be leached or the metal thin film may be burnt.

Furthermore, the surface roughness of the resin thin film layer is preferably $1/10$ or less, more preferably $1/25$ or less, and most preferably $1/50$ or less of the thickness of the resin thin film layer. If the surface roughness of the resin thin film layer is too large relative to the thickness of the resin thin film layer, the concentration of an electric field or magnetic field and/or failure of smoothing of adjacent metal thin film layers occur. Furthermore, the surface roughness of the metal thin film layer is preferably $1/10$ or less, more preferably $1/25$ or less, and most preferably $1/50$ or less of the thickness of the resin thin film layer or the thickness of the metal thin film layer. If the surface roughness of the metal thin film layer is too large relative to the thickness of the resin thin film layer or the thickness of the metal thin film layer, the concentration of an electric field or magnetic field, failure of smoothing of adjacent resin thin film layers, and/or the concentration of current occur.

In this specification, surface roughness refers to the ten point average roughness Ra, measured with a contact-type surface meter having a diamond needle of 10 $\mu$m tip diameter and a 10 mg measuring load. To measure the surface roughness of a resin thin film layer, the needle is contacted directly with the surface of the resin thin film layer, and to measure the surface roughness of a metal thin film layer, the needle is contacted directly with the surface of the metal thin film layer. The measurement is required to be performed while eliminating the influence of all other layered portions (for example, steps due to the presence of the electrically insulating portion and the electrically insulating band, which will be described later).

The resin thin film layer of the layered product of the present invention should not include a protrusion forming component. Herein, a protrusion forming component refers to a component that is added to a matrix resin or a component that is synthesized in a matrix resin and that has an ability to form irregularities on the surface of the resin thin film layer. The protrusion forming component may be organic or inorganic. Examples thereof include inorganic particles, organic particles, a resin incompatible to the matrix resin, and a byproduct during synthesis of a matrix polymer. The presence of such a component prevents the intended characteristics from being obtained and causes instability of the characteristics. For example, when applied to optical recording, the optical characteristics are unstable. When applied to electronic components, the dielectric constant is varied. Furthermore, such a component forms various kinds of irregularities on the surfaces of the resin thin film layer and the metal thin film layer, so that the surface roughness becomes large and the above-described problems are caused.

There is no particular limitation regarding the thickness of the resin thin film layer, and the thickness can be determined suitably by the use to which the layered product is applied. However, the thickness is preferably 1 $\mu$m or less, more preferably 0.7 $\mu$m or less, and most preferably 0.4 $\mu$m or less. A thinner resin thin film layer can fulfill the requirement for compactness of the layered product. For example, when the layered product is used as a capacitor, as the thickness of the resin thin film layer that serves as the dielectric layer is smaller, the capacitance of the capacitor increases and the capacitor can be compact at the same time. Furthermore, since the layered product of the present invention has good surface characteristics even if the resin thin film layer is thin, the above-described problems are not caused.

There is no particular limitation regarding the thickness of the metal thin film layer, and the thickness can be determined suitably by the use to which the layered product is applied. However, the thickness is preferably 100 nm or less, more preferably 50 nm or less, and most preferably 10–40 nm. Furthermore, the film resistance is preferably $2\Omega/\square$ or more, more preferably $3\Omega/\square$ or more, and most preferably $3–10\Omega/\square$. When the metal thin film layer is thicker than the above ranges, or the film resistance is smaller than the above ranges, the thickness of the layered product is too large to achieve a compact product or the characteristics such as high frequency characteristics deteriorate. When the metal thin film layer is thinner than the above ranges, or the film resistance is larger than the above ranges, resistance against humidity deteriorates or an allowable current value may be insufficient.

There is no particular limitation regarding the ratio of the thickness of the resin thin film layer to the thickness of the metal thin film layer, and the ratio can be determined suitably by the use to which the layered product is applied. However, when the layer is used as a capacitor, the ratio is preferably 20 or less, and more preferably 15 or less. When the ratio is in these ranges, in the case where a pin-hole in the resin thin film layer serving as the dielectric layer causes the opposing metal thin film layer to be electrically short-circuited, the metal thin film layer is burnt or leached by overcurrent. Thus, a self-healing function of removing a defect is effected well.

The curing degree of the resin thin film layer is preferably 50–95%, more preferably 70–90% in terms of the handling properties and the stability of the characteristics of the layered product. The curing degree means the extent of polymerization and/or crosslinking of the resin thin film layer. If the curing degree is smaller than these ranges, the following problems are caused. The layered product can be deformed easily or the metal thin film layer is ruptured or short-circuited, for example by an external pressure applied in a pressing step during production of the layered product or in various applications of the layered product such as a process for mounting the layered product as an electronic component in a circuit board. On the other hand, if the curing degree is larger than these ranges, problems such as cracking may arise in the case where a cylindrical continuous layered product is removed from a can roller in the production process of the layered product which will be described later, in the case where a flat layered base element is obtained by pressing, or in the case where an external pressure is applied in various applications of the layered product. In the case where external electrodes are formed in the layered product for an application as an electronic component (see FIG. 11), sprayed metal particles hardly penetrate between the metal thin film layers during the formation of the external electrodes so that the adhesion strength of the external electrodes becomes weak. To determine the curing degree of the present invention, the ratio of the absorbance of the C=O groups and the C=C groups (1600 $cm^{-1}$) is determined with an infrared spectrophotometer, the ratio of each monomer and the cured product is determined, and the curing degree is defined as 1 minus the reduced absorption ratio.

Possible materials for the metal thin film layer include aluminum, copper, zinc, nickel, their compounds, their oxides, and the oxides of their compounds. Of these, aluminum is preferable, because of its adhesiveness and low cost. The metal thin film layer also can include a trace amount of other components in addition to these as the main component.

In the present invention, a resin thin film material can be any material as long as it can be deposited in a thickness of about 1 $\mu$m or less and the required characteristics for various applications of the layered product can be satisfied. For example, for the resin thin film layer of the layered product to be used as an electronic component, a material comprising an acrylate resin or a vinyl resin as a main component is preferable. More specifically, a polymer of polyfunctional (meth)acrylate monomer or polyfunctional vinyl ether monomer is preferable. In particular, a polymer of dicyclopentadiene dimethanol diacrylate, cyclohexane dimethanol divinyl ether monomer or a polymer of monomer with substituted hydrocarbon groups is preferable because of their electrical properties.

Figure 2:
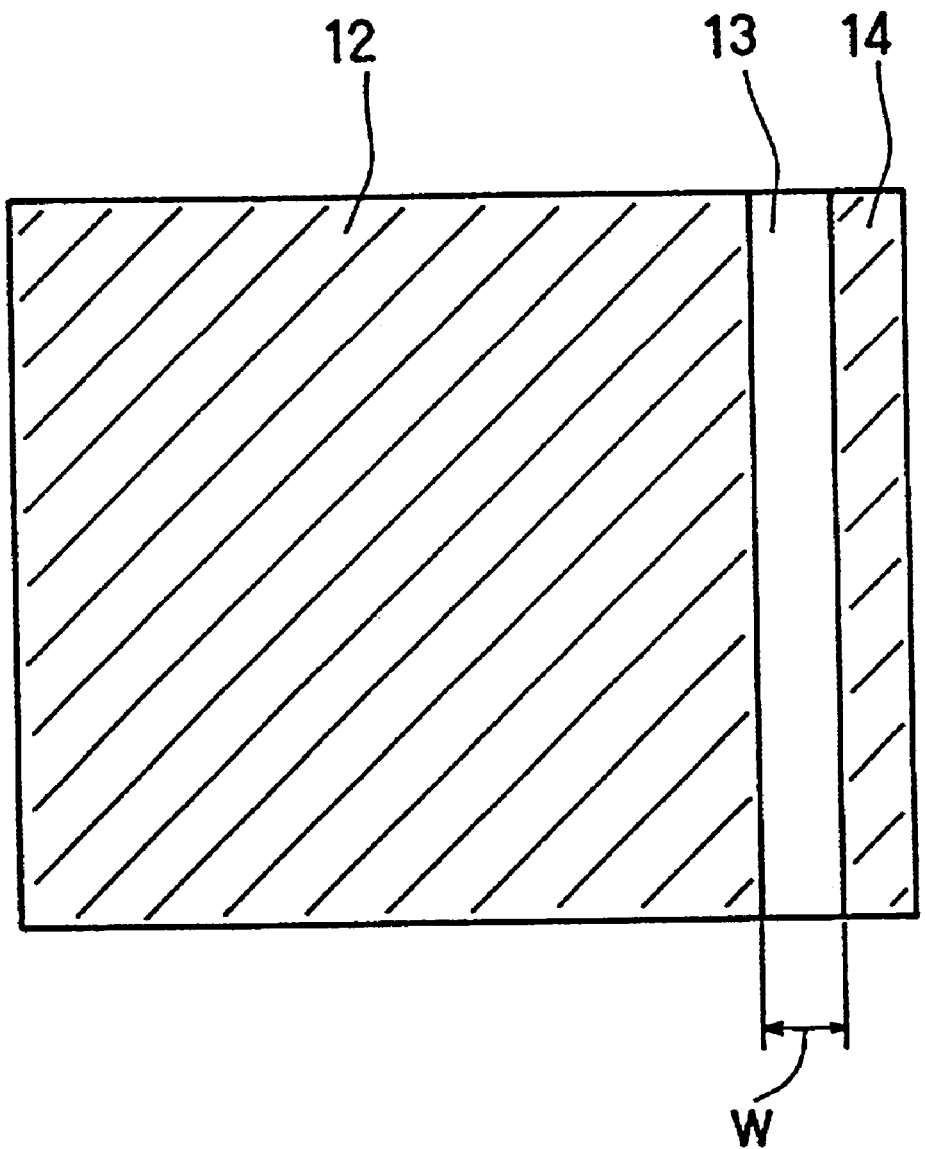
FIG. 2 is a cross-sectional view taken in the arrow direction of line I—I in FIG. 1.

The layered product of the present invention includes a resin thin film layer and a metal thin film layer. The metal thin film layer deposited on the resin thin film is not necessarily continuous but may be divided into several portions. FIG. 1 is a cross-sectional view taken in the thickness direction illustrating an example of such a layered product. FIG. 2 is a cross-sectional view taken in the arrow direction of line I—I in FIG. 1. The metal thin film layer deposited on a resin thin film layer 11 is divided by a belt-shaped electrically insulating portion 13 into a first metal thin film layer 12 and a second metal thin film layer 14. The number of the electrically insulating portions on the resin thin film layer is not limited to one and may be plural, and the metal thin film layer can be divided into three or more. Thus, when the metal thin film layer is divided into a plurality of portions, for example, each metal thin film layer can be used as an electrode having a different electric potential from each other when the layered product is applied to an electronic component.

For example, as shown in FIG. 1, the electrically insulating portion on the resin thin film layer is single, and the electrically insulating portion divides the metal thin film layer into two and is positioned so that the electrically insulating portions of adjacent deposition units are deposited in different positions. In other words, as shown in FIG. 1, in the case where a deposition unit 15 of a layered product 10 is deposited adjacent to a deposition unit 15a, the electrically insulating portion 13 of the deposition unit 15 is provided in a different deposition position from that of an electrically insulating portion 13a of the deposition unit 15a. Thus, the deposition units having the electrically insulating portions deposited in different positions are deposited sequentially. In this case, a capacitor can be formed by forming external electrodes on the side portions of the layered product (see FIG. 11). In other words, an external electrode (not shown) for connecting the first metal thin film layer 12 of the deposition unit 15 and the first metal thin film layer 12a of the deposition unit 15a adjacent thereto in substantially the same electric potential is provided, and external electrode (not shown) for connecting the second metal thin film layer 14 of the deposition unit 15 and the second metal thin film layer 14a of the deposition unit 15a in substantially the same electric potential is provided, and an electrical potential difference is provided between the external electrodes. In this case, when the electrically insulating portions 13 and 13a of the deposition unit 15 and the deposition unit 15a adjacent thereto are provided in different positions, a capacitor having the following electrodes and dielectric (a portion where capacitance is generated) is formed: The first metal thin film layer 12 of the deposition unit 15 and the second metal thin film layer 14a of the deposition unit 15a serve as the electrodes. A portion of the resin thin film layer 11a that is sandwiched by the first metal thin film layer 12 and the second metal thin film layer 14a serves as the dielectric. Therefore, the phrase "the electrically insulating portions of the adjacent deposition units are provided in different deposition positions" means that the deposition positions are different to the extent that the capacitance generation portion of a capacitor can be formed, as described above. In such a view, it is preferable to provide the electrically insulating portions so that the area of the capacitance generation portion becomes as large as possible.

Portions other than the portion of the resin thin film layer 11a that is sandwiched by the first metal thin film layer 12 and the second metal thin film layer 14a make no contribution to the formation of the capacitance of the capacitor. At the same time, the second metal thin film layer 14 of the deposition unit 15 and the first metal thin film layer 12a of the deposition unit 15a do not function as electrodes of the capacitor. However, the second metal thin film layer 14 of the deposition unit 15 and the first metal thin film layer 12a of the deposition unit 15a are significant in that they improve the adhesion strength of the external electrodes. In other words, the adhesion strength with the external electrodes depends significantly on the connection strength with the metal thin film layers and the connection strength with the resin thin film layers does not significantly contribute to it. Therefore, even if the metal thin film layers do not contribute to the capacitance generation for the capacitor, the presence of these layers can improve the adhesion strength of the external electrodes when the capacitor is formed. The presence of such metal thin film layers is very significant especially in the case of a compact layered product. The external electrodes are formed by metal spraying or the like, and sprayed metal particles have a relatively large size. When the resin thin film layer is extremely thin, the sprayed metal particles hardly penetrate between the metal thin film layers. Moreover, since the layered product is small, an exposed metal thin film layer portion is small. Therefore, it is significantly important to make a contact area with the external electrodes as large as possible in order to ensure the adhesion strength of the external electrodes.

The electrically insulating portion has a belt-shape having a constant width W for ease of the production. The width W of the electrically insulating portion is not limited to a particular value, but preferably about 0.03–0.5 mm, more preferably about 0.05–0.4 mm, and most preferably about 0.1–0.3 mm when applied to a capacitor. If the width is larger than these ranges, the area of the capacitance generation portion as the capacitor becomes small, so that high capacitance is not realized. On the other hand, when the width is smaller than these ranges, the electrical insulation cannot be obtained, or the electrically insulating portion having a narrow width cannot be produced precisely.

Figure 3:
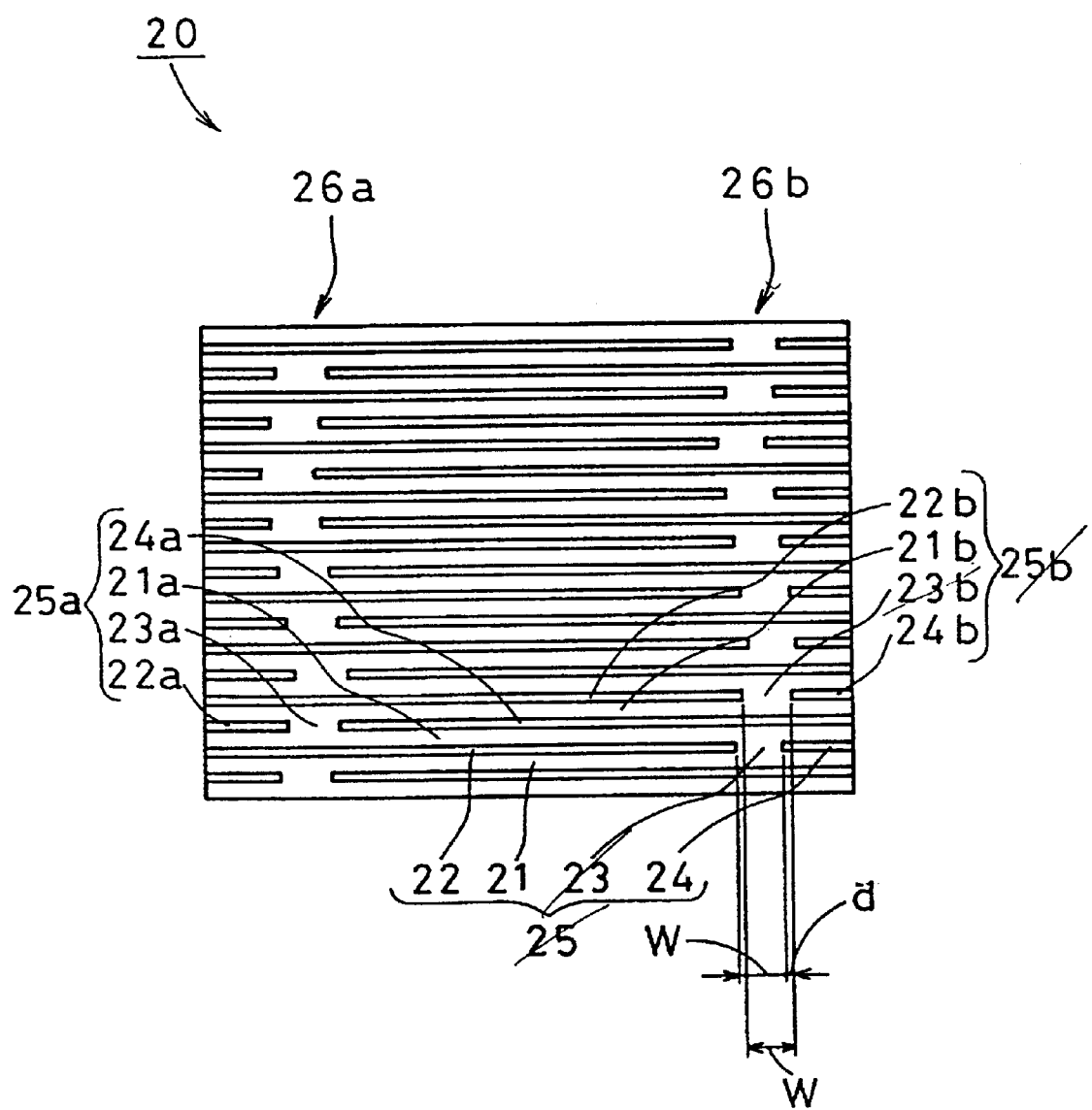
FIG. 3 is a cross-sectional view taken in the thickness direction (deposition direction) schematically illustrating another example of a layered product of the first invention.

It is preferable that the deposition positions of the electrically insulating portions are not the same position over the layered product. As shown in FIG. 1, in the case where the electrically insulating portions of the adjacent deposition units are provided in different positions and the electrically insulating portions of every other deposition unit are provided substantially in the same position, it is preferable that the electrically insulating portions of every other deposition unit are not provided in the same position over the layered product. FIG. 3 is a cross-sectional view taken in the thickness direction (deposition direction) schematically illustrating an example of an element layer 20 having such a structure. A deposition unit 25 comprises a first metal thin film layer 22, a second metal thin film layer 24, an electrically insulating portion 23 and a resin layer 21. A second deposition unit 25a comprises a first metal thin film layer 22a, a second metal thin film layer 24a, an electrically insulating portion 23a and a resin layer 21a. A third deposition unit 25b comprises first metal thin film layer 22b, a second metal thin film layer 24b, an electrically insulating portion 23b and a resin layer 21b. More specifically, with respect to the electrically insulating portion 23 of the deposition unit 25, the position of the electrically insulating portion 23b of the deposition unit 25b, which is one unit apart from the deposition unit 25, is not the same position as that of the electrically insulating portion 23, but is displaced by a distance d in the width direction of the electrically insulating portion. Thus, in the same manner, the position of the electrically insulating portion of the deposition unit that is one unit further apart is displaced by d in either one of the directions in the width direction of the electrically insulating portion. Alternatively, the position of the electrically insulating portion of the deposition unit one unit apart is in the same position, and the position of the electrically insulating portion of the deposition unit three units apart can be displaced in the width direction of the electrically insulating portion.

Such displacement of the position of deposition of the electrically insulating portion can suppress roughness of the upper and lower surfaces of the layered product. In other words, since there is no metal thin film layers in the electrically insulating portion, the thickness of the deposition of this portion is smaller relative to the overall layered product so that a recess is generated in portions 26a and 26b on the upper surface of the layered product. This recess may deteriorate the handling properties when mounting the layered product onto a printed circuit board with a solder. In addition, when such a recess is generated, the larger the depth of the recess is, the more difficult it is to apply a patterning material onto the bottom of the recess as described later in the production process of the layered product. Therefore, it is difficult to form a good electrically insulating portion having a constant width. Moreover, the generation of the recess causes inclination of the resin thin film layer and the metal thin film layer deposited on the recess at both sides of the electrically insulating layer, so that the thickness of the deposition of the resin thin film layer and the metal thin film layer becomes small locally. When the thickness of the deposition of the resin thin film layer becomes small locally, the following problem arises. In the case where the layered product is used as a capacitor, the presence of that portion reduces the withstand voltage of the capacitor and causes a short-circuit due to a pin-hole in the resin thin film layer. Moreover, when the thickness of the deposition of the metal thin film layer becomes small locally, poor conductivity is likely to occur in that portion.

Figure 4:
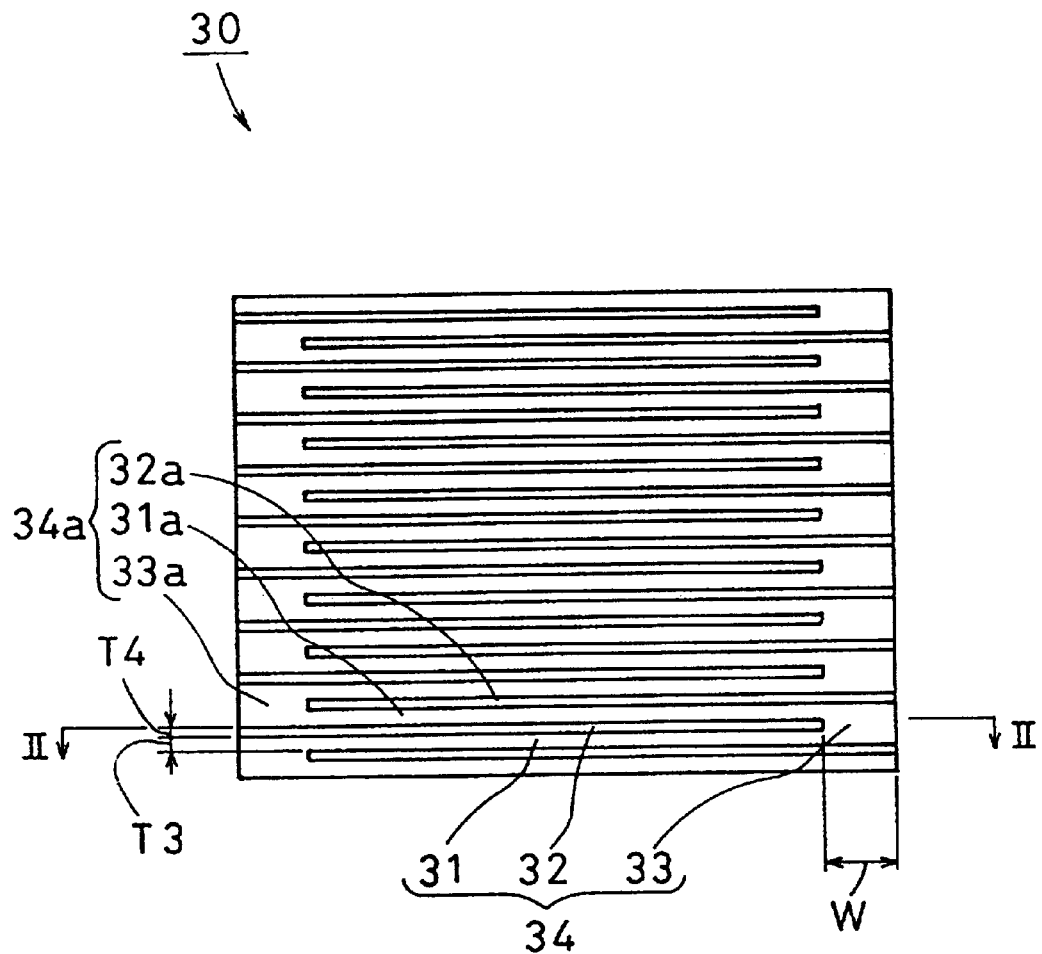
FIG. 4 is a cross-sectional view taken in the thickness direction (deposition direction) schematically illustrating yet another example of a layered product of the first invention.
Figure 5:
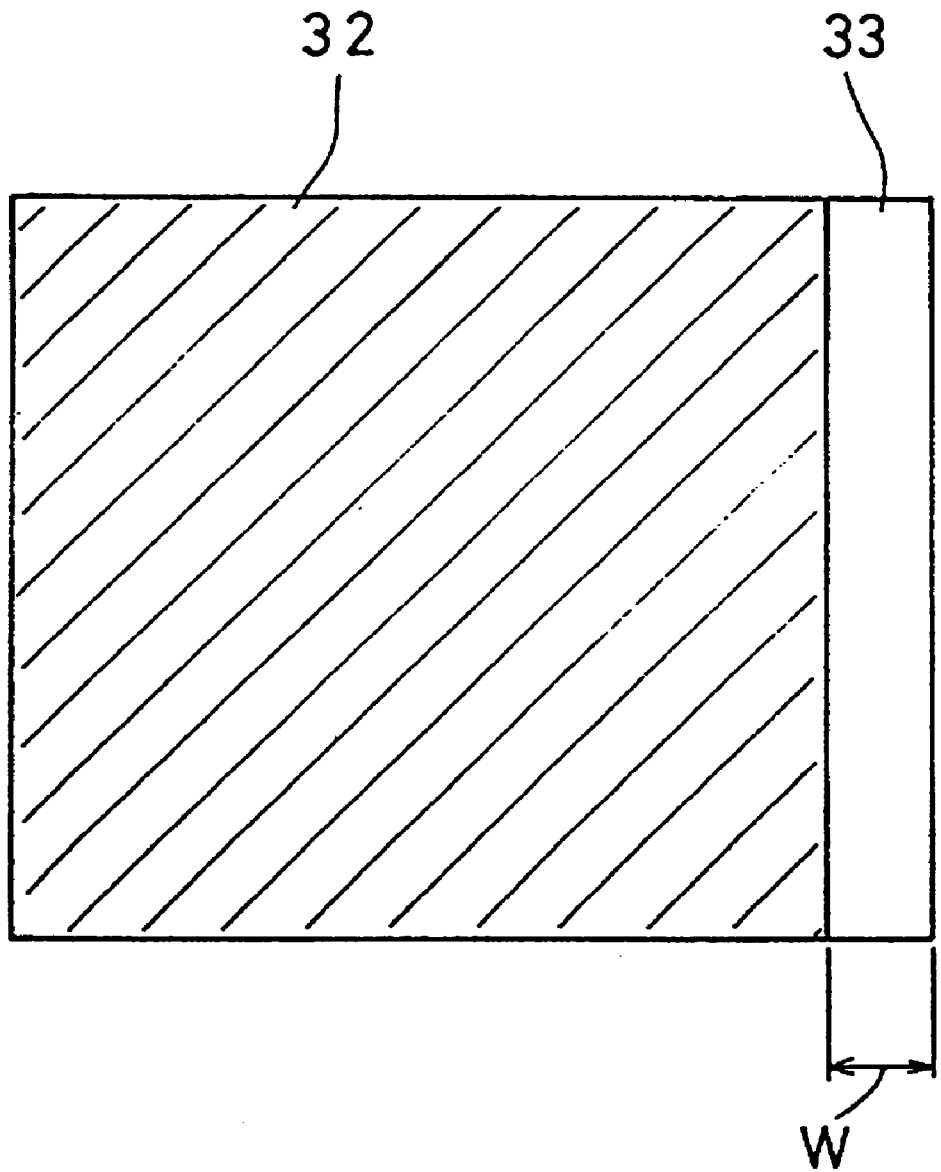
FIG. 5 is a cross-sectional view taken in the arrow direction of line II—II in FIG. 4.

Furthermore, the metal thin film layer of the present invention is not necessarily deposited on the entire surface of the resin thin film layer, and can be deposited on a part thereof. FIG. 4 is a cross-sectional view taken in the thickness direction (deposition direction) schematically illustrating an example of such a layered product 30. FIG. 5 is a cross-sectional view taken along line II—II in FIG. 4 viewed from the arrow direction. A metal thin film layer 32 deposited on a resin thin film layer 31 is deposited in a portion other than a belt-shaped electrically insulating portion 33, which is provided on one end of the resin thin film layer 31. In this manner, the metal thin film layer is not deposited on the entire surface of the resin thin film layer, but the electrically insulating portion is formed on one end of the resin thin film layer. Thus, the metal thin film layer of a different deposition unit can be used as an electrode having a different electrical potential, for example in an application to an electronic component.

For example, deposition is performed in such a manner that the electrically insulating portions of adjacent deposition units are located on the opposite sides. In other words, as shown in FIG. 4, in the case where a deposition unit 34 is deposited adjacent to a deposition unit 34a, deposition is performed in such a manner that when an electrically insulating portion 33 of the deposition unit 34 is provided on the right end of the resin thin film layer 31, an electrically insulating portion 33a of the deposition unit 34a is provided on the left end of a resin thin film layer 31a. In this manner, the deposition units are deposited sequentially in such a manner that the positions of the electrically insulating portions are located on the opposite sides. Thus, when external electrodes are formed on the side portions of the layered product (see FIG. 11), a capacitor can be formed. In other words, one external electrode is connected to the metal thin film layer 32 of the deposition unit 34, and the other external electrode is connected to the metal thin film layer 32a of the adjacent deposition unit 34a, and an electrical potential difference is provided between the opposite external electrodes. The thus formed capacitor has the metal thin film layer 32 of the deposition unit 34 and the metal thin film layer 32a of the deposition unit 34a as the electrodes and a portion sandwiched between the metal thin film layer 32 and the metal thin film layer 32a as the dielectric (capacitance generation portion). From such a viewpoint, it is preferable that the width of the electrically insulating portion is as small as possible so that the area of the capacitance generation portion is as large as possible.

The shape of the electrically insulating portion is a belt-shape having a constant width W for ease of the production. The width W of the electrically insulating portion is not limited to a particular value, but preferably about 0.03 to 0.5 mm, more preferably about 0.05 to 0.4 mm, and most preferably about 0.1 to 0.3 mm to allow high capacitance of the capacitor, to make sure electrical insulation and to facilitate the production.

Figure 6:
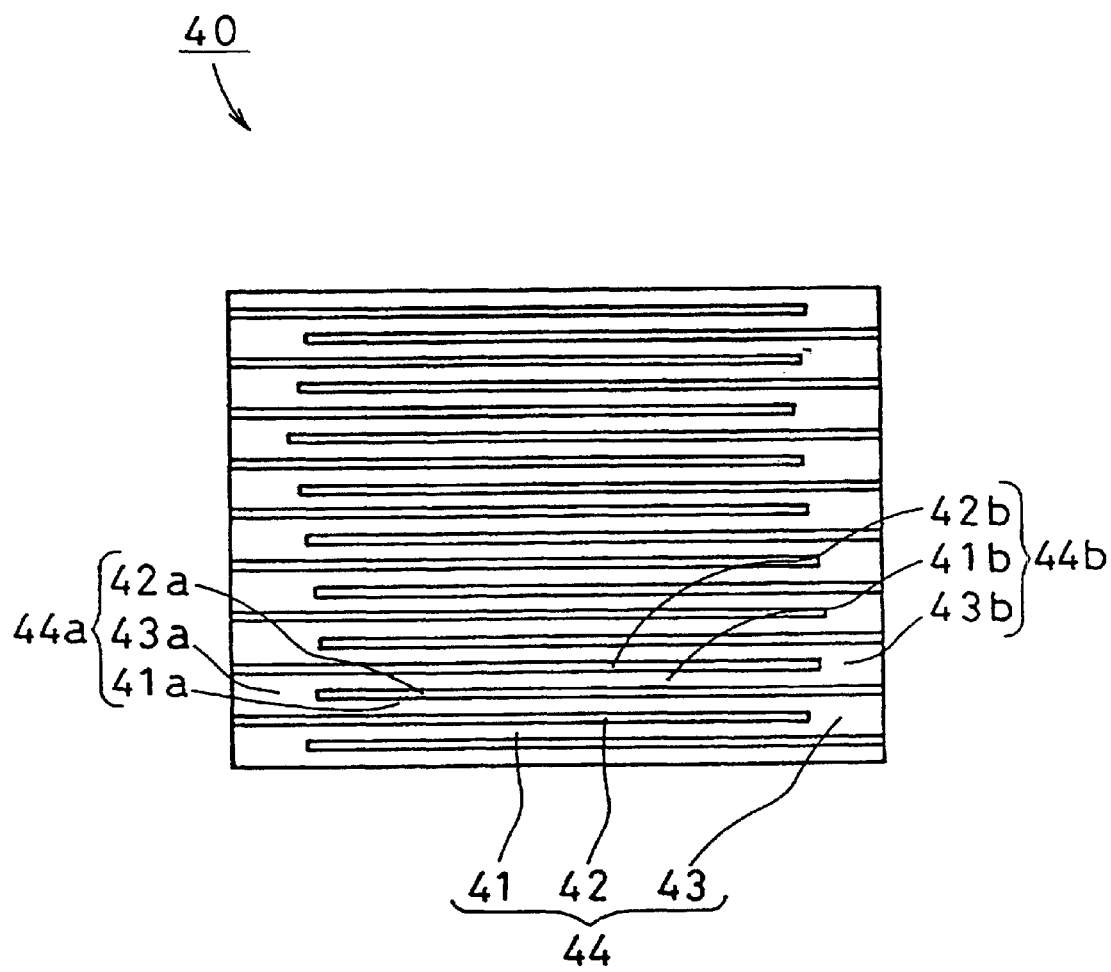
FIG. 6 is a cross-sectional view taken in the thickness direction (deposition direction) schematically illustrating still another example of a layered product of the first invention.

Furthermore, it is preferable that the widths of the electrically insulating portions deposited substantially in the same position are not the same over the layered product. For example, as shown in FIG. 4, in the case where the electrically insulating portions of adjacent deposition units are deposited on the opposite sides, all the widths of the belt-shaped electrically insulating portions of every other deposition unit are not the same over the layered product. FIG. 6 is a cross-sectional view taken in the thickness direction (deposition direction) schematically illustrating an example of a layered product 40 having such a structure. A deposition unit 44 comprises a first metal thin film layer 42 and a resin layer 41. A second deposition unit 44a comprises a first metal thin film layer 42a, an electrically insulating portion 43a and a resin layer 41a. A third deposition unit 44b comprises a first metal thin film layer 42b and a resin layer 41b. More specifically, as shown in FIG. 6, with respect to an electrically insulating portion 43 of the deposition unit 44, the width of an electrically insulating portion 43b of the deposition unit 44b, which is one unit apart from the deposition unit 44, is different from that of the electrically insulating portion 43. Thus, in the same manner, the width of the electrically insulating portion of the deposition unit that is one unit apart is changed sequentially. Alternatively, the width of the electrically insulating portion is the same as that of the electrically insulating portion of the deposition unit that is one unit apart, and the width of the electrically insulating portion of the deposition unit three units apart can be changed.

When all the widths of the electrically insulating portions that are deposited substantially in the same position are the same, the end portion where the electrically insulating portions are provided has a small number of metal thin film layers. Therefore, the thickness of the deposition in this portion is smaller relative to the overall layered product so that a significant recess is generated on the upper surface of the layered product. This recess may deteriorate the handling properties when mounting the layered product onto a printed circuit board with a solder. In addition, when such a recess is generated, the larger the depth of the recess is, the more difficult it is to apply a patterning material onto the bottom of the recess as described later in the production process of the layered product. Therefore, it is difficult to form a good electrically insulating portion having a constant width. Moreover, the generation of the recess causes inclination of the resin thin film layer and the metal thin film layer deposited on the recess at a side of the electrically insulating layer, so that the thickness of the deposition of the resin thin film layer and the metal thin film layer becomes small locally. When the thickness of the deposition of the resin thin film layer becomes small locally, the following problem arises. In the case where the layered product is used as a capacitor, the presence of that portion reduces the withstand voltage of the capacitor and causes a short-circuit due to a pin-hole in the dielectric film layer. Moreover, when the thickness of the deposition of the metal thin film layer becomes small locally, poor conductivity is likely to occur in that portion.

In the above-described cases, it is preferable that the surface roughness of the resin thin film layer where the electrically insulating portion is deposited is twice or less, more preferably equal to or less than the surface roughness of the resin thin film layer where the metal thin film layer is deposited. Unless the former and the latter satisfy this relationship, this results in the deposition where the layers above and below the electrically insulating portion have a large surface roughness, so that electric field concentrations or current concentrations occur, resulting in poor insulating properties of the electrically insulating portion.

The number of depositions for deposition units, each of which includes the resin thin film layer and the metal thin film layer, is not limited to a particular number and can be determined suitably depending on the use of the layered product. For example, in the case where the layered product is used as a capacitor with a large capacitance, the number of depositions is preferably 1000 or more, more preferably 2000 or more, and most preferably 3000 or more. As the number of depositions is larger, the obtained capacitor can have larger capacitance when the layered product is used as the capacitor. Furthermore, the layered product of the present invention can have a high adhesion strength with the external electrodes when a reinforcement layer and a protective layer as described later are formed even if the resin thin film layer is thin. Moreover, the layered product of the present invention can have sufficient resistance against thermal load or external pressure. In addition, when the thickness of the resin thin film layer is small, the overall thickness is not very large even if the number of depositions is large. Therefore, if the volume is the same, the obtained capacitor can have a larger capacitance than that of a conventional film capacitor. If the capacitance is the same, the obtained capacitor can be smaller than a conventional film capacitor.

The layered product of the present invention can have a layered product having a different deposition form on at least one surface of the above-described layered product or between the above-described layered products depending on the use or required characteristics. For example, a reinforcement layer including a plurality of deposition units, each of which includes a resin layer and a metal layer deposited on one surface of the resin layer can be deposited on at least one surface of the above-described layered product.

Such a reinforcement layer is effective to prevent the above-described layered product portion from being damaged by thermal load or external pressure in the process of manufacturing the layered product, or in various applications of the layered product such as in the process of mounting the layered product on a printed circuit board as an electronic component. Moreover, the reinforcement layer, which has a metal thin film layer, is effective to increase the adhesion strength of the external electrodes (see FIG. 11). That is to say, the adhesion strength of the external electrodes is mainly affected by the strength of the connection with the metal layer, whereas the strength of the connection with the resin layer contributes only little to the adhesion strength. Consequently, by providing a reinforcement layer comprising a metal thin film layer, the adhesion strength of the external electrode can be significantly increased when a capacitor is formed. In the case where the layered product is provided with external electrodes and is used as a capacitor, the reinforcement layer can function as a capacitance generation portion of the capacitor, but the capacitor design can be simplified when it does not function as such.

The reinforcement layer can be provided on only one surface or both surfaces of the layered product. However, it is preferable to provide the reinforcement layer on both sides, because protection of an element layer and the adhesion strength of the external electrodes improve more significantly.

The reinforcement layer can be deposited in contact with the above-described layered product or can have another layer therebetween.

It is preferable to deposit a plurality of deposition units for the reinforcement layer in order to exert the above-described effects of the reinforcement layer more significantly.

The thickness (overall thickness on one surface) of the reinforcement layer is preferably 20 $\mu$m or more, more preferably 50 to 500 $\mu$m, and most preferably 100 to 300 $\mu$m to provide the effects sufficiently.

The deposition form of the reinforcement layer can be determined suitably, for example by the application of the layered product. However, when the layered product is used as a capacitor, an electrically insulating band is formed on the resin layer. Without the electrically insulating band, when the external electrodes are opposed on both sides of the layered product (see FIG. 11), the opposite external electrodes would be short-circuited via the metal layer. The shape of the electrically insulating band is a belt-shape having a constant width for ease of the production or the like. It is sufficient to form one electrically insulating band for insulation of the opposite external electrodes, but the number of the electrically insulating bands can be two or more.

Figure 7:
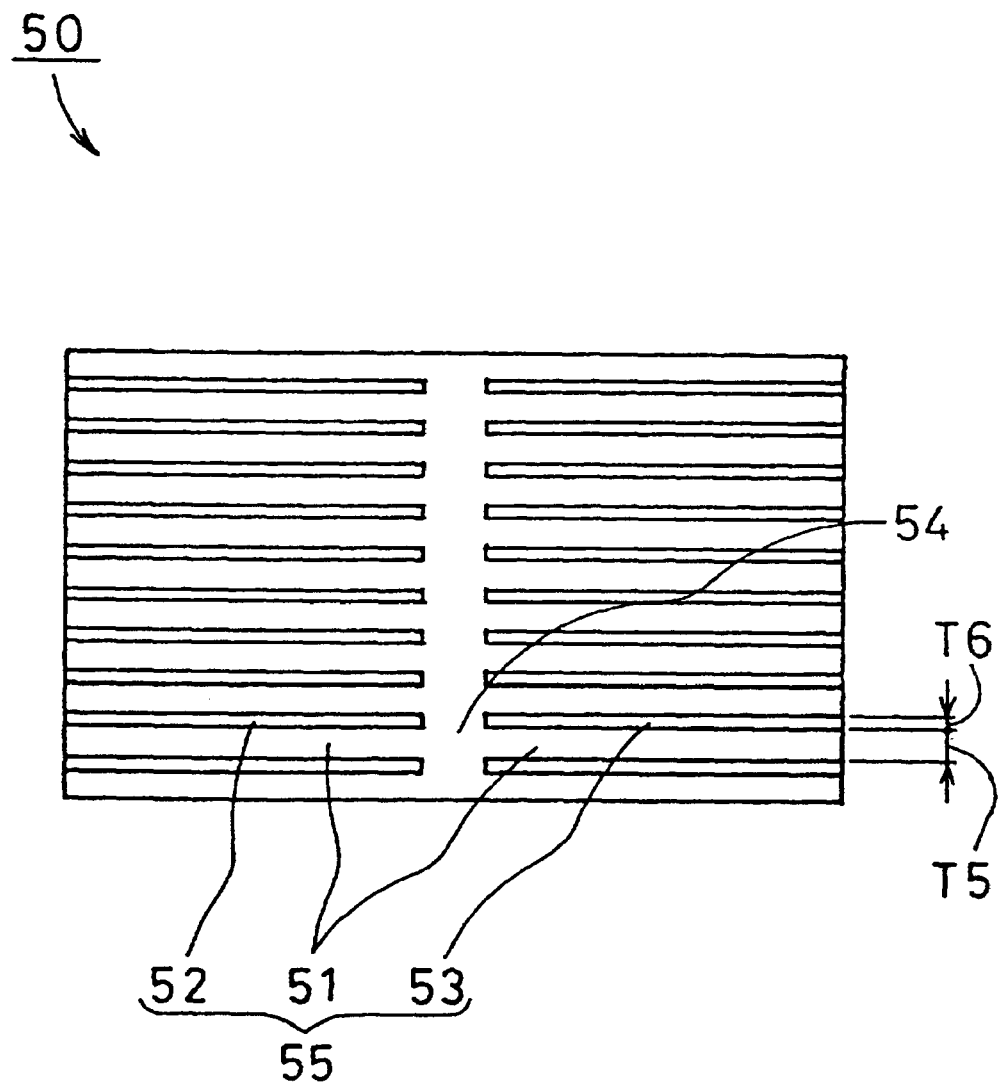
FIG. 7 is a cross-sectional view taken in the thickness direction (deposition direction) schematically illustrating an example of a reinforcement layer deposited for the layered product of the first invention.

FIG. 7 is a cross-sectional view taken in the thickness direction (deposition direction) schematically illustrating an example of a reinforcement layer having a structure where a plurality of deposition units are deposited. In each of the deposition units, two metal layers that are separated by a belt-shaped electrically insulator on a resin layer are deposited on the resin layer.

A reinforcement layer 50 includes at least one deposition unit 55 comprising a resin layer 51 and a first metal layer 52 and a second metal layer 53 that are deposited on one surface of the resin layer 51. The first metal layer 52 and the second metal layer 53 are separated by an electrically insulating band 54.

The position in which the electrically insulating band is provided is not limited to a particular position, but it is preferable to provide it substantially in the central portion of the reinforcement layer, as shown in FIG. 7. When it is provided substantially in the same position as the above-described electrically insulating portion, a large recess may be generated on the upper surface of the layered product. Therefore, for example in mounting the layered product onto a printed circuit board with a solder, the handling properties are poor, or short-circuit failure is more likely to occur due to poor soldering. In addition, when such a recess is generated, as the depth of the recess is larger, it is more difficult to apply a patterning material to the bottom of the recess as described later. Therefore, it is difficult to form a good electrically insulating portion or electrically insulating band having a constant width. Moreover, the generation of the recess causes inclination of the resin thin film layer and the metal thin film layer deposited on the recess at both sides of the electrically insulating portion, so that the thickness of the deposition becomes small. Therefore, a reduction of the withstand voltage as a capacitor, a pin-hole in the dielectric layer and poor conductivity of the metal thin film layers are likely to occur.

Figure 8:
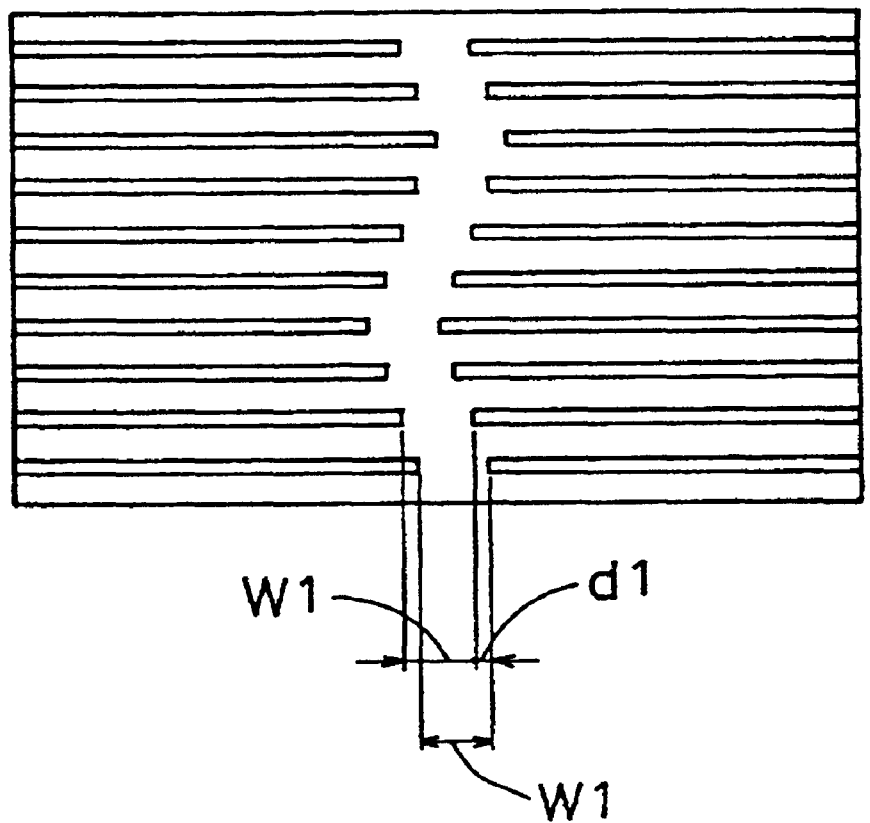
FIG. 8 is a cross-sectional view taken in the thickness direction (deposition direction) schematically illustrating another example of a reinforcement layer deposited for the layered product of the first invention.

When two or more deposition units as described above are deposited for the reinforcement layer, it is preferable at the deposition positions of the electrically insulating bands are not the same position over the reinforcement layer (the overall reinforcement layer on one side in the case where the reinforcement layer is provided on both sides). For example, as shown in FIG. 8, in a reinforcement layer 60 the deposition position of the electrically insulating band of the adjacent deposition unit is displaced by d1. Subsequently, the position of the electrically insulating band of the adjacent deposition unit is displaced by d1 in either direction in the width direction of the electrically insulating bands in the same manner. Alternatively, the positions of the electrically insulating bands of two (or more) consecutive deposition units can be the same position, and the position of the electrically insulating band of the third (or more) deposition unit can be displaced in the width direction of the electrically insulating band. When the deposition positions are substantially the same position, a recess may be generated in the electrically insulating portion on a surface of the layered product. Therefore, the handling properties may be poor when mounting the layered product onto a printed circuit board with a solder. In addition, when such a recess is generated, as the depth of the recess is larger, it is more difficult to apply a patterning material to the bottom of the recess as described later. Therefore, it is difficult to form a good electrically insulating band or electrically insulating portion having a constant width. Moreover, the generation of the recess causes inclination of the resin thin film layer and the metal thin film layer deposited on the recess at both sides of the electrically insulating portion, so that the thickness of the deposition becomes small. Therefore, a reduction of the withstand voltage as a capacitor, a pin-hole in the resin thin film layer and poor conductivity of the metal thin film layers are likely to occur.

On the other hand, when the displacement amount d1 is too large, not only is the effect of eliminating the recess on the upper surface of the layered product insignificant, but also the above-described problems occur due to the generation of the recess on the surface of the layered product when the deposition position of the electrically insulating band matches the deposition position of the electrically insulating portion. Moreover, when the first metal layer and the second metal layer of adjacent deposition units overlap, the overlapped portion forms a capacitor, which may cause a problem in the design of the capacitance or the like.

Figure 9:
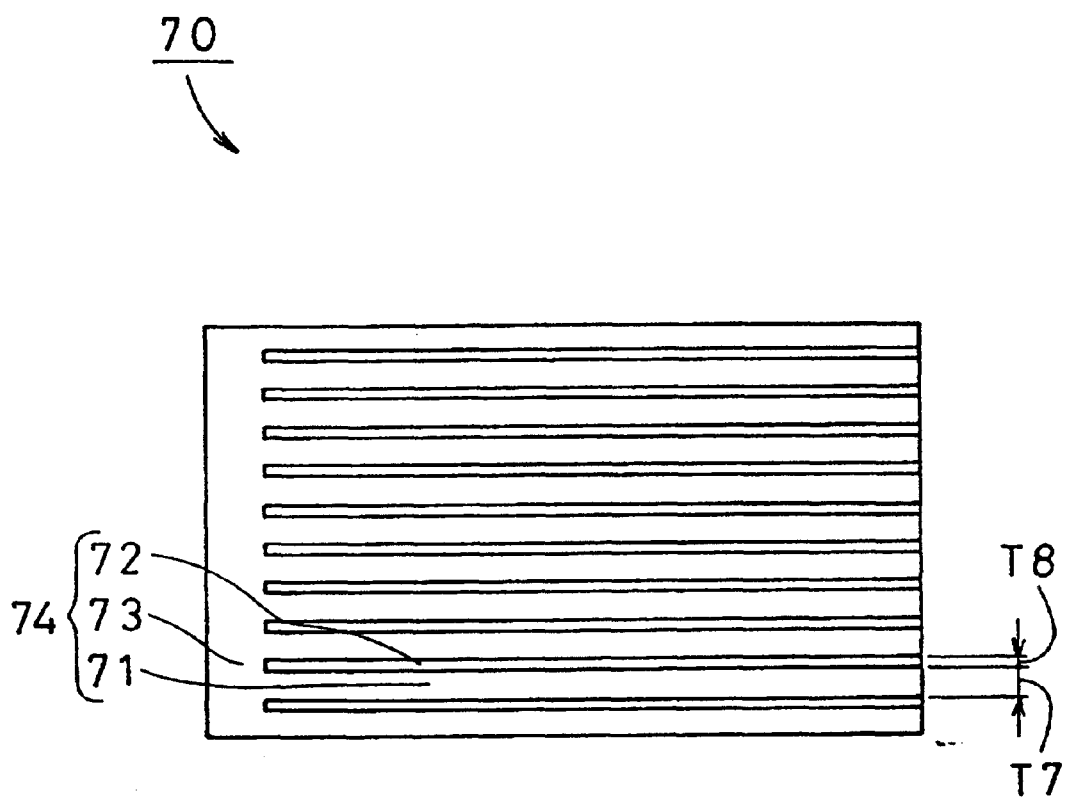
FIG. 9 is a cross-sectional view taken in the thickness direction (deposition direction) schematically illustrating yet another example of a reinforcement layer deposited for the layered product of the first invention.

FIG. 9 is a cross-sectional view taken in the thickness direction (deposition direction) schematically illustrating an example of a reinforcement layer comprising a plurality of deposition units having another deposition form.

A reinforcement layer 70 of this example includes a plurality of deposition units 74, each of which comprises a resin layer 71 and a metal layer 72 deposited on one surface of the resin layer. A metal layer is not provided in a belt-shaped electrically insulating band portion 73 on one end of a surface of the resin layer.

Figure 10:
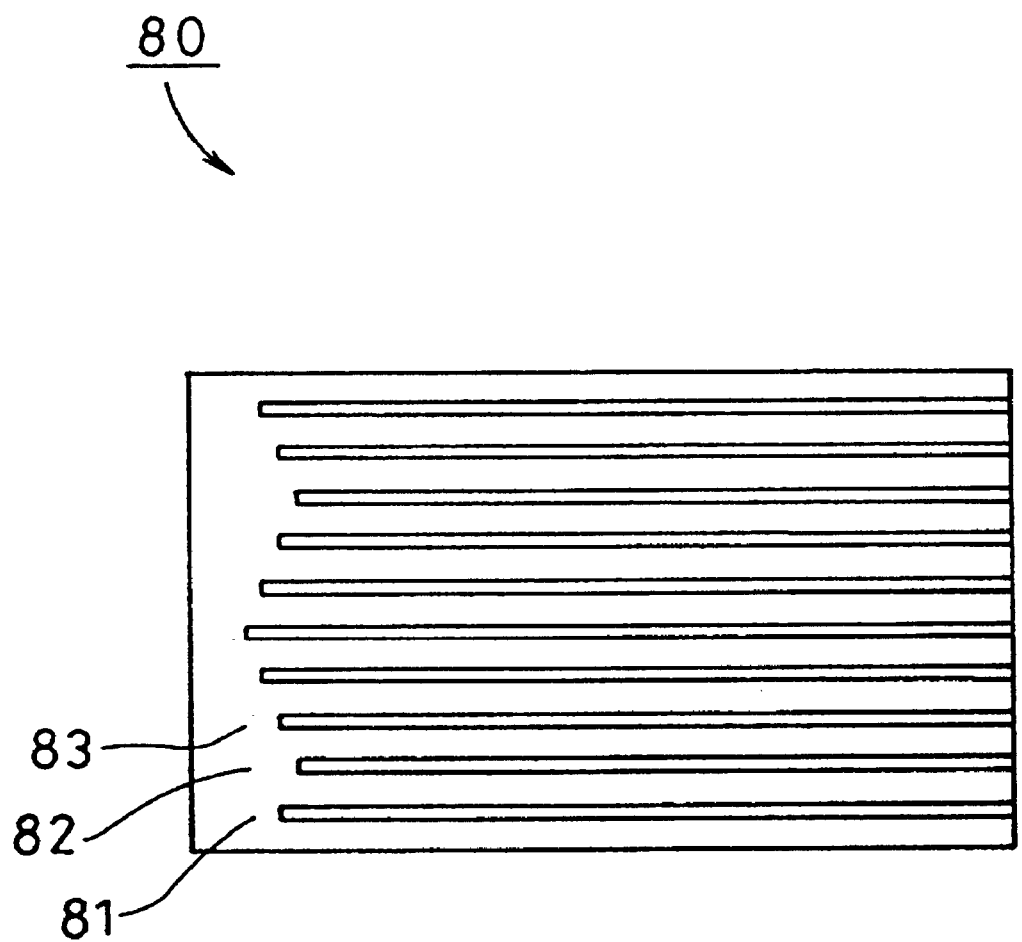
FIG. 10 is a cross-sectional view taken in the thickness direction (deposition direction) schematically illustrating still another example of a reinforcement layer deposited for the layered product of the first invention.

When two or more deposition units are deposited, it is preferable that the widths of the electrically insulating bands are not the same over the reinforcement layer (the overall reinforcement layer on one side in the case where the reinforcement layer is provided on both sides). For example, as shown in FIG. 10, with respect to an electrically insulating band 81, the width of an electrically insulating band 82 of an adjacent deposition unit is changed and further the width of an electrically insulating band 83 of an adjacent deposition unit is changed. Subsequently, the widths of the electrically insulating bands are changed sequentially in the same manner. Alternatively, the widths of the electrically insulating bands of two (or more) consecutive deposition units can be the same, and the width of the electrically insulating band of the third (or more) deposition unit can be changed.

When all the widths of the electrically insulating bands are the same, the number of deposited metal thin film layers is small in the end portion where the electrically insulating bands are formed so that the deposition thickness in this portion is small relative to the overall layered product. Thus, a significant recess may be generated on the upper surface of the layered product. This recess may deteriorate the handling properties when mounting the layered product onto a printed circuit board with a solder and may adversely affect the wettability of the solder. In addition, when such a recess is generated, as the depth of the recess is larger, it is more difficult to apply a patterning material to the bottom of the recess as described later in the production process of the layered product. Therefore, it is difficult to form a good electrically insulating band or electrically insulating portion having a constant width. Moreover, the generation of the recess causes inclination of the resin thin film layer and the metal thin film layer deposited on the recess at a side of the electrically insulating portion, so that the thickness of the deposition of the dielectric layer and the metal thin film layer becomes small locally. When the thickness of the deposition of the resin thin film layer becomes small locally, the following problem arises. In the case where the layered product is used as a capacitor, the presence of that portion reduces the withstand voltage of the capacitor and causes a short-circuit due to a pin-hole in the resin thin film layer. Moreover, when the thickness of the deposition of the metal thin film layer becomes small locally, poor conductivity is likely to occur in that portion.

The materials for the resin layer and the metal layer of the reinforcement layer are not limited to particular materials, and can be determined suitably depending on the application of the layered product and the required characteristics of the reinforcement layer. For example, the materials used for the dielectric layer and the metal thin film layer are preferable for the resin layer and the metal layer, respectively, in view of production efficiency. Furthermore, in some cases, materials different from those for the dielectric layer and the metal thin film layer are preferable for the purpose of adjusting the adhesion strength with external electrodes when they are formed or adjusting the curing degree or the mechanical strength of the overall layered product or the like.

The curing degree of the resin layer of the reinforcement layer is preferably 50–95%, more preferably 70–90%. If the curing degree is smaller than these ranges, the layered product can be deformed easily, for example by an external pressure applied in a pressing step during production of the layered product or in various applications of the layered product, for example in a process for mounting the layered product as an electronic component in a printed circuit board. On the other hand, if the curing degree is larger than these ranges, problems such as cracking may arise in the case where a cylindrical continuous layered product is removed from a can roller in the production process of the layered product, which is described later, in the case where a flat layered base element is obtained by pressing, or in the case where an external pressure is applied in various applications of the layered product, for example in a process for mounting the layered product as an electronic component. Furthermore, when providing the layered product with external electrodes, sprayed metal particles hardly penetrate between the metal layers so that the adhesion strength of the external electrodes becomes weak.

The thickness of the resin layer T5 (FIG. 7) and T7 (FIG. 9) is preferably 0.1 to 1 $\mu$m, and more preferably 0.1 to 0.6 $\mu$m. The thickness of the metal layer T6 (FIG. 7) and T8 (FIG. 9) is preferably 100 to 500 Å, and more preferably 200 to 400 Å. The film resistance is preferably 1 to 10$\Omega$/□, and more preferably 2 to 6$\Omega$/□. In the case of FIG. 7, the thickness of the first metal layer can be different from that of the second metal layer, but the same thickness is preferable because a uniform thickness of the overall layered product can be obtained.

The thicknesses T5 (FIG. 7) and T7 (FIG. 9) of the resin layer of the reinforcement layer are preferably larger than the thicknesses T1 (FIG. 1) and T3 (FIG. 4) of the resin thin film layer. Furthermore, the thicknesses T6 (FIG. 7) and T8 (FIG. 9) of the metal layer of the reinforcement layer is preferably larger than the thicknesses T2 (FIG. 1) and T4 (FIG. 4) of the metal thin film layer of the element layer. This is effective for protection of the layered product portion comprising the resin thin film layer and the metal thin film layer and improvement of the adhesion strength of the external electrodes. In other words, a thicker resin layer or metal layer of the reinforcement layer exerts a buffer function against external pressure or thermal stress more effectively. In addition, the external electrodes are formed by spraying or the like, and the particles of sprayed metal are relatively rough and hardly penetrate between the metal thin film layers sufficiently. However, the thickness of the resin thin film cannot be made large to ensure the capacitance for a capacitor. Therefore, the penetration of the sprayed metal is facilitated by making the thickness of the resin layer of the reinforcement layer thick, and thus the adhesion strength of the external electrodes can be improved with ease. Furthermore, the larger the area of the metal layer exposed to the side is, the larger the contact area with the external electrodes is. Therefore, the adhesion strength of the external electrodes can be improved by making the thickness of the metal layer of the reinforcement layer thick.

A protective layer can be formed on at least one surface of the layered product of the present invention.

The protective layer is effective to prevent the layered product portion from being damaged by thermal load or external pressure in the process of manufacturing the layered product, or in various applications of the layered product such as in the process of mounting the layered product on a printed circuit board as an electronic component. Furthermore, with respect to the improvement of the adhesion strength of the external electrodes, the protective layer has a certain effect, although the level of contribution thereof is lower than that of the metal thin film layers and the metal layers.

The protective layer can be provided on only one surface of the layered product to exert its effect. However, it is preferable to provide the protective layer on both surfaces to achieve the protection of the layered product portion sufficiently. In this case, the protective layer can be provided via the reinforcement layer or without the reinforcement layer. Furthermore, the protective layer can be deposited in contact with the layered product or the reinforcement layer or can have another layer therebetween.

The thickness of the protective layer is not limited to a particular value and can be determined suitably depending on the environment to which the layered product is exposed. However, in order to provide the above-described effect sufficiently, the thickness is preferably 2 $\mu$m or more, more preferably 2 to 100 $\mu$m, and most preferably 4 to 30 $\mu$m.

The material for the protective layer is not limited to a particular material, but when the material used for the resin thin film layer and/or the resin layer is used, the production efficiency can be improved. On the other hand, a material different from that used for the resin thin film layer and/or the resin layer can be used to provide a specific function for the protective layer. For example, epoxy ester such as 2-hydroxy-3-phenoxypropyl acrylate is preferable for better adhesion between the protective layer and the reinforcement layer.

The curing degree of the protective layer is preferably 50–95%, more preferably 70–90%. If the curing degree is smaller than these ranges, the layered product can be deformed easily, for example by an external pressure applied in a pressing step during production of the layered product or in various applications of the layered product, for example in a process for mounting the layered product as an electronic component in a circuit board. On the other hand, if the curing degree is larger than these ranges, problems such as cracking may arise in the case where a cylindrical continuous layered product is removed from a can roller in the production process of the layered product, which will be described later, in the case where a flat layered base element is obtained by pressing, or in the case an external pressure is applied in various applications of the layered product, for example in a process for mounting the layered product as an electronic component.

The protective layer can be colored to a specific color. This allows an improvement in accuracy of pattern recognition when mounting the layered product on a printed circuit board as an electronic component or facilitates the identification of each product. For example, coloring can be performed by mixing a colorant such as a pigment or coating the outer surface with a paint. Moreover, the protective layer can be made transparent, if necessary.

The layered product of the present invention can be used in various applications. It is preferable to form external electrodes on opposite sides of the layered product when it is used as an electronic component, especially as a capacitor.

Figure 11:
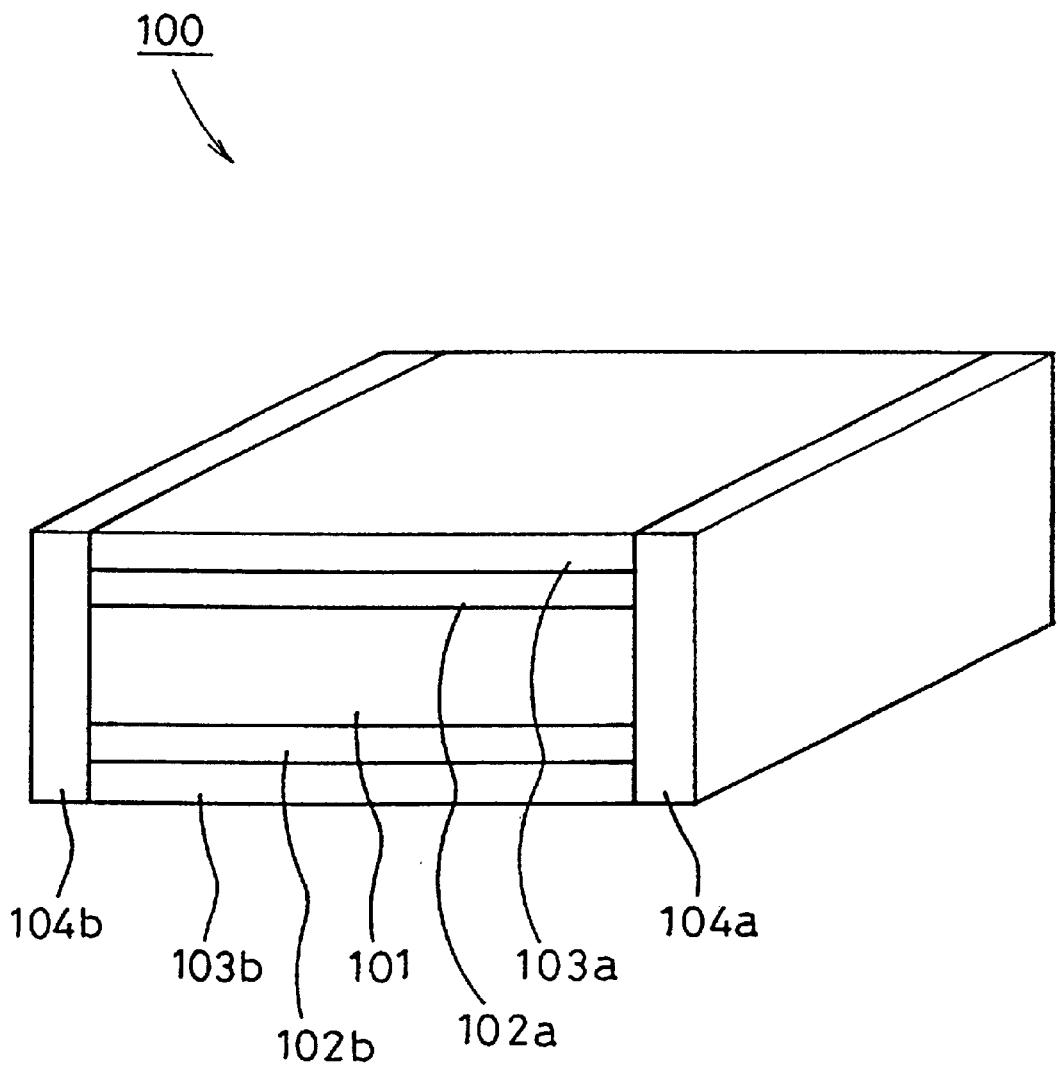
FIG. 11 is a schematic perspective view illustrating an example of a chip capacitor using the layered product of the first invention.

FIG. 11 is a schematic perspective view illustrating an example of a chip capacitor produced by using the layered product of the present invention provided with external electrodes.

In this example, reinforcement layers 102a and 102b are deposited on both surfaces of a layered product portion 101 where a plurality of deposition units, each of which comprises a resin thin film layer and a metal thin film layer, are deposited. Further, protective layers 103a and 103b are deposited on both surfaces thereof. External electrodes 104a and 104b are formed on the opposite both sides thereof.

In the case the layered product portion 101 takes the deposition form shown in FIG. 1 or 3, the first metal thin film layer and the second metal thin film layer are electrically connected to the external electrodes 104a and 104b, respectively. In the case the layered product portion 101 takes the deposition form shown in FIG. 4 or 6, the metal thin film layers of adjacent deposition units are electrically connected alternately to the external electrodes 104a and 104b. Similarly, in the case the reinforcement layers 102a and 102b take the deposition form shown in FIG. 7 or 8, the first metal layer and the second metal layer are electrically connected to the external electrodes 104a and 104b, respectively. In the case the reinforcement layers 102a and 102b take the deposition form shown in FIG. 9 or 10, the metal layer is electrically connected to either one of the external electrodes 104a and 104b.

The external electrodes can be formed by metal spraying with brass or the like. In addition, the external electrodes can be constituted of a plurality of layers. For example, an underlying layer that is to be electrically connected to the metal thin film layer of the layered product portion 101 is formed by metal spraying and another layer is provided thereon by a method such as metal spraying, plating or coating. More specifically, a metal having good adhesion strength with the layered product can be selected to form the underlying layer, and a metal having good adhesiveness with various metals or a resin to be contacted (deposited) further thereon can be selected to form the upper layer.

Furthermore, for a soldering property at the time of mounting, melt solder plating, melt tinning, electroless solder plating or the like can be performed. In this case, as an underlying layer, the following layer can be formed: a layer obtained by applying a conductive paste where copper powder or the like is dispersed in a thermosetting phenol resin and heating for curing; or a layer obtained by spraying a metal such as an alloy comprising copper/phosphorus/silver.

Furthermore, a bump electrode can be provided in the external electrode to facilitate the mounting onto a circuit board further. The bump electrode can be formed by selecting a material suitably from known materials or shapes.

Furthermore, a necessary outer package in accordance with the intended application can be provided. For example, a coating about several tens of angstroms thick is provided using a surface treatment agent such as a silane coupling agent for the purpose of improving resistance against humidity of the layered product or protecting exposed metal thin film layers and/or metal layers. Alternatively, a layer obtained by applying a photocurable or thermosetting resin to a thickness of about several hundreds $\mu$m and curing the resin can be provided.

The layered product of the present invention can be used as a chip capacitor, a chip coil, a chip resistor, and a composite element including these, and used suitably as an electronic component such as a capacitor. In particular, the layered product of the present invention can be a capacitor having high capacitance, although it is small. Therefore, when it is used as a chip capacitor, the practical value is high.

Next, a method for producing the layered product of the present invention will be described.

Figure 12:
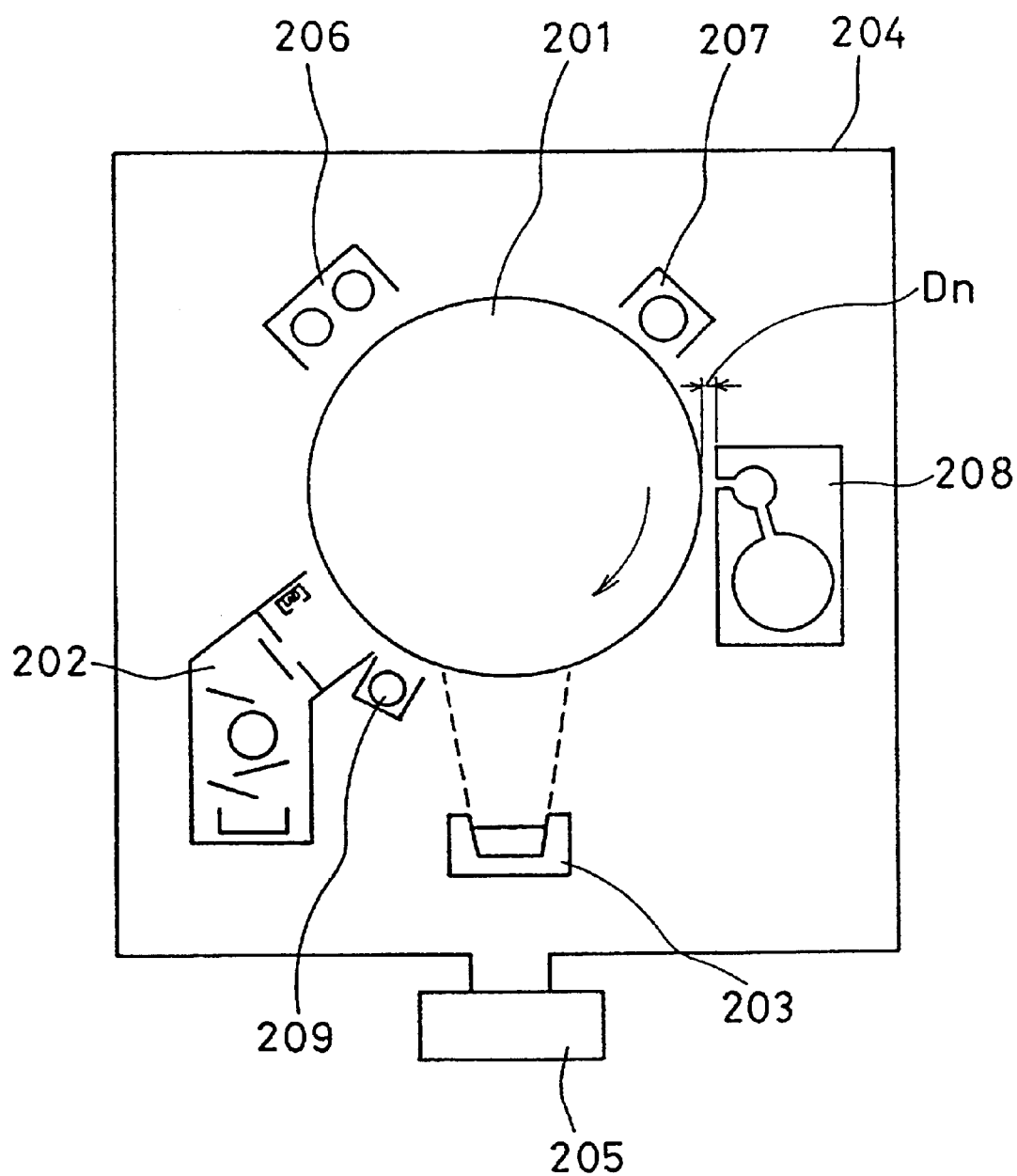
FIG. 12 is a schematic view illustrating an example of a production apparatus for producing the layered product of the first invention.

FIG. 12 is a schematic view illustrating an example of a production apparatus for producing the layered product of the present invention.

An apparatus 203 for forming a metal thin film is provided at a lower portion of a can roller 201, which rotates in the direction of the arrow in FIG. 12 with constant angular velocity or constant circumferential velocity. An apparatus 202 for forming a resin thin film is provided downstream in the rotation direction of the can roller 201.

In this example, an apparatus 208 for applying patterning material is provided upstream of the apparatus 203 for forming a metal thin film. An apparatus 209 for removing patterning material is provided between the apparatus 203 for forming a metal thin film and the apparatus 202 for forming a resin thin film. An apparatus 206 for curing resin and an apparatus 207 for treating a resin surface are provided between the apparatus 202 for forming a resin thin film and the apparatus 208 for applying patterning material. However, these apparatuses can be omitted if desired.

The apparatuses are installed inside a vacuum container 204, in which a vacuum is maintained with a vacuum pump 205.

The circumferential surface of the can roller 201 is smooth, preferably mirror-finished, and cooled preferably to −20° C. to 40° C., more preferably −10° C. to 10° C. The rotation velocity can be adjusted freely, but preferably is about 15 to 70 rpm.

The apparatus 203 for forming a metal thin film forms a metal thin film on the surface of the can roller 201. For example, a metal deposition source can be used. The formed metal thin film forms the metal thin film layers of the layered product of the present invention and the metal layers of the reinforcement layer. As the deposition metal, for example, at least one selected from the group consisting of Al, Cu, Zn, Sn, Au, Ag, and Pt can be used. Instead of deposition, the metal thin film can be formed by a known technique such as sputtering, ion plating or the like.

The apparatus 202 for forming a resin thin film evaporates and vaporizes a reactive monomer resin toward the surface of the can roller 201. The resin is deposited so as to form the resin thin film layers of the present invention, the resin layers of the reinforcement layer and the protective layer.

Figure 13:
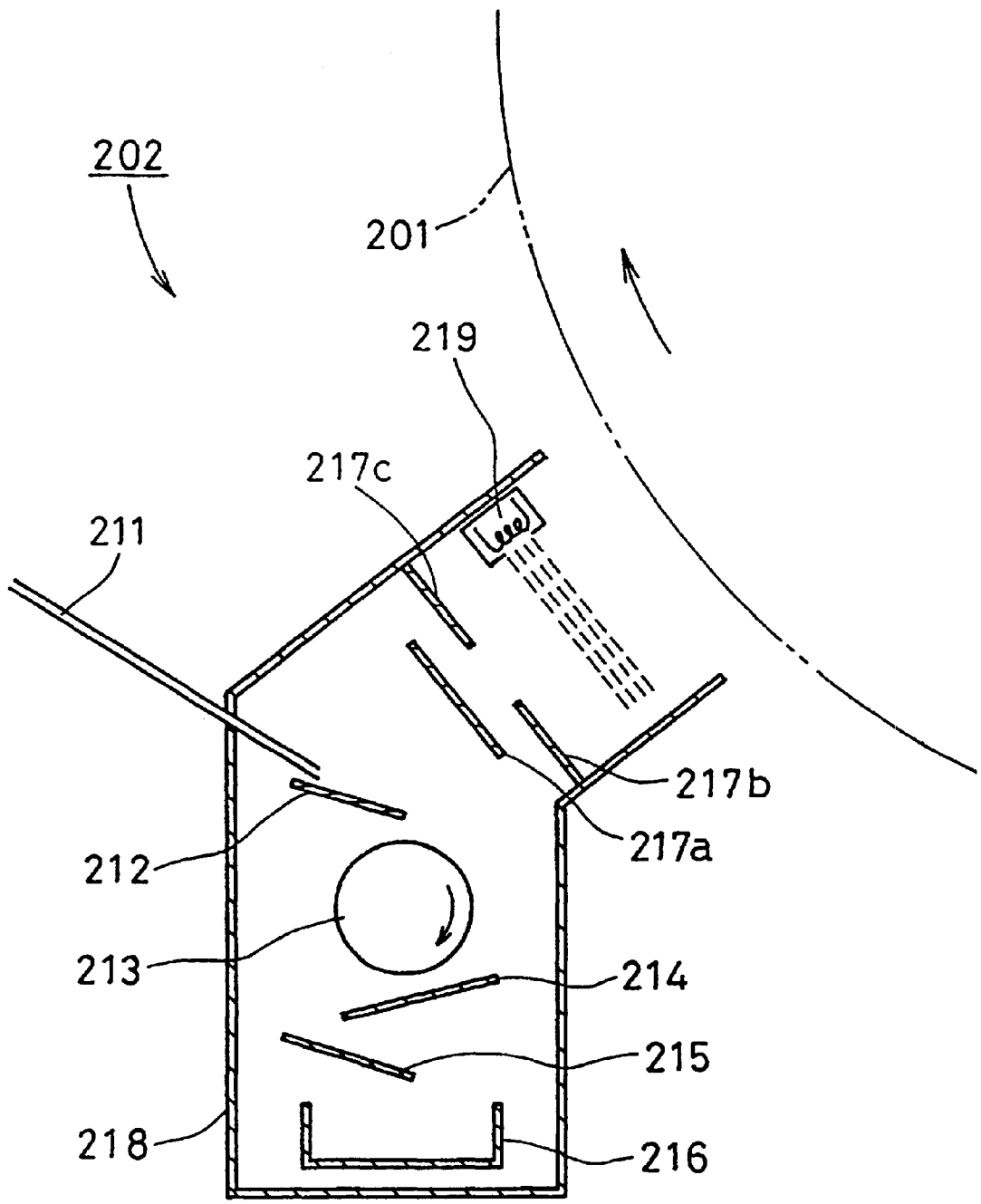
FIG. 13 is a schematic cross-sectional view illustrating the internal structure of an apparatus for forming a resin thin film used in the production apparatus in FIG. 12.

FIG. 13 is a schematic view illustrating the internal structure of the apparatus 202 for forming a resin thin film shown in FIG. 12.

A liquid reactive monomer for forming the resin thin film layer is introduced through a raw material supply tube 211, and dripped onto a heating plate A 212 that is provided with a tilt inside the apparatus 202 for forming a resin thin film. The reactive monomer is heated while moving downward on the heating plate A 212. A portion of the reactive monomer evaporates, whereas the portion of the reactive monomer that has not evaporated drops onto a heating drum 213, which rotates at a predetermined rotational speed. A portion of the reactive monomer on the heating drum 213 evaporates, whereas the portion of the reactive monomer that has not evaporated drops onto a heating plate B 214. While the reactive monomer moves downward on the heating plate B 214, a portion thereof evaporates and the portion of the reactive monomer that has not evaporated drops onto a heating plate C 215. While the reactive monomer moves downward on the heating plate C 215, a portion thereof evaporates and the portion of the reactive monomer that has not evaporated drops into a heated cup 216. The reactive monomer in the cup 216 evaporates gradually. The vapor reactive monomer that has evaporated in the above-described manner forms goes up inside a surrounding wall 218, passes between shielding plates 217a, 217b and 217c, and reaches the circumferential surface of the can roller 201, where the monomer condenses and solidifies to form the resin thin film layer. The means for evaporating the reactive monomer is not limited to the above structure, and can be changed as appropriate.

The resin thin film layer of the present invention is formed by condensing the evaporated reactive monomer on the can roller 201, so that a resin thin film layer having a smooth surface can be obtained. More specifically, in the present invention, it is not at all required to contain a protrusion forming component, which is contained in a conventional resin thin film layer (resin film) obtained by melting a resin material and stretching the same for the purpose of providing a smoothing property. Moreover, in a conventional resin thin film layer obtained by applying a solution of a resin material diluted with a solvent to a supporting base and drying and curing the resin material, defects such as large protrusions are formed on the surface in the process of evaporation of the solvent. However, since the present invention contains no solvent, such defects are not generated.

Furthermore, in order to form a resin thin film layer having an even smoother surface, it is preferable to provide the shielding plates 217a, 217b, and 217c in the path where the evaporated reactive monomer reaches the can roller 201. The reason for this is as follows: The liquid reactive monomer supplied by the raw material supply tube 211 sometimes is heated abruptly by the heating plate A 212, so that large particles may develop and scatter. By employing the shielding plates that prohibit the reactive monomer from passing straight from the point of evaporation to the point of adherence on the surface of the can roller, the adherence of large particles can be greatly reduced, so that the surface of the resin thin film layer becomes very smooth. Consequently, as long as the shielding plates serve this end, there is no particular limitation to the shape and arrangement shown in FIG. 13.

Furthermore, in order to form a resin thin film layer having a smooth surface, it is preferable to charge the evaporated reactive monomer and/or the surface of adherence.

In the apparatus for forming a resin thin film shown in FIG. 13, a device 219 for irradiating a charged particle beam is provided at a passing point of the reactive monomer. The charged monomer particles are accelerated by electrostatic attraction, and due to the microscopic electrostatic repulsion during the deposition, they avoid the portions where charged particles already were deposited. Due to this mechanism, a very smooth resin film layer can be formed.

Figure 14:
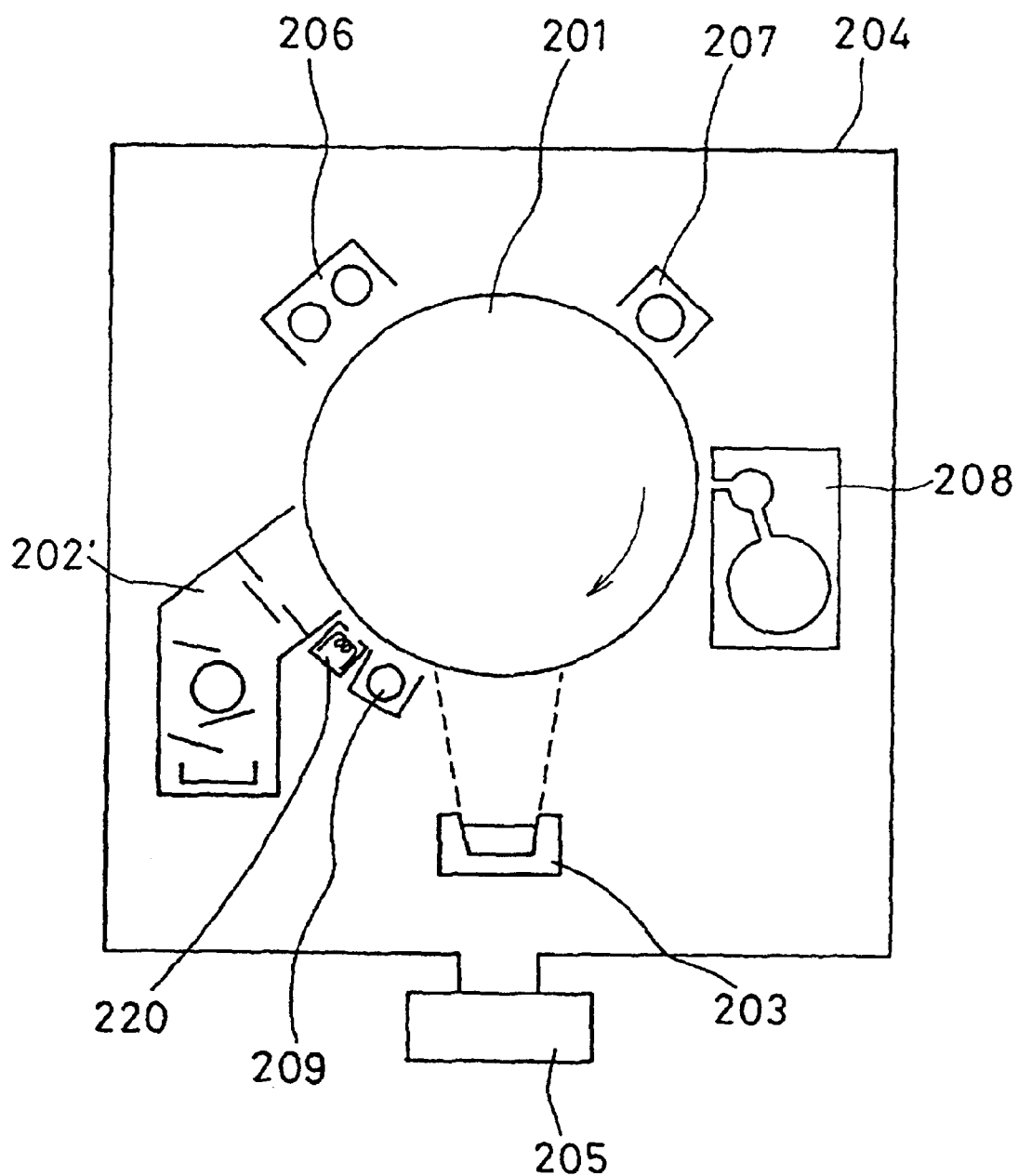
FIG. 14 is a schematic view illustrating another example of a production apparatus for producing the layered product of the first invention.

The device for irradiating a charged particle beam also can be provided facing the deposition surface of the reactive monomer. FIG. 14 is a schematic view illustrating an example of an apparatus for producing a layered product having such a structure. A device 220 for irradiating a charged particle beam is provided downstream from the apparatus 209 for removing patterning material, which is described later, and upstream from an apparatus 202' for forming a resin thin film, facing the circumferential surface of the can roller 201. In this case, the apparatus 202 for forming a resin thin film provided with the device for irradiating a charged particle beam as shown in FIG. 13 can be used as the apparatus for forming a resin thin film.

Any device for irradiating a charged particle beam can be used, as long as it confers an electrostatic charge to the reactive monomer particles or to the deposition surface. For example, an electron beam irradiation device, an ion source irradiating an ion beam, or a plasma source can be used.

Since the metal thin film layers of the present invention are very thin, the shape of the underlying layers on which the metal thin film layers are formed is reflected by the surface of the metal thin film layers. It follows that since the surfaces of the resin thin film layers formed as described above are very smooth, the surfaces of the metal thin film layers formed thereon also are very smooth.

If necessary, the deposited reactive monomer resin is polymerized and/or cross-linked with the apparatus 206 for curing resin and cured to a predetermined curing degree. As the apparatus for curing resin, an electron beam irradiation device or a UV beam irradiation device can be used, for example.

If necessary, the surface of the formed resin thin film layer is treated with the apparatus 207 for treating a resin surface. For example, the surface of the resin thin film layer can be activated with an oxygen plasma to increase the adhesiveness with the metal thin film.

The apparatus 208 for applying patterning material is used to deposit the metal thin film layer only in a specific area rather than on the entire surface of the resin thin film layer. The apparatus 208 for applying patterning material deposits a patterning material on the surface of the resin thin film in a belt-shape in the direction of the circumference of the can roller 201. At the portions where the patterning material has been deposited, no metal thin film is formed, so that these portions become, for example the electrically insulating portions and the electrically insulating bands of the reinforcement layer. As the patterning material, for example, oil can be used. To apply the patterning material, evaporated and vaporized patterning material can be ejected from pinholes and condensed on the surface of the resin thin film, or liquid patterning material can be ejected. Besides these examples of contactless application methods, other application methods such as reverse coating or die coating are possible, but for the present invention, contactless application methods are preferable because no external pressure is applied to the resin surface. Especially, a method of condensing the evaporated patterning material on the surface of the resin thin film is preferable because the structure is relatively simple.

Figure 15:
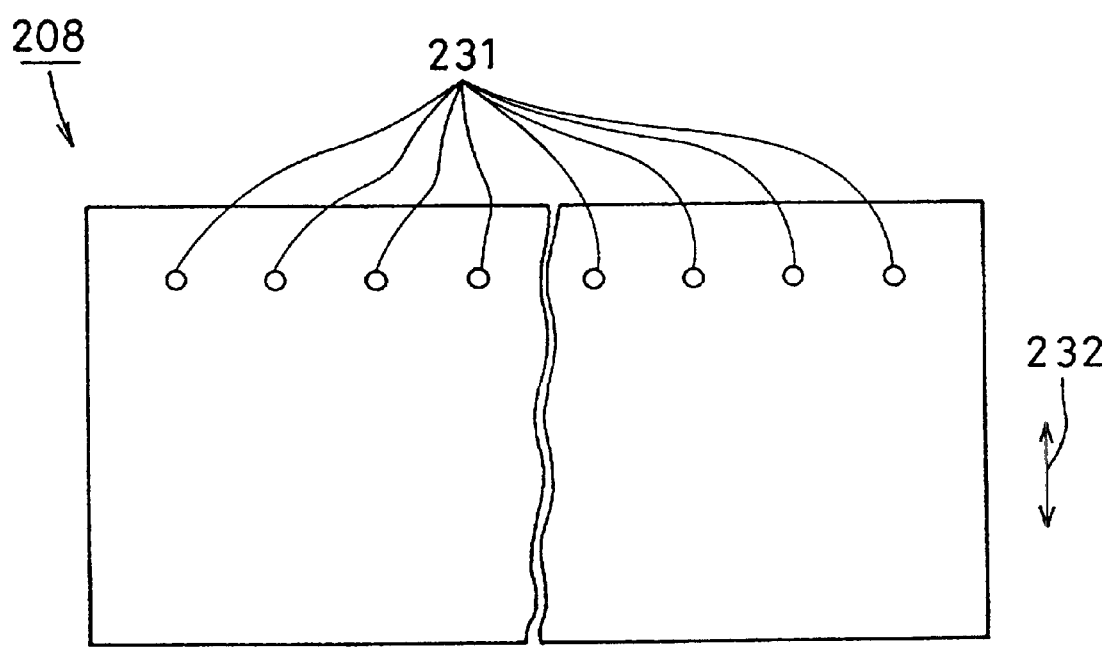
FIG. 15 is a schematic front view of an apparatus for applying patterning material used in the production apparatus in FIG. 12.

FIG. 15 is a schematic front view of an apparatus for applying patterning material that applies a belt-shaped oil film on a surface of a resin thin film by ejecting evaporated oil as an example of the apparatus for applying patterning material. On the front of the apparatus for applying patterning material, a predetermined number of pinholes 231 are arranged at predetermined intervals. The apparatus 208 for applying patterning material is positioned in a manner that the pinholes 231 oppose the circumferential surface of the can roller 201, and the direction indicated by arrow 232 matches the travel direction of the circumferential surface of the can roller 201. Then, the evaporated patterning material is ejected from the pinholes 231 so as to deposit the patterning material on the resin thin film layer on the can roller, and condensed by cooling, whereby a deposition film of the patterning material is formed. Consequently, the interval and the number of pinholes 231 correspond to the interval and the number of the electrically insulating portions (or electrically insulating bands) formed on the resin thin film layer. The shape of the pinholes 231 can be round, as shown in FIG. 15, but elliptical, elongated, rectangular or other shapes are also possible. Alternatively, a plurality of elliptical, elongated, or rectangular pinholes can be arranged in the travel direction of the surface of the can roller.

The patterning material applied with the apparatus 208 for applying patterning material can be removed by an apparatus 209 for removing patterning material, if necessary. When the patterning material remains, the following problems arise. The surfaces of the resin thin film layer and the metal thin film layer chap so that a layered product having the surface roughness of the present invention cannot be obtained. A pin-hole (lack of deposition) in the resin thin film layer or the metal thin film layer is generated. The electrically insulating portions (or electrically insulating bands) having a predetermined width cannot be formed stably. There is no particular limitation regarding how the patterning material is removed. However, for example, when oil is used as the patterning material, the patterning material can be removed by heat evaporation by a heater, or decomposition by plasma irradiation, or a combination thereof. In this case, oxygen plasma, argon plasma, nitrogen plasma, or the like can be used for the plasma irradiation, but among these, oxygen plasma is most preferable.

Thus, a layered product where a predetermined number of deposition units, each of which comprises a resin thin film layer and a metal thin film layer, are deposited on the circumferential surface of the can roller 201 can be obtained by rotating the can roller 201. In order to form the layered product shown in FIGS. 1, 3, 4 and 6, it is required to move the deposition position of the patterning material by a predetermined distance in the direction perpendicular to the travel direction of the circumferential surface of the can roller 201 for the purpose of changing the position of the electrically insulating portion, every time one deposition unit comprising a resin thin film layer and a metal thin film layer is deposited. Similarly, in order to form the reinforcement layer shown in FIGS. 8 and 10, it is required to move the deposition position of the patterning material by a predetermined distance in the direction perpendicular to the travel direction of the circumferential surface of the can roller 201 for the purpose of changing the position of the electrically insulating band, every time one deposition unit comprising a resin layer and a metal layer is deposited.

Furthermore, in the process of producing the layered product, since the deposition thickness is larger as the deposition units are deposited sequentially, it is preferable to retract the apparatus 208 for applying patterning material as the deposition progresses, not only in the case where the patterning material is directly applied by coating or the like but also in the case where deposition is performed by a contactless method. In other words, in FIG. 12, it is preferable to deposit layers while maintaining a constant distance Dn between the circumferential surface of the layered product that is being formed on the can roller 201 and the pinhole end of the apparatus for applying patterning material at a predetermined interval. This is because the patterning material diffuses with a certain directivity especially when vaporized oil is ejected for deposition, so that a variation of the distance Dn changes the deposition width, whereby the electrically, insulating portion having a predetermined width cannot be obtained stably.

Figure 16:
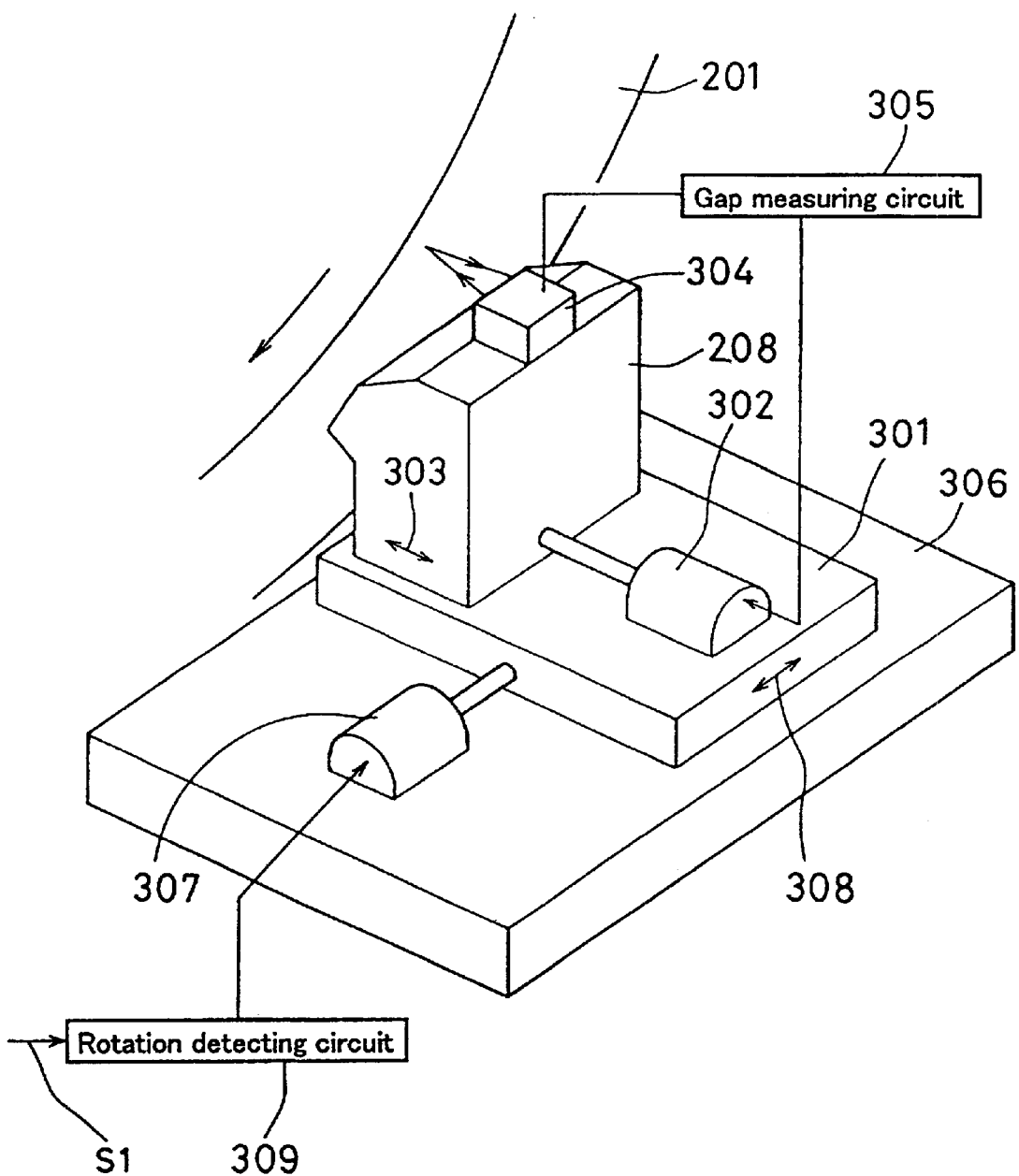
FIG. 16 is a schematic view illustrating a device for retracting the apparatus for applying patterning material and moving the application position of the patterning material.

The retraction of the apparatus for applying patterning material and the movement of the deposition position of the patterning material can be performed, for example by an apparatus as shown in FIG. 16.

First, the apparatus for applying patterning material is retracted in the following manner. An actuator A 302 is fixed on a movable base 301. The apparatus 208 for applying patterning material is attached to the mobile end of the actuator A 302. The actuator A 302 can move the apparatus 208 for applying patterning material in the direction of arrow 303 on the movable base 301. A gap measuring device 304 for measuring the distance to the surface of the can roller 201 (the circumferential surface of the layered product in the process of the formation of the layered product) is provided on the apparatus 208 for applying patterning material. A contactless measuring device, for example a measuring device using a laser, can be used for the gap measuring device 304. During the manufacturing of the layered product, the gap measuring device 304 keeps measuring the distance to the circumferential surface of the layered product on the surface of the can roller 201, and a signal corresponding to this measurement is sent to a gap measuring circuit 305. The gap measuring circuit 305 continuously checks whether the distance between the pinhole end of the apparatus 208 for applying patterning material and the surface of the can roller 201 (the circumferential surface of the layered product in the process of the formation of the layered product) is within a predetermined range. When the deposition progresses and the gap measuring circuit 305 determines that this distance is smaller than the predetermined range, it instructs the actuator A 302 to retract the apparatus 208 for applying patterning material a predetermined distance, and based on this instruction, the apparatus 208 for applying patterning material is retracted a predetermined distance. Thus, the distance Dn between the pinhole end of the apparatus 208 for applying patterning material and the circumferential surface of the layered product on the can roller 201 always can be kept within a constant interval while the deposition progresses.

As an alternative to the control using the gap measuring device 304 and the gap measuring circuit 305 as described above, the apparatus for applying patterning material also can be retracted for a preset length that is based on the layering thickness, in accordance with the number of rotations of the can roller 201 (for example, per rotation).

Moreover, a fine-tuning mechanism of verifying the actual distance with the gap measuring device 304 described above can be added to this configuration Next, the position where the patterning material is applied can be modified in the following manner. An actuator B 307 is attached to a support base 306. The movable base 301 is attached to the mobile end of the actuator B 307. The actuator B 307 can move the movable base 301 on the support base 306 in the direction indicated by arrow 308. The rotation of the can roller 201 is observed by a rotation detector (not shown in the drawing), which sends a rotation signal S1 to a rotation detecting circuit 309 whenever the can roller 201 has rotated one turn. When the rotation detecting circuit 309 has counted a predetermined number of detections of the rotation signal S1 (for example one detection), it instructs the actuator B 307 to move the movable base 301 for a predetermined distance in a predetermined direction as indicated by arrow 308. Thereby, the movable base 301, and thus the apparatus 208 for applying patterning material, is moved a predetermined distance in a predetermined direction as indicated by arrow 308. Thus, the position where patterning material is applied can be changed for every predetermined number of rotations of the can roller 201 for a predetermined distance in a direction that is perpendicular to the rotation and travel direction of the surface of the can roller 201.

In this manner, the layered product where a plurality of deposition units, each of which comprises a resin thin film layer and a metal thin film layer, are deposited is formed on the circumferential surface of the can roller 201. For forming a layer comprising no metal thin film layer, such as the protective layer, only resin can be deposited with the apparatus 202 for forming a resin thin film by rotating the can roller 201 until a predetermined thickness is formed, while providing shielding plates or the like to prevent the apparatus 203 for forming a metal thin film and the apparatus 208 for applying patterning material from functioning. Similarly, for forming only metal thin film layers successively, only metal thin film layers can be deposited by rotating the can roller 201 until a predetermined thickness is formed while providing shielding plates or the like to prevent the apparatus 202 for forming a resin thin film from functioning.

Thus, a cylindrical continuous product of a layered product is formed on the circumferential surface of the can roller 201. This is divided in the radial direction (e.g., into 8 sections by every 45°) and removed from the can roller 201. The sections are pressed under heat and pressure, and flat layered base elements are obtained. Thereafter, the layered base elements are cut or provided with an outer package, if necessary, depending on the intended application of the layered product.

The present invention will be described by taking the production of a chip capacitor from the layered product of the present invention as an example.

Figure 17:
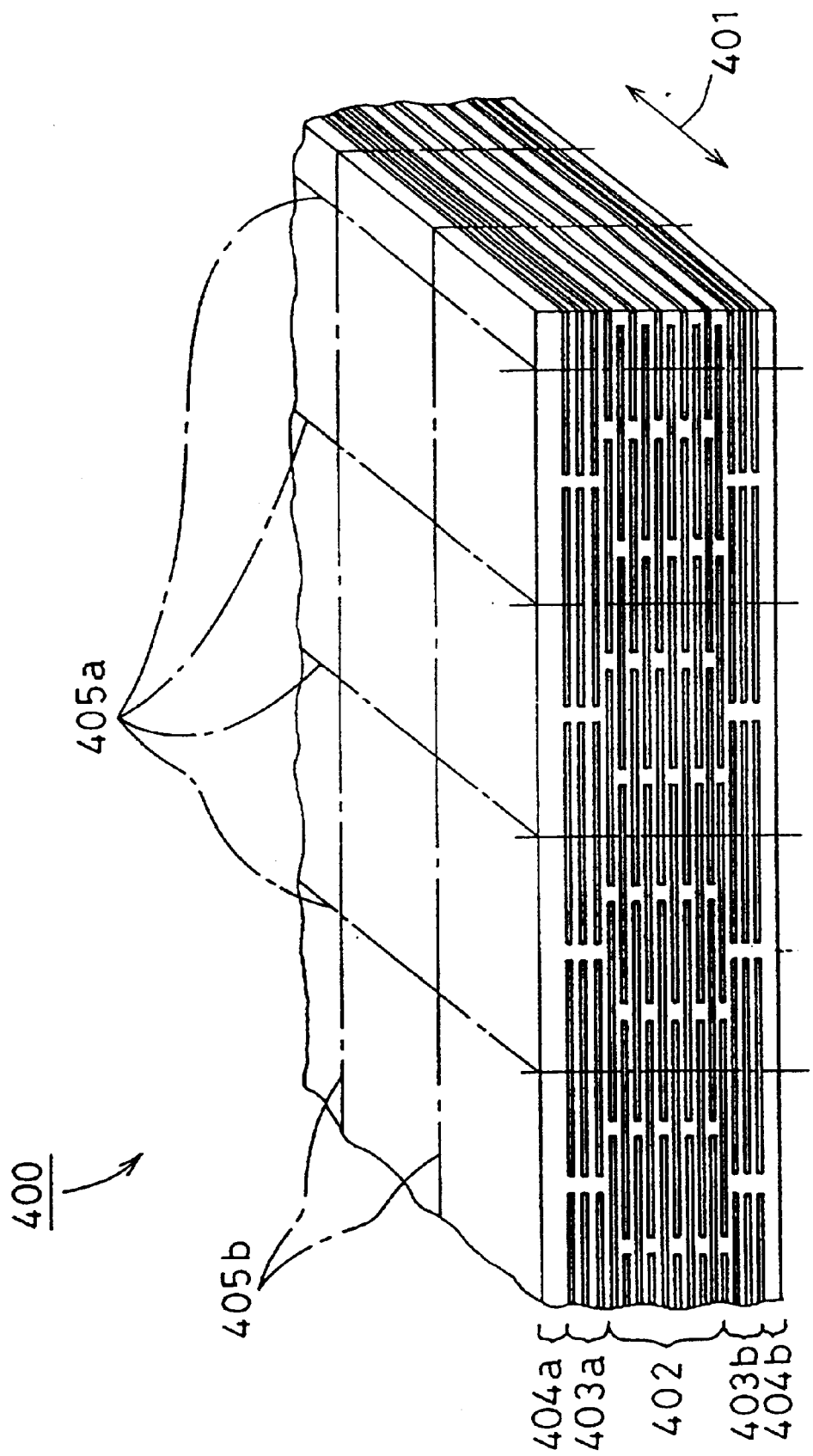
FIG. 17 is a partial perspective view illustrating an example of the structure of a flat layered base element.

FIG. 17 is a partial perspective view illustrating an example of the outline of the structure of the flat layered base element obtained in the above-described manner. In FIG. 17, arrow 401 indicates the travel direction (circumferential direction) on the can roller 201.

The layered base element 400 in FIG. 17 includes a protective layer 404b, a reinforcement layer 403b, a layered product portion 402 comprising resin thin film layers and metal thin film layers, a reinforcement layer 403a and a protective layer 404a, which are deposited on the can roller 201 in this order.

Thereafter, the layered base element is cut along cutting planes 405a and external electrodes are formed at the cutting planes, and further is cut along planes corresponding to cutting planes 405b, so that a chip capacitor as shown in FIG. 11 can be obtained. In the chip capacitor in this example, the layered product portion 402 has the structure in FIG. 1, and each of the reinforcement layers 403a and 403b has the structure in FIG. 7.

Figure 18:
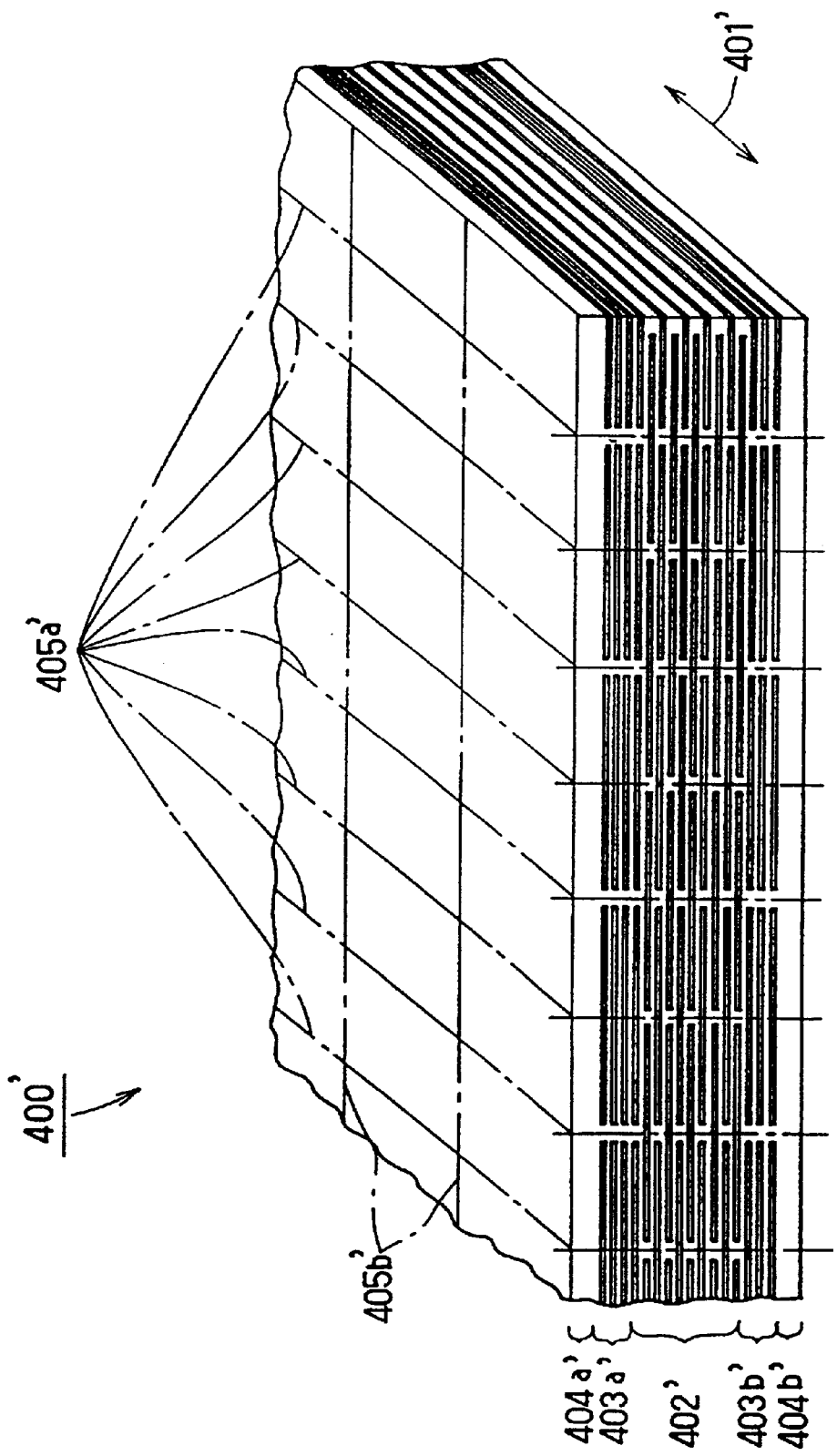
FIG. 18 is a partial perspective view illustrating another example of the structure of a flat layered base element.

A chip capacitor having a different deposition form can be obtained by suitably changing the position on which patterning material is applied and the positions of the cutting planes 405a. For example, as shown in FIG. 18, a chip capacitor as shown in FIG. 11 can be obtained by cutting along cutting planes 405a' a layered base element 400' where a protective layer 404b', a reinforcement layer 403b', a layered product portion 402' comprising resin thin film layers and metal thin film layers, a reinforcement layer 403a' and a protective layer 404a' are deposited sequentially, forming external electrodes at the cutting planes and further cutting it along planes corresponding to cutting planes 405b'. In the chip capacitor in this example, the layered product portion 402' has the structure in FIG. 4, and each of the reinforcement layers 403a' and 403b' has the structure in FIG. 9.

Figure 19:
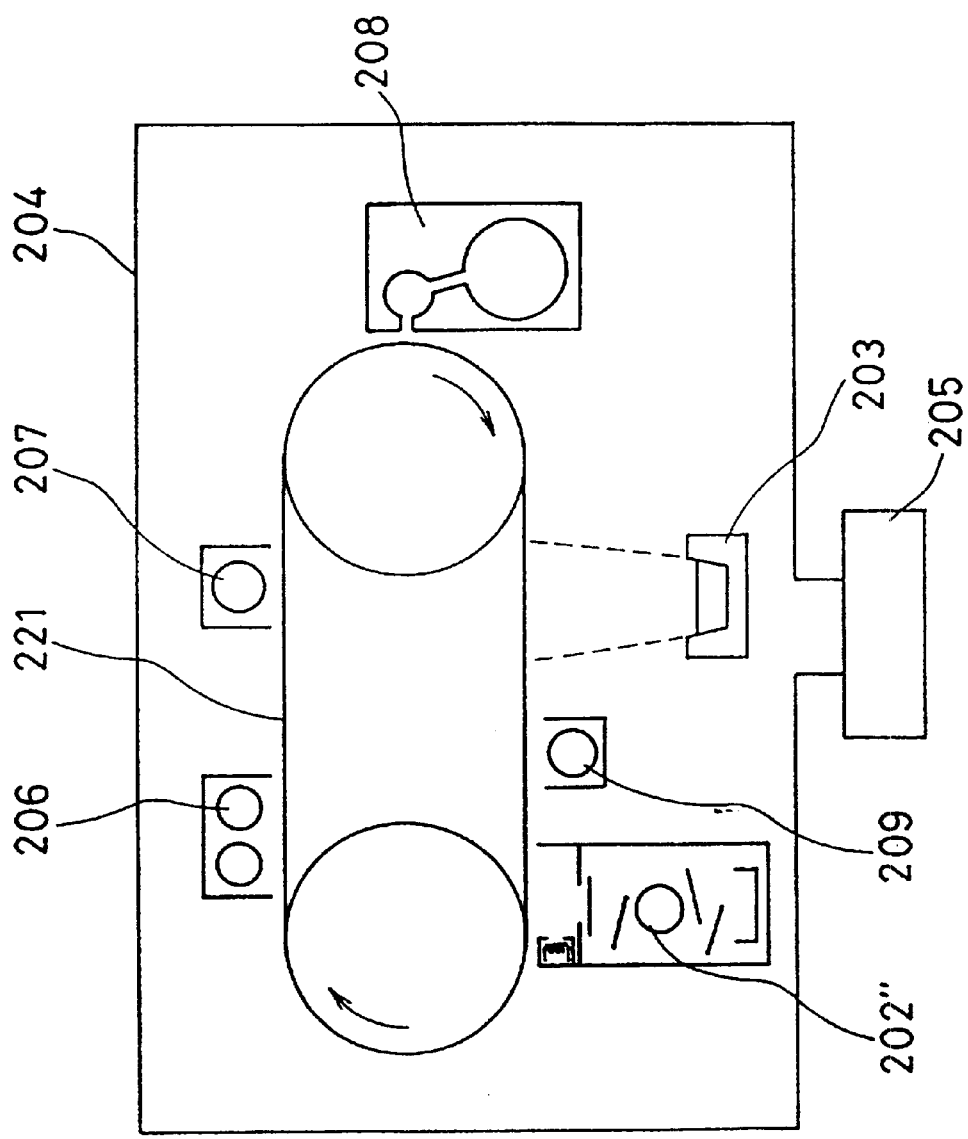
FIG. 19 is a schematic view illustrating another example of a production apparatus for producing the layered product of the first invention.

Although in the apparatus in FIG. 12, the layered product is formed on the cylindrical can roller 201, the supporting base on which the layered product is formed is not limited thereto. For example, the layered product can be formed on a belt-shaped supporting base 221 that rotates along two rolls as shown in FIG. 19. The belt-shaped supporting base 221 can be formed of a metal, a resin, a fabric or a complex of these. Numeral 202" denotes an apparatus for forming a resin thin film, and this apparatus differs from the apparatus 202 for forming a resin thin film shown in FIG. 12 only in the shape of the surrounding wall.

In addition, a rotating disk can be used as the supporting base. In this case, the electrically insulating portions are formed concentrically.

Hereinafter, the first invention of the present invention will be described more specifically by way of examples.

EXAMPLE 1

A chip capacitor as shown in FIG. 11 was produced with the apparatus shown in FIG. 12.

The production method thereof is as follows.

A vacuum container 204 was evacuated to $2 \times 10^{-4}$ Torr, and the circumferential surface of the can roller 201 was maintained at 5° C.

First, a portion that is to serve as the protective layer was deposited on the circumferential surface of the can roller 201. Dimethylol tricyclodecane diacrylate was used as the material of the protective layer, and evaporated so as to be deposited on the circumferential surface of the can roller 201 with the apparatus 202 for forming a resin thin film. The apparatus for forming a resin thin film used was that shown in FIG. 13, and an electron beam irradiation device was used as the device for irradiating a charged particle beam. The driving condition was 3 kV2 mA. Then, a UV curing device was used as the apparatus 206 for curing resin to polymerize and cure the protective layer material deposited in the above-described manner. This operation was repeated by rotating the can roller 201 so that the protective layer having a thickness of 15 $\mu$m was formed on the circumferential surface of the can roller 201.

Then, a portion that is to serve as the reinforcement layer was deposited. The same material as that for the protective layer was used as the resin layer material, and evaporated so as to be deposited on the protective layer with the apparatus 202 for forming a resin thin film. The apparatus for forming a resin thin film used was that shown in FIG. 13, and an electron beam irradiation device was used as the device for irradiating a charged particle beam. The driving condition was 3 kV2 mA. Then, a UV curing device was used as the apparatus 206 for curing resin to polymerize and cure the resin layer material deposited in the above-described manner. The thickness of the thus formed resin layer was 0.4 μm. Thereafter, the surface was treated with oxygen plasma with the apparatus 207 for treating resin surface. Next, a pattering material was applied in a portion corresponding to the electrically insulating band with the apparatus 208 for applying pattering material. A fluorocarbon oil was used as the pattering material, and evaporated and ejected from pinholes having a diameter of 50 μm so as to be deposited in the form of a belt having a width of 150 μm. Then, aluminum was deposited with the apparatus 203 for forming a metal thin film. The deposition thickness was 300 Å, and the film resistance was 3Ω/□. Thereafter, the residual patterning material was removed by heating with a far infrared radiation heater and a plasma discharge treatment using the apparatus 209 for removing patterning material. This operation was repeated 500 times by rotating the can roller 201 so that the reinforcement layer having a total thickness of 215 μm was formed. The movement of the apparatus for applying patterning material in the direction perpendicular to the travel direction of the circumferential surface of the can roller 201 (the direction indicated by arrow 308 in FIG. 16) was performed with the device shown in FIG. 16 in the following pattern. The apparatus was allowed to move 60 μm in one direction when the can roller 201 had rotated one turn, and after the next rotation, the apparatus was allowed to move 60 μm in the reverse direction to return to the original position. This operation was repeated thereafter. The distance Dn between the pinholes 231 of the apparatus for applying patterning material and the adherence surface was controlled to be maintained constantly at 250 to 300 μm.

Next, the layered product portion comprising resin thin film layers and metal thin film layers was deposited. The same material as that for the protective layer and the resin layer was used as the resin thin film layer material, and evaporated so as to be deposited on the reinforcement layer. The apparatus for forming a resin thin film used was that shown in FIG. 13, and an electron beam irradiation device was used as the device for irradiating a charged particle beam. The driving condition was 3 kV2 mA. Then, a UV curing device was used as the apparatus 206 for curing resin to polymerize and cure the resin thin film layer material deposited in the above-described manner. The thickness of the thus formed resin thin film layer was 0.41 μm. Thereafter, the surface was treated with oxygen plasma with the apparatus 207 for treating resin surface. Next, a pattering material was applied in a portion corresponding to the electrically insulating portion with the apparatus 208 for applying pattering material. A fluorocarbon oil was used as the pattering material, and evaporated and ejected from pinholes having a diameter of 50 μm so as to be deposited in the form of a belt having a width of 0.15 mm. Then, aluminum was deposited with the apparatus 203 for forming a metal thin film. The deposition thickness was 250 Å, and the film resistance was 6Ω/□. Thereafter, the residual patterning material was removed by heating with a far infrared radiation heater and a plasma discharge treatment using the apparatus 209 for removing patterning material. This operation was repeated 2000 times by rotating the can roller 201 so that the layered product portion having a total thickness of 850 μm was formed. The movement of the apparatus for applying patterning material in the direction perpendicular to the travel direction of the circumferential surface of the can roller 201 (the direction indicated by arrow 308 in FIG. 16 was performed with the device shown in FIG. 16 in the following pattern. When the can roller 201 had rotated one turn, the apparatus was allowed to move 1000 μm in one direction, and after the next rotation, the apparatus was allowed to move 1000 μm in the reverse direction to return to the original position. This operation was repeated thereafter. The distance Dn between the pinholes 231 of the apparatus for applying patterning material and the adherence surface was controlled to be maintained constantly at 250 to 300 μm.

Next, a reinforcement layer portion having a thickness of 215 μm was formed on a surface of the element layer portion. The method thereof was exactly the same as the method for the reinforcement layer as described above.

Finally, a protective layer portion having a thickness of 15 μm was formed on a surface of the reinforcement layer. The method thereof was exactly the same as the method for the protective layer as described above.

Then, the obtained cylindrical layered product was cut into 8 sections in the radial direction (separated by 45°) and removed. The sections were pressed under heat, and flat layered base elements as shown in FIG. 17 were obtained. The flat layered base elements were cut along the cutting planes 405a, and the cutting planes were metallized with brass so as to form external electrodes. An electrically conducting paste where copper powder had been dispersed in a thermosetting phenol resin was applied to the metallized surface, heat-cured, and the resulting resin surface was plated with molten solder. After that, the pieces were cut along the cutting planes 405b in FIG. 17, and immersed in a silane coupling agent to coat the circumferential surface, whereby chip capacitors as shown in FIG. 11 were obtained. In the obtained chip capacitor in FIG. 11, the layered product portion 101 had the deposition form in FIG. 1, and the reinforcement layer portions 102a and 102b had the deposition form in FIG. 7.

The obtained chip capacitor was dismantled, and the surface roughnesses of the surface of the resin thin film layer deposited on the metal thin film layer of the layered product portion 101, the surface of the resin thin film layer deposited on the electrically insulating portion, and the surface of the metal thin film layer were measured. The results were 0.005 μm, 0.008 μm, and 0.005 μm, respectively. The width of the electrically insulating portion was 150 μm, and the displacement amount din the deposition position of the electrically insulating portion of every other deposition unit was substantially zero. The width of the electrically insulating band of the reinforcement layer was 150 μm and was positioned substantially in the center in the width direction, and the displacement amount d1 in the deposition position of the electrically insulating band of every other adjacent deposition unit was substantially zero. The curing degrees of the resin thin film layer of layered product portion, the resin layer of the reinforcement layer and the protective layer were 95%, 95% and 90%, respectively.

The obtained chip capacitor had a thickness in the deposition direction of 1.3 mm, a depth of 1.6 mm and a width (in the direction between the opposite external electrodes) of 3.2 mm, which was small and yet the capacitance was 0.47 μF. The insulation resistance was $7.5 \times 10^{10} \Omega$, and the withstand voltage was 48V. Furthermore, slight roughness was observed on the upper and lower surfaces in the deposition direction. This was mounted onto a printed circuit board with a solder. There was no problems such as the external electrodes falling off.

EXAMPLES 2 to 5

COMPARATIVE EXAMPLE 1

Chip capacitors were produced in the same manner and with the same apparatuses as those of Example 1, but by changing the material of the resin thin film layer, the deposition thickness, and the drive conditions of the electron beam irradiation device to those shown in Table 1. In Example 3, in addition to the production conditions shown in Table 1, the apparatus for forming a resin thin film was not provided with the shielding plates 217a, 217b, and 217c. Table 1 also shows the characteristics of the obtained chip capacitors.

TABLE 1

| | Resin thin film layer | | Drive condition | Surface roughness Ra ($\mu$m) | | Characteristics of capacitor | |
|---|---|---|---|---|---|---|---|
| | Material | Deposition thickness ($\mu$m) | of electron beam irradiation device | Resin thin film layer | Metal thin film layer | Insulation resistance ($\Omega$) | withstand voltage (V) |
| Ex. 1 | #1 | 0.4 | 3kV2mA | 0.10 | 0.10 | $7.5 \times 10^{10}$ | 48 |
| Ex. 2 | #1 | 0.4 | 3kV5mA | 0.04 | 0.04 | $3.0 \times 10^{11}$ | 55 |
| Ex. 3 | #1 | 0.4 | 3kV5mA | 0.04 | 0.04 | $4.5 \times 10^{8}$ | 35 |
| Ex. 4 | #1 | 0.4 | 3kV20mA | 0.01 | 0.01 | $2.3 \times 10^{12}$ | 70 |
| Ex. 5 | #2 | 0.4 | (absence) | 0.04 | 0.04 | $3.3 \times 10^{11}$ | 60 |
| Com. Ex. 1 | #1 | 0.4 | (absence) | 0.12 | 0.12 | $3.0 \times 10^{6}$ | 8 |

Note: Resin thin film layer materials
1: Dimethylol tricyclodecane diacrylate (viscosity about 150 cps)
2: 1.9 nonane diol diacrylate (viscosity: about 10 cps)

As shown in Table 1, the layered product of Comparative Example 1 where the reactive monomer, which was the resin thin film layer material, was not charged, had large surface roughnesses of the resin thin film layer and the metal thin film layer, resulting in poor insulation resistance and withstand voltage when it was applied to a capacitor.

On the other hand, in some cases as Example 5, a layered product whose surface roughnesses of the resin thin film layer and the metal thin film layer are in the ranges of the present invention can be obtained without charging the reactive monomer, depending on the resin type, for example a different viscosity. In this case, the insulation resistance and withstand voltage were good when it was applied to a capacitor.

When the drive condition of the electron beam irradiation device was made increasingly larger from Examples 1, 2 and 4 in this order, the surface roughnesses of the resin thin film layer and the metal thin film layer became smaller in this order. This may be because a larger drive condition results in a larger amount of the reactive monomer charged. This results in improved insulation resistance and withstand voltage when it was applied to a capacitor.

Furthermore, in the layered product of Example 3, which was produced without the shielding plates of the apparatus for forming a resin thin film, although the surface roughnesses (Ra) of the resin thin film layer and the metal thin film layer were in the ranges of the present invention, abnormal protrusions were formed, resulting in slightly poor insulation resistance and withstand voltage when it was applied to a capacitor.

Regarding the Second Invention

Hereinafter, the second aspect of the present inventions will be described with reference to the accompanying drawings.

Figure 20:
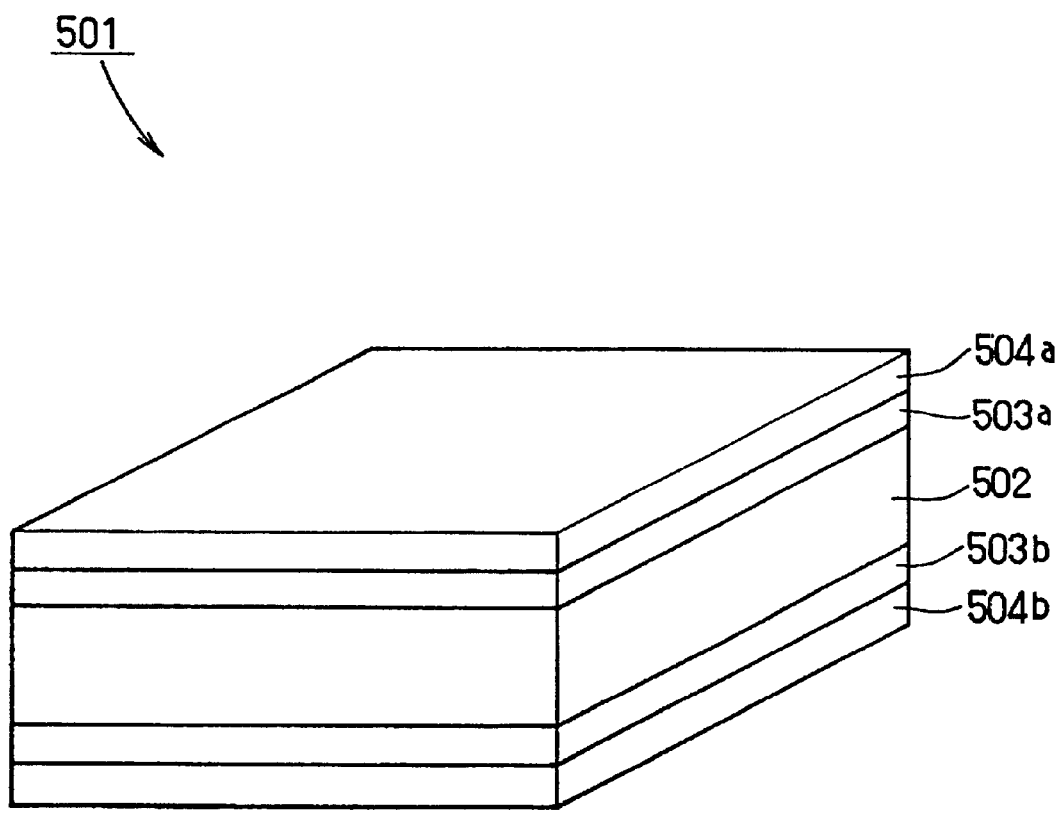
FIG. 20 is a perspective view illustrating the outline of the deposition structure of a first layered product of the second invention.
Figure 21:
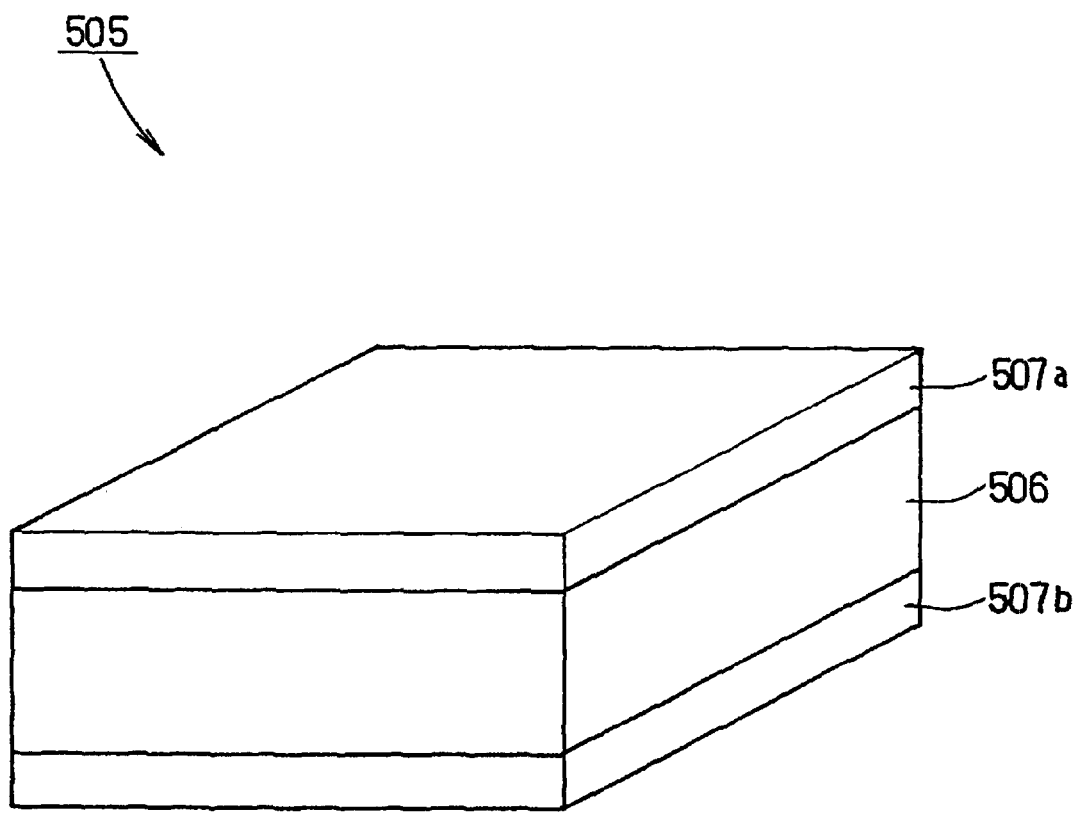
FIG. 21 is a perspective view illustrating the outline of the deposition structure of a second layered product of the second invention.

FIGS. 20 and 21 are perspective views showing the outline of the structure of the deposition of the layered product of the present invention.

A first layered product of the present invention comprises an element layer 502, reinforcement layers 503a and 503b deposited on both sides of the element layer, and protective layers 504a and 504b deposited further on both sides of the reinforcement layers, as shown in FIG. 20.

A second layered product of the present invention comprises an element layer 506, and reinforcement layers 507a and 507b deposited on both sides of the element layer, as shown in FIG. 21.

(Element layer)

The element layers 502 and 506 function as capacitance generation portions where electrostatic charges are stored when the layered product is used as a capacitor. Therefore, the element layers 502 and 506 are required to have either one of the structures A and B described below.

A: A plurality of deposition units, each of which comprises a dielectric layer, a first metal thin film layer and a second metal thin film layer that are deposited on one surface of the dielectric layer and separated by a belt-shaped electrically insulating portion, are deposited in such a manner that the electrically insulating portions of adjacent deposition units are deposited in different positions.

B: A plurality of deposition units, each of which comprises a dielectric layer and a metal thin film layer that is deposited on one surface of the dielectric layer and in a portion except a belt-shaped electrically insulating portion on one end of the surface of the dielectric layer, are deposited in such a manner that the electrically insulating portions of adjacent deposition units are positioned in the opposite sides.

Figure 22:
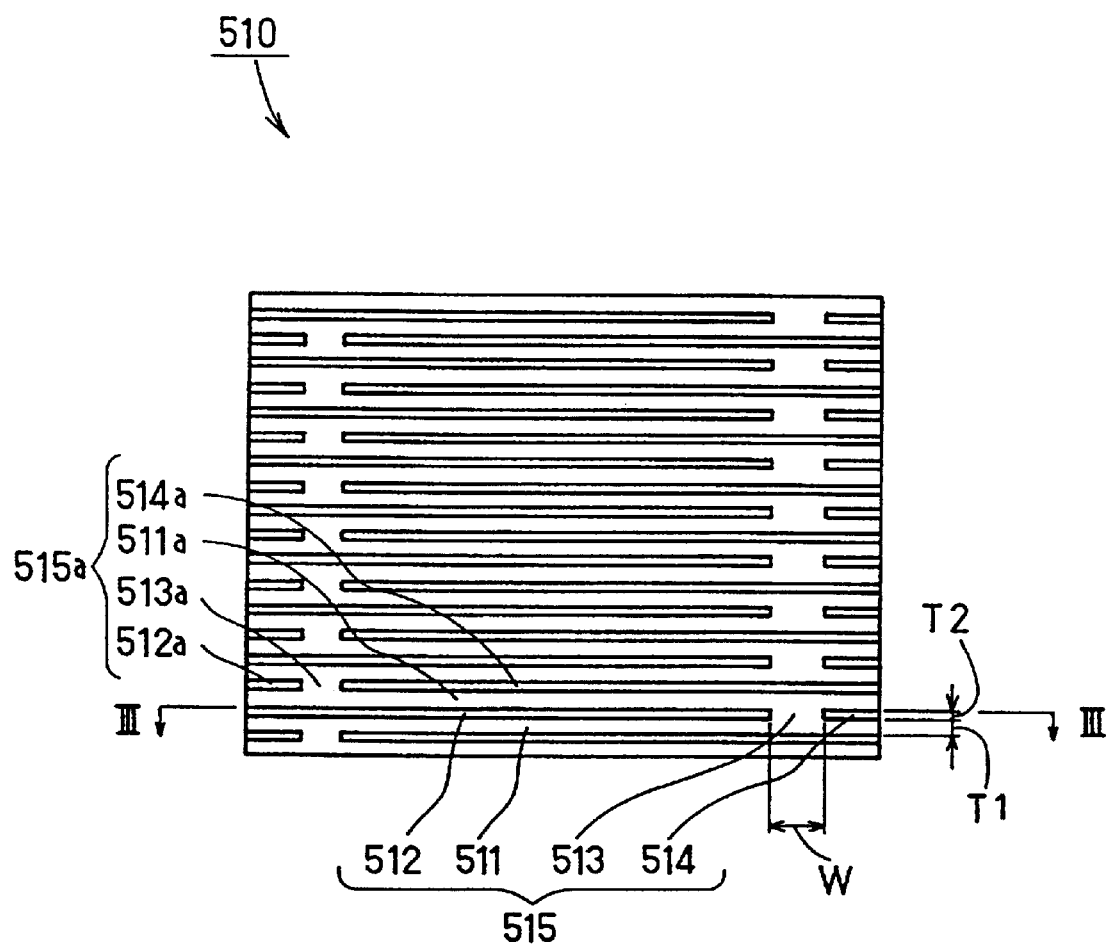
FIG. 22 is a cross-sectional view taken in the thickness direction (deposition direction) schematically illustrating an example of an element layer having a structure A of the layered product of the second invention.

FIG. 22 is a cross-sectional view taken in the thickness direction (deposition direction) schematically illustrating an example of an element layer having the structure A.

An element layer 510 comprises a plurality of deposition units 515, each of which comprises a dielectric layer 511, a first metal thin film layer 512 and a second metal thin film layer 514, that are deposited on the dielectric layer 511. The first metal thin film layer 512 and the second metal thin film layer 514 are separated by a belt-shaped electrically insulating portion 513.

Furthermore, the deposition positions of the electrically insulating portions of adjacent deposition units are required to be different from each other. More specifically, as shown in FIG. 22, in the case where the deposition unit 515 is deposited adjacent to a deposition unit 515a, the electrically insulating portion 513 of the deposition unit 515 is required to be different in the deposition position from an electrically insulating portion 513a of the deposition unit 515a. Thus, sequentially depositing the deposition units having different positions of their electrically insulating portions and forming external electrodes on sides of the layered product produces a capacitor (see FIG. 33). More specifically, an external electrode (not shown) that connects in substantially the same potential between the first metal thin film layer 512 of the deposition unit 515 and the first metal thin film layer 512*a* of the deposition unit 515*a* adjacent thereto, and an external electrode (not shown) that connects in substantially the same potential between the second metal thin film layer 514 of the deposition unit 515 and the second metal thin film layer 514*a* of the deposition unit 515*a* adjacent thereto are provided, and a potential difference is provided between the opposite external electrodes. In this case, the electrically insulating portions 513 and 513*a* of the deposition unit 515 and the deposition unit 515*a* adjacent thereto are located in different positions so as to form a capacitor having the first metal thin film layer 512 of the deposition unit 515 and the second metal thin film layer 514*a* of the deposition unit 515*a* as electrodes and a portion sandwiched by the first metal thin film layer 512 and the second metal thin film layer 514*a* of the dielectric layer 511*a* as a dielectric (capacitance generation portion). Therefore, the phrase, "the deposition positions of the electrically insulating portions of adjacent deposition units are different" means that the deposition positions are different to the extent that allows the capacitance generation portion of the capacitor to be formed as described above. In such a situation, it is preferable to provide the electrically insulating portion in such a manner that the area of the capacitance generation portion becomes as large as possible.

In the above example, portions other than the portion sandwiched by the first metal thin film layer 512 and the second metal thin film layer 512*a* of the dielectric layer 511*a* do not contribute to the formation of the capacitance of the capacitor. Moreover, the second metal thin film layer 514 of the deposition unit 515 and the first metal thin film layer 512*a* of the deposition unit 515*a* do not function as the electrodes of the capacitor. However, the second metal thin film layer 514 of the deposition unit 515 and the first metal thin film layer 512*a* of the deposition unit 515*a* are significant to improve the adhesion strength of the external electrodes. In other words, the adhesion strength depends significantly on the connection strength with the metal thin film layers, and the connection strength with the dielectric layers does not contribute very much. Therefore, although the metal thin film layers do not contribute to the capacitance generation of the capacitor, the presence of the metal thin film layers improves the adhesion strength of the external electrodes significantly when the layered product is applied to the capacitor. The presence of such metal thin film layers is particularly significant in the case of a small layered product, which is intended by the present invention. The external electrodes are formed by metal spraying or the like. The particles of a sprayed metal in this case are relatively large and hardly penetrate between the metal thin film layers in the case of the layered product having very thin dielectric layers as in the present invention. In addition, since the layered product is small, an exposed metal thin film layer portion is very small. Therefore, it is very significant to make the contact area with the external electrodes as large as possible for the purpose of obtaining the adhesion strength of the external electrodes.

Figure 23:
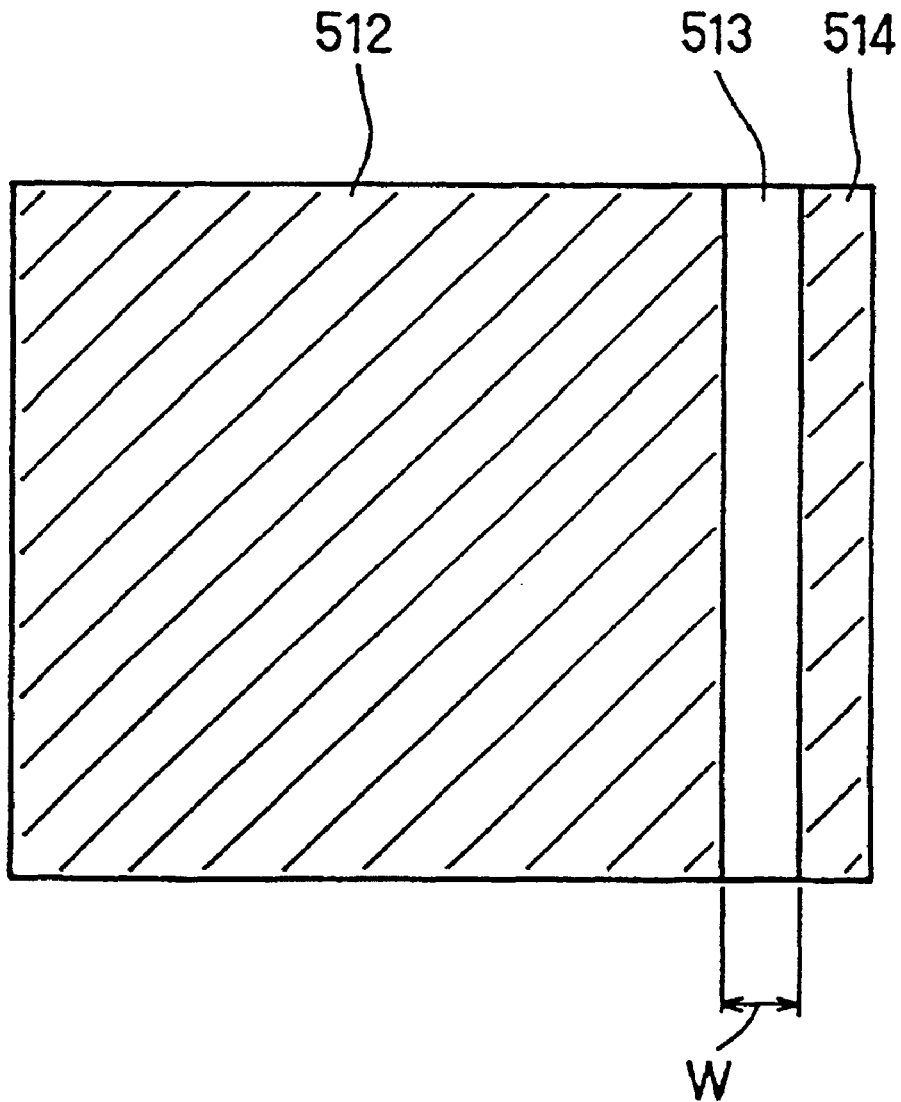
FIG. 23 is a cross-sectional view taken in the arrow direction of line III—III in FIG. 22.

The shape of the electrically insulating portion is a belt shape having a constant width W for ease of the production. FIG. 23 is a cross-sectional view taken along line III—III viewed from the direction of the arrow in FIG. 22. The width W of the electrically insulating portion is not limited to a particular value, but preferably is about 0.03 to 0.5 mm, more preferably about 0.05 mm 0.4 mm and most preferably about 0.1 to 0.3 mm. When the width is larger than these ranges, the area of the capacitance generation portion for a capacitor becomes small, so that high capacitance cannot be achieved. On the other hand, a width smaller than these ranges makes it difficult to obtain the electrical insulation or to produce a narrow electrically insulating portion precisely.

Figure 24:
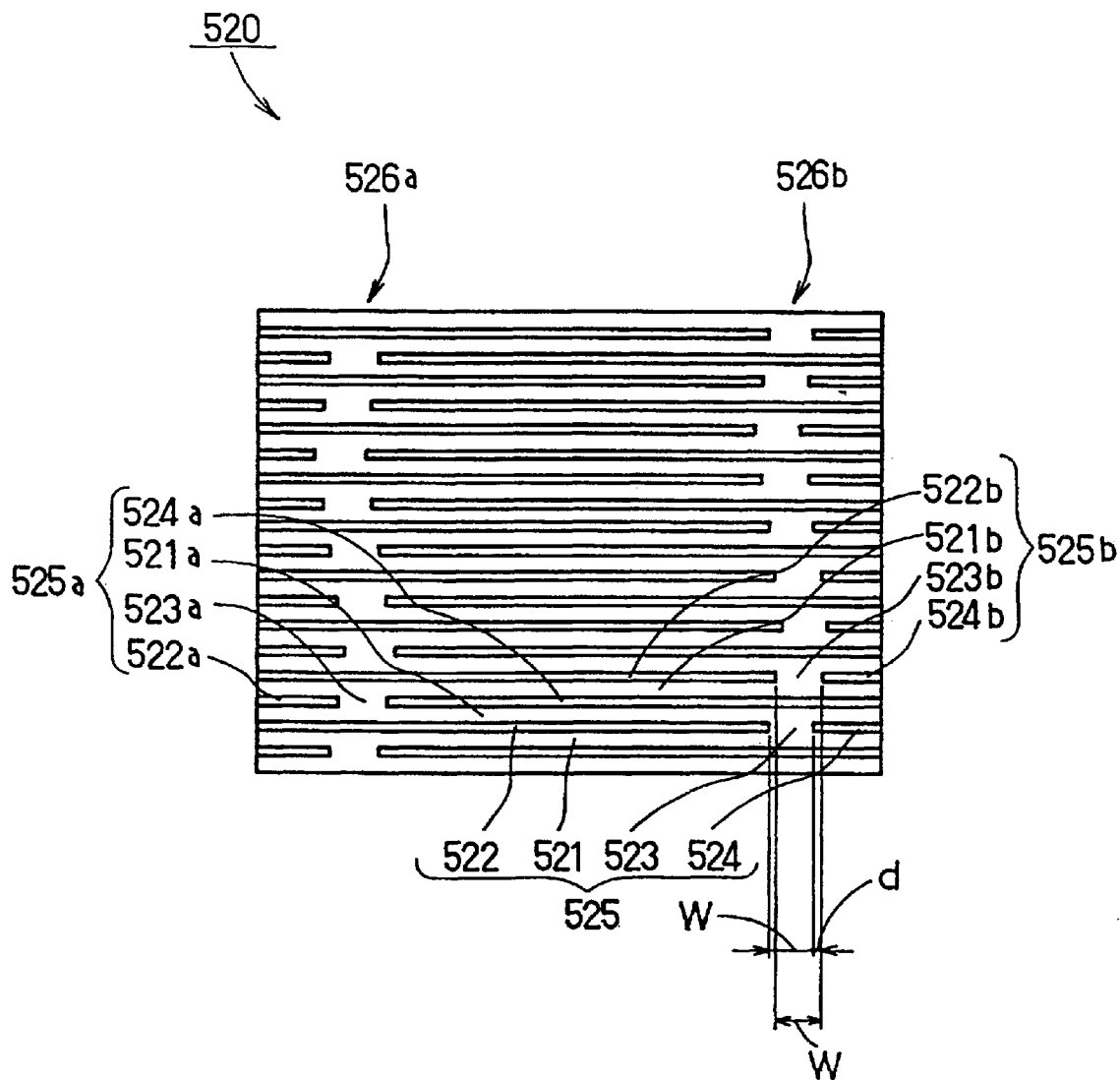
FIG. 24 is a cross-sectional view taken in the thickness direction (deposition direction) schematically illustrating another example of an element layer having a structure A of the layered product of the second invention.

In the case where the element layer has the structure A, it is preferable that the deposition position of the electrically insulating portions of every other deposition unit of the element layer is the same position over the element layer. FIG. 24 is a cross-sectional view taken in the thickness direction (deposition direction) schematically illustrating an example of the element layer having such a structure. More specifically, with respect to an electrically insulating portion 523 of a deposition unit 525, the position of an electrically insulating portion 523*b* of a deposition unit 525*b*, which is one unit apart from the deposition unit 525, is not the same position as that of the electrically insulating portion 523, but is displaced by d in the width direction of the electrically insulating portion. Then, in the same manner, the position of the electrically insulating portion of the deposition unit that is one unit further apart is displaced by d in either direction in the width direction of the electrically insulating portion. Alternatively, the position of the electrically insulating portion of the deposition unit one unit apart is in the same position, and the position of the electrically insulating portion of the deposition unit three units apart can be displaced in the width direction of the electrically insulating portion.

Such displacement of the deposition position of the electrically insulating portion can suppress roughness of the upper and lower surfaces of the element layer, and thus roughness of the upper and lower surfaces of the layered product. In other words, since there are no metal thin film layers in the electrically insulating portion, the thickness of the deposition of this portion is smaller relative to the overall element layer, so that a recess is generated in portions 526*a* and 526*b* on the upper surface of the element layer. This recess may deteriorate the handling properties when mounting the layered product onto a printed circuit board with a solder and may adversely affect the wettability of the solder. In addition, when such a recess is generated, the larger the depth of the recess is, the more difficult it is to apply a patterning material onto the bottom of the recess as described later in the production process of the layered product. Therefore, it is difficult to form a good electrically insulating portion having a constant width. Moreover, the generation of the recess causes inclination of the dielectric layer and the metal thin film layer deposited on the recess at both sides of the electrically insulating portion, so that the thickness of the deposition of the dielectric layer and the metal thin film layer becomes small locally. When the thickness of the deposition of the dielectric layer becomes small locally, the following problem arises. In the case where the layered product is used as a capacitor, the presence of that portion reduces the withstand voltage of the capacitor and causes a short-circuit due to a pin-hole in the dielectric layer. Moreover, when the thickness of the deposition of the metal thin film layer becomes small locally, poor conductivity is likely to occur in that portion.

Figure 25:
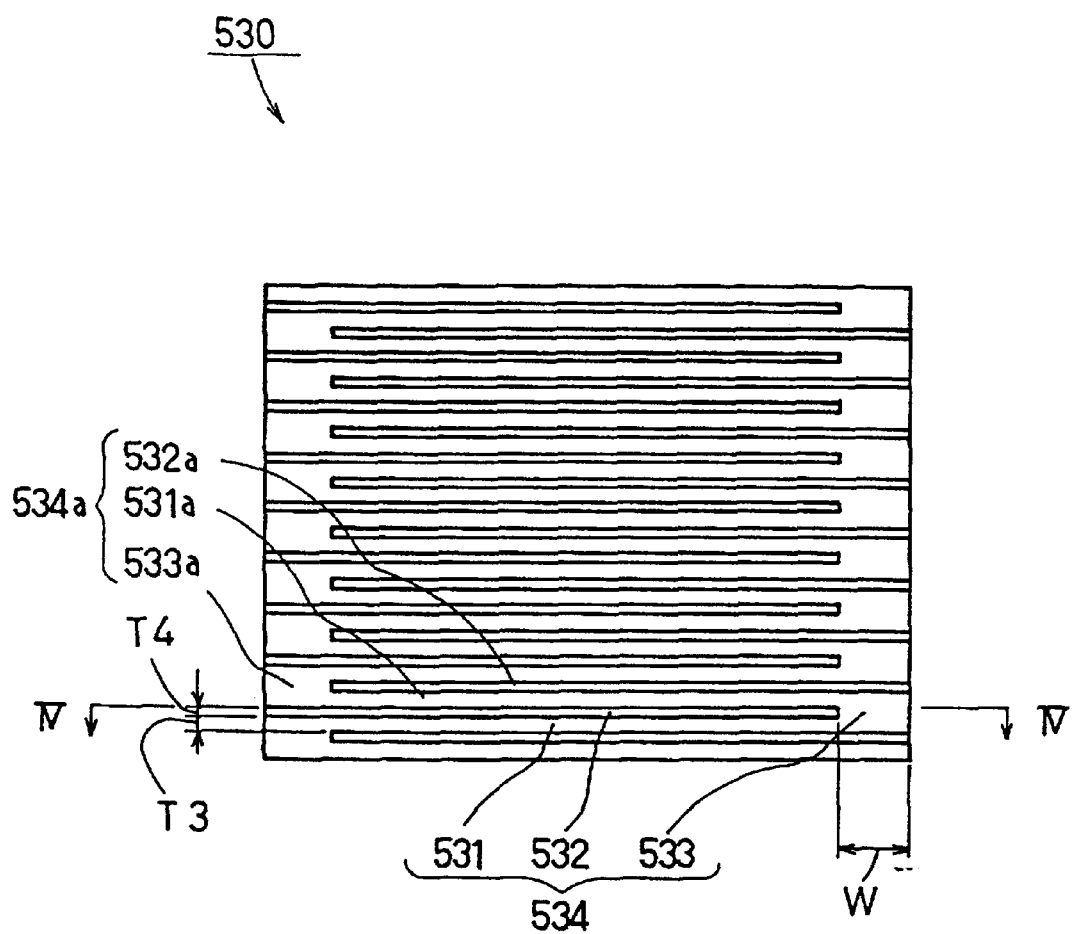
FIG. 25 is a cross-sectional view taken in the thickness direction (deposition direction) schematically illustrating an example of an element layer having a structure B of the layered product of the second invention.

FIG. 25 is a cross-sectional view taken in the thickness direction (deposition direction) schematically illustrating an example of the element layer having the structure B.

An element layer 530 comprises a plurality of deposition units 534, each of which comprises a dielectric layer 531 and a metal thin film layer 532 deposited on one surface of the dielectric layer 531. The metal thin film layer 532 is not provided in a belt-shaped electrically insulating portion 533, which is provided on one end of one surface of the dielectric layer 531.

Furthermore, it is required that the electrically insulating portions of adjacent deposition units are located on the opposite sides. More specifically, as shown in FIG. 25, in the case where a deposition unit 534 is deposited adjacent to a deposition unit 534a, and when an electrically insulating portion 533 of the deposition unit 534 is on the right end of the dielectric layer 531, it is required that an electrically insulating portion 533a in the deposition unit 534a is provided on the left end of a dielectric layer 531a. In this manner, the deposition units are deposited sequentially in such a manner that the electrically insulating portions are located on the opposite sides. Thus, when external electrodes are formed on the side portions of the layered product (see FIG. 33), a capacitor can be formed. In other words, one external electrode is connected to the metal thin film layer 532 of the deposition unit 534, and the other external electrode is connected to the metal thin film layer 532a of the adjacent deposition unit 534a, and an electrical potential difference is provided between the opposite external electrodes. The thus formed capacitor has the metal thin film layer 532 of the deposition unit 534 and the metal thin film layer 532a of the deposition unit 534a as the electrodes, and a portion sandwiched between the metal thin film layer 532 and the metal thin film layer 532a as the dielectric (capacitance generation portion). From such a viewpoint, it is preferable that the width of the electrically insulating portion is as small as possible so as to make the area of the capacitance generation portion as large as possible.

Figure 26:
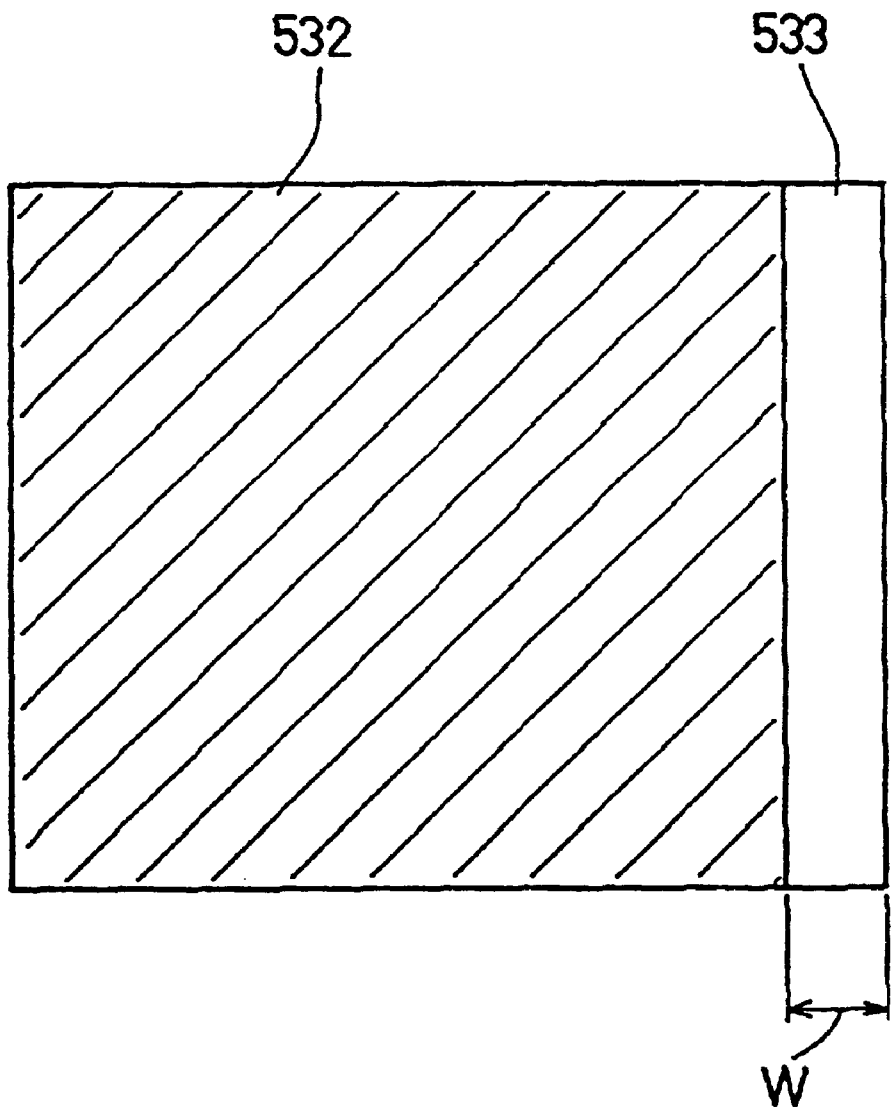
FIG. 26 is a cross-sectional view taken in the arrow direction of line VI—VI in FIG. 25.

The shape of the electrically insulating portion is a belt-shape having a constant width W for ease of the production. FIG. 26 is a cross-sectional view taken along line IV—IV viewed from the arrow direction in FIG. 25. The width W of the electrically insulating portion is not limited to a particular value, but preferably is about 0.03 to 0.5 mm, more preferably about 0.05 to 0.4 mm, and most preferably about 0.1 to 0.3 mm to allow high capacitance of the capacitor, to make sure the electrical insulation and to facilitate the production.

Figure 27:
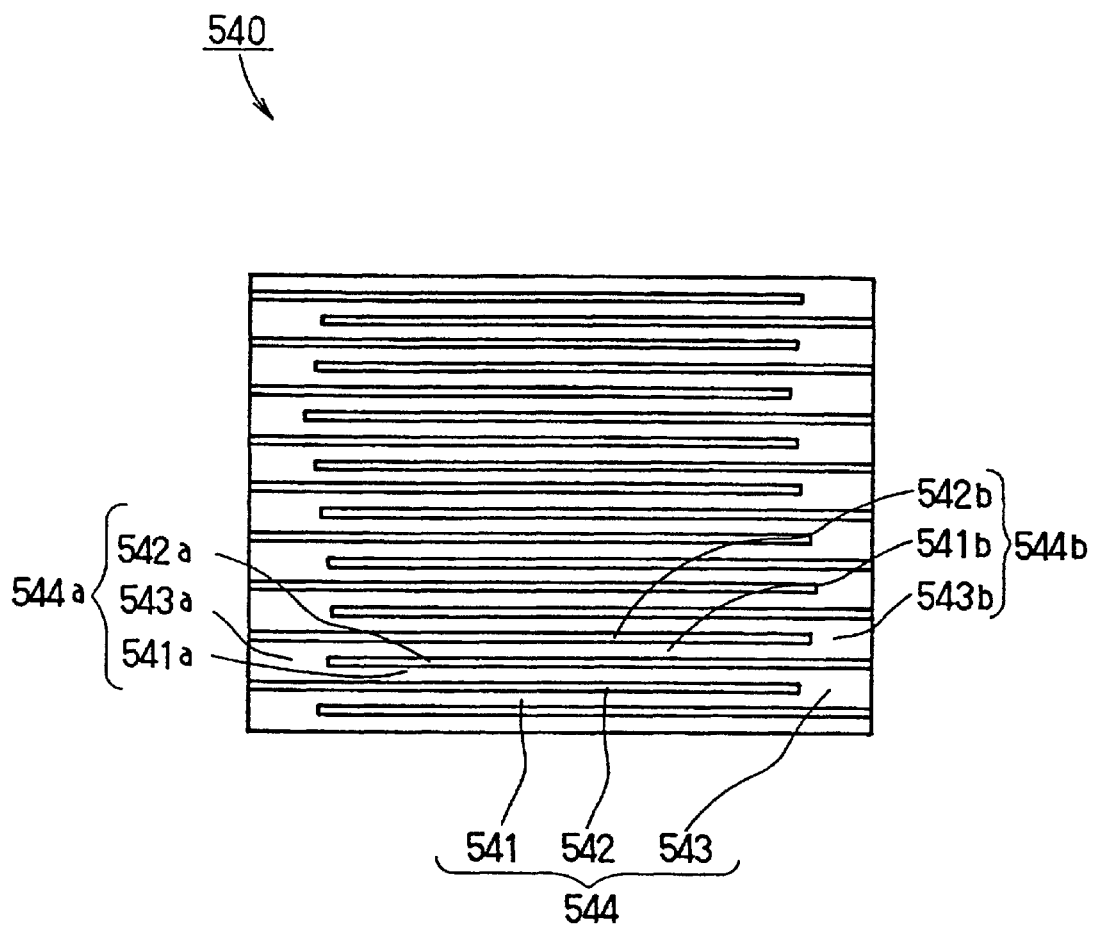
FIG. 27 is a cross-sectional view taken in the thickness direction (deposition direction) schematically illustrating another example of an element layer having a structure B of the layered product of the second invention.

When the element layer has the structure B, it is preferable that all the widths of the belt-shaped electrically insulator of every other deposition unit are not the same over the layered product. FIG. 27 is a cross-sectional view taken in the thickness direction (deposition direction) schematically illustrating one example of the element layer having such a structure. As shown in FIG. 27, with respect to an electrically insulating portion 543 of a deposition unit 544, the width of an electrically insulating portion 543b of a deposition unit 544b, which is one unit apart from the deposition unit 544, is different from that of the electrically insulating portion 543. Thereafter, in the same manner, the width of the electrically insulating portion of the deposition unit that is one unit apart is changed sequentially. Alternatively, the width of the electrically insulating portion is the same as that of the electrically insulating portion of the deposition unit that is one unit apart, and the width of the electrically insulating portion of the deposition unit three units apart can be changed.

When all the widths of the electrically insulating portions are the same, the end portion where the electrically insulating portions are provided has a small number of metal thin film layers. Therefore, the thickness of the deposition of this portion is smaller relative to the overall layered product so that a significant recess is generated on the upper surface of the layered product. This recess may deteriorate the handling properties when mounting the layered product onto a printed circuit board with a solder and may adversely affect the wettability of the solder. In addition, when such a recess is generated, the larger the depth of the recess is, the more difficult it is to apply a patterning material onto the bottom of the recess as described later in the production process of the layered product. Therefore, it is difficult to form a good electrically insulating portion having a constant width. Moreover, the generation of the recess causes inclination of the dielectric layer and the metal thin film layer deposited on the recess at a side of the electrically insulating portion, so that the thickness of the deposition of the dielectric layer and the metal thin film layer becomes small locally. When the thickness of the deposition of the dielectric layer becomes small locally, the following problem arises. In the case where the layered product is used as a capacitor, the presence of that portion reduces the withstand voltage of the capacitor and causes a short-circuit due to a pin-hole in the dielectric layer. Moreover, when the thickness of the deposition of the metal thin film layer becomes small locally, poor conductivity is likely to occur in that portion.

It is required to deposit a plurality of deposition units, each of which comprise the dielectric layer and the metal thin film, whether the element layer has the structure A or B. A capacitor is formed by depositing a plurality of deposition units. The number of depositions is preferably 100 or more, more preferably 1000 or more, even more preferably 2000 or more and most preferably 3000 or more. The larger the number is, the larger capacitance the capacitor can have when used as a capacitor. Furthermore, since the layered product of the present invention has a reinforcement layer and, preferably, a protective layer, even if the dielectric layer is thin, the adhesion strength of the external electrodes is high and is sufficiently resistant against thermal load and external pressure. Therefore, when the thickness of the dielectric layer is thin, the overall thickness is not very large even if the number of depositions is large. Compared with a conventional film capacitor, the thus obtained capacitor has higher capacitance with the same volume, or is smaller with the same capacitance.

The thickness of the dielectric layer (thickness in the capacitance generation portion) T1 (see FIG. 22) or T3 (see FIG. 25) is preferably 1 $\mu$m or less, more preferably 0.7 $\mu$m or less, and most preferably 0.4 $\mu$m or less. A smaller thickness of the dielectric layer (capacitance generation portion) can provide a capacitor having a larger capacitance.

There is no particular limitation regarding the thickness T2 (see FIG. 22) of the first metal thin film layer and the second thin film layer of the element layer having the structure A and the thickness T4 (see FIG. 25) of the metal thin film layer of the element layer having the structure B, but it is preferably 50 nm or less, and more preferably 40 nm or less. There is no particular limitation regarding the lower limit, but it is preferably at least 10 nm, and more preferably at least 20 nm. Furthermore, the film resistance is preferably 2$\Omega/\square$ or more, more preferably 3$\Omega/\square$ or more, and most preferably 5$\Omega/\square$ or more. There is no particular limitation regarding the upper limit, but it is preferably 15$\Omega/\square$ or less, more preferably 10$\Omega/\square$ or less, and most preferably 8$\Omega/\square$ or less. In the case where the element layer has the structure A, the thickness of the first metal thin film layer can be different from that of the second metal thin film, but it is preferable that they are the same thickness for better uniformity of the thickness of the overall layered product.

The ratio T1/T2 or T3/T4 of the thickness T1 (see FIG. 22) or T3 (see FIG. 25) of the dielectric layer to the thickness T2 (see FIG. 22) or T4 (see FIG. 25) of the metal thin film layer of each deposition unit is preferably 20 or less, more preferably 15 or less. The ratio in this range improves the property of self-healing when opposing metal thin film layers are electrically shorted by, for example, a pin-hole in a dielectric layer. The self-healing eradicates defects by burning or leaching of the metal thin film layer due to the overcurrent.

The surface roughness Ra (ten point average roughness) of the dielectric layer is preferably not more than 0.1 µm, more preferably not more than 0.02 µm. The surface roughness Ra (ten point average roughness) of the metal thin film layer is preferably not more than 0.1 µm, more preferably not more than 0.02 µm. If the surface roughness is larger, electric field concentrations occur in small protrusions on the surface, and the dielectric layer may be damaged or the metal thin film layer may be burnt. In a conventional film capacitor, external particles (for example, inorganic particles such as silica or organic particles) are mixed in a film to provide a certain level of surface roughness for the purpose of providing a conveyance property of the film and preventing blocking between films. As long as the present invention adopts the following production method, it is not necessary to mix the external particles for the above reason for the layered product of the present invention, so that a layered product having good electric characteristics can be obtained. The surface roughness Ra (ten point average roughness) of the present invention is measured with a contact-type surface meter having a diamond needle of 10 µm tip diameter and a 10 mg measuring load.

The curing degree of the dielectric layer is preferably 50–95%, more preferably 70–90%. The curing degree means the extent of polymerization and/or cross-linking when the resin is used as the dielectric layer. If the curing degree is below these ranges, the layered product easily can be deformed by external pressure, which occurs for example in the step of pressing in the production process of the layered product or mounting the layered product. This also can lead, for example to ruptures or short-circuits of the metal thin film layer. On the other hand, if the curing degree is above the above ranges, the following problems may arise: Sprayed metal particles hardly penetrate between the metal thin film layers so that the adhesion strength of the external electrodes may be reduced; or the layered product may break, for example when the cylindrical continuous layered product is removed from the can roller in the production process of the layered layer as described later, or pressed into a flat layered base element or when external pressure is applied in the step of mounting the layered product. To determine the curing degree of the present invention, the ratio of the absorbance of the C=O groups and the C=C groups (1600 $cm^{-1}$) is determined with an infrared spectrophotometer, the ratio of each monomer and the cured product is determined, and the curing degree is defined as 1 minus the reduced absorption ratio.

There is no limitation regarding the material of the dielectric layer as long as it can be deposited to a thickness of 1 µm or less and can function as a dielectric satisfactorily, but a material comprising an acrylate resin or a vinyl resin as its main component is preferable. More specifically, a polymer of a polyfunctional (meth) acrylate monomer or polyfunctional vinyl ether monomer is preferable. Of these, for example, a polymer of a dicyclopentadiene dimethanoldiacrylate or cyclohexane dimethanoldivinylether monomer or a polymer of a monomer with substituted hydrocarbon groups is preferable because of their electric properties.

As the material of the metal thin film layer, at least one selected from the group consisting of Al, Cu, Zn, Sn, Au, Ag, and Pt is preferable. Of these, Al is preferable because of its deposition property and cost-efficiency. In some cases, it is preferable to oxidize the surface for the purpose of improving the resistance of the metal thin film layer against humidity. In addition to the metals described above, a small amount of other elements or additives can be contained.

(Reinforcement Layer)

The reinforcement layers 503a and 503b of the first layered product (FIG. 20) of the present invention and the reinforcement layers 507a and 507b of the second layered product (FIG. 21) of the present invention are required to have either one of the structures C and D described below.

C: Comprising a deposition unit comprising a resin layer, a first metal layer and a second metal layer that are deposited on one surface of the resin layer and separated by a belt-shaped electrically insulating band.

D: Comprising a deposition unit comprising a resin layer and a metal layer that is deposited on one surface of the resin layer and in a portion except a belt-shaped electrically insulating band on one end of the surface of the resin layer.

Such a reinforcement layer is effective to prevent the element layer portion from being damaged by thermal load or external pressure in the process of manufacturing the layered product, or in the production process of en electronic component using the same, especially a capacitor, or in the process of mounting the same on a printed circuit board. Moreover, the reinforcement layer that has a metal thin film layer is effective to increase the adhesion strength of the external electrodes (see FIG. 33). That is to say, the adhesion strength of the external electrodes is mainly affected by the strength of the connection with the metal layer, whereas the strength of the connection with the resin layer contributes only little to the adhesion strength. Consequently, by providing a reinforcement layer comprising a metal layer, the adhesion strength of the external electrode of the capacitor can be significantly increased. In the case where the layered product is provided with an external electrode and is used as a capacitor, the reinforcement layer can function as a capacitance generation portion of the capacitor, but the capacitor design can be simplified when it does not function as such.

In the reinforcement layer having either structure C or D, an electrically insulating band is formed on the resin layer. Without the electrically insulating band, the opposite external electrodes would be short-circuited via such a metal layer when the external electrodes (see FIG. 33) are provided facing both the sides of the layered product. The electrically insulating band has a belt shape having a constant width to facilitate production.

In the layered product of the present invention, the reinforcement layer is provided on both sides of the element layer. It is preferable to provide the reinforcement layer on both sides, because protection of an element layer and the adhesion strength of the external electrodes improve more significantly.

The reinforcement layer can be deposited in contact with the element layer or can have another layer therebetween.

The reinforcement layer having either structure C or D comprises only one deposition unit, but it is preferable to deposit a plurality of deposition units in order to exert the effects of the reinforcement layer more significantly.

The thickness (overall thickness on one surface) of the reinforcement layer is preferably 20 µm or more, more preferably 50 to 500 µm, and most preferably 100 to 300 µm to exert the effect of the reinforcement layer sufficiently.

Figure 28:
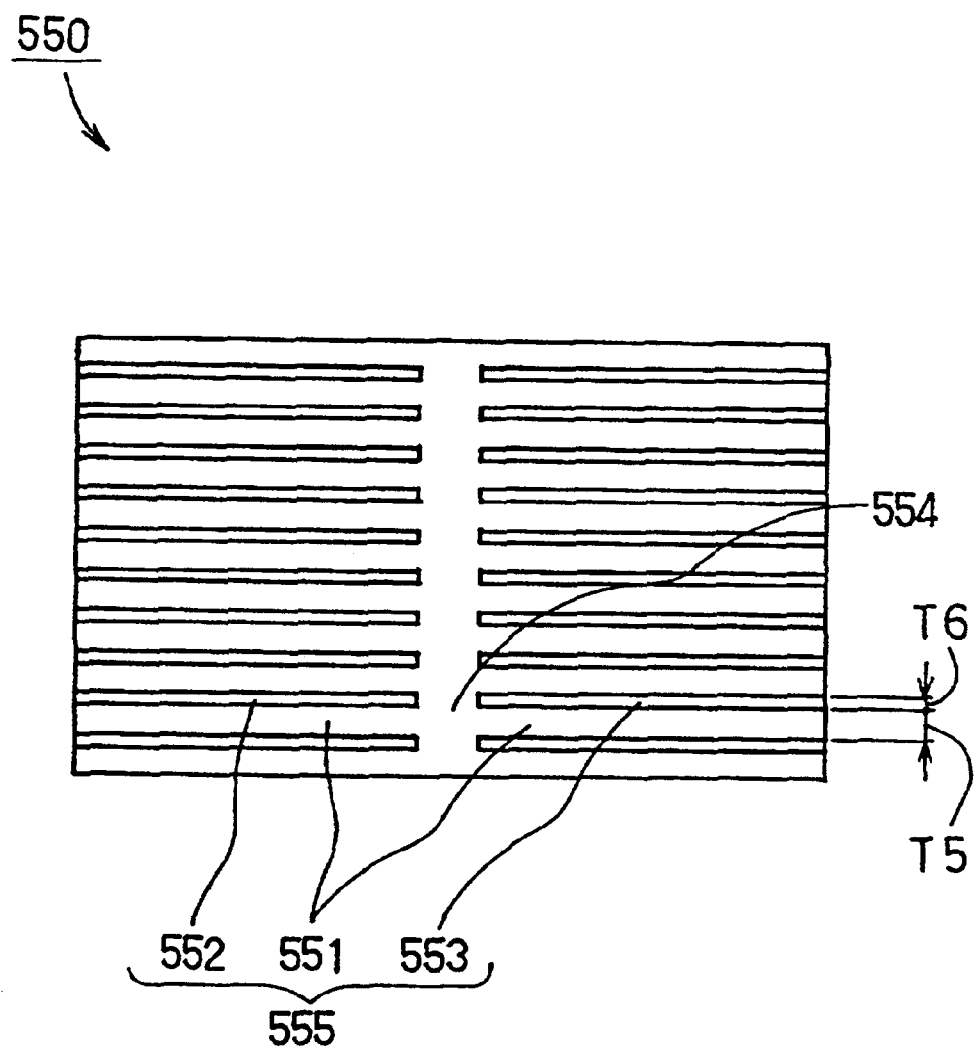
FIG. 28 is a cross-sectional view taken in the thickness direction (deposition direction) schematically illustrating an example of a reinforcement layer where a plurality of deposition units having the structure C are deposited of the layered product of the second invention.

FIG. 28 is a cross-sectional view taken in the thickness direction (deposition direction) schematically illustrating an example of a reinforcement layer where a plurality of deposition units having the structure C are deposited.

A reinforcement layer 550 comprises at least one deposition unit 555 comprising a resin layer 551 and a first metal layer 552 and a second metal layer 553 that are deposited on one surface of the resin layer 551. The first metal layer 552 and the second metal layer 553 are separated by a belt-shaped electrically insulating band 554.

The position in which the electrically insulating band is provided is not limited to a particular position, but it is preferable to provide it substantially in the central portion of the reinforcement layer, as shown in FIG. 28. When it is provided substantially in the same position as the electrically insulating portion of the element layer, a large recess may be generated on the upper surface of the layered product. Therefore, for example in mounting onto a printed circuit board with a solder, the handling properties are poor and the wettability of the solder is adversely affected. In addition, when such a recess is generated, as the depth of the recess is larger, it is more difficult to apply a patterning material to the bottom of the recess as described later. Therefore, it is difficult to form a good electrically insulating portion or electrically insulating band having a constant width. Moreover, the generation of the recess causes inclination of the dielectric layer and the metal thin film layer deposited on the recess at both sides of the electrically insulating portion, so that the thickness of the deposition becomes small. Therefore, a reduction of the withstand voltage as a capacitor, a pin-hole in the dielectric layer and poor conductivity of the metal thin film layers are likely to occur.

Figure 29:
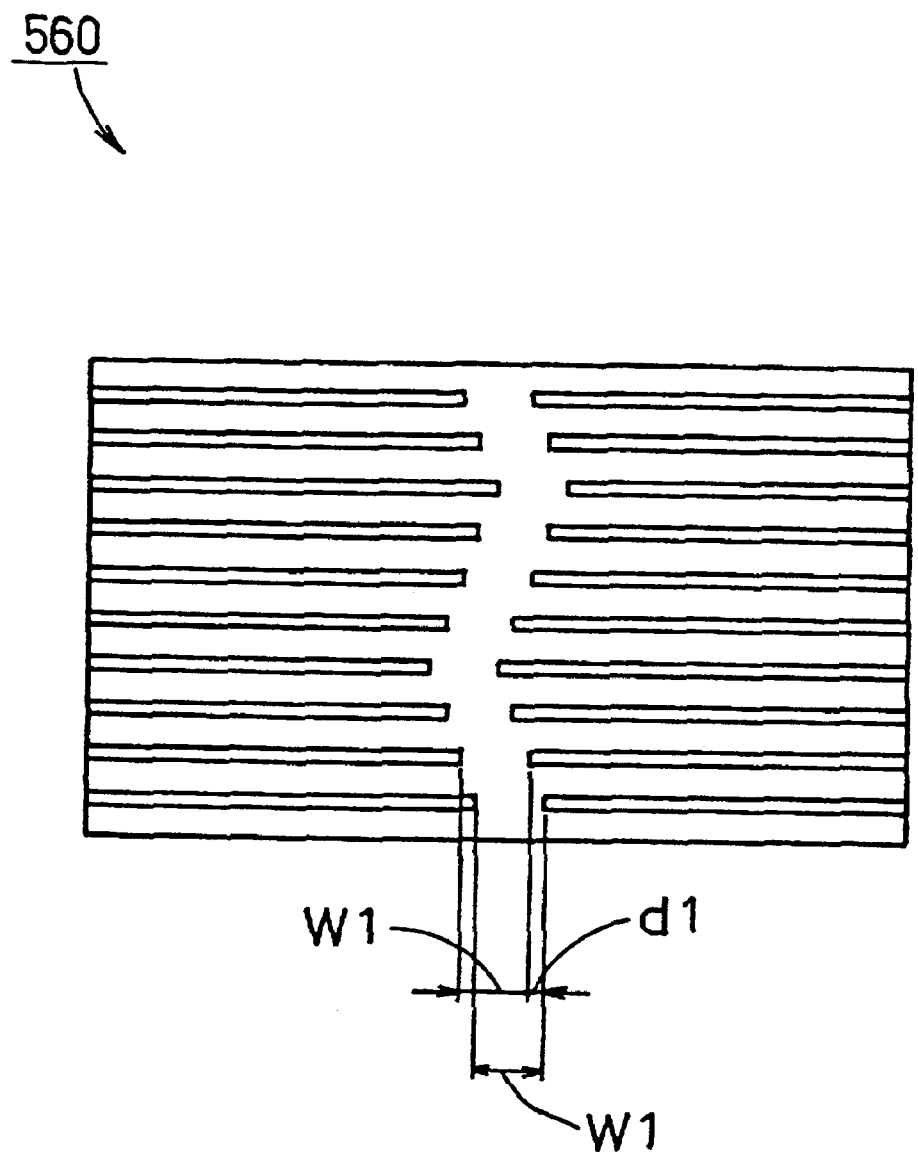
FIG. 29 is a cross-sectional view taken in the thickness direction (deposition direction) schematically illustrating another example of a reinforcement layer where a plurality of deposition units having the structure C are deposited of the layered product of the second invention.

When two or more deposition units as described above are deposited for the reinforcement layer, it is preferable that the deposition positions of the electrically insulating bands are not the same position over the reinforcement layer (the overall reinforcement layer on one side of the element layer). For example, as shown in FIG. 29, the deposition position of the electrically insulating band of the adjacent deposition unit is displaced by d1. Subsequently, the position of the electrically insulating band of the adjacent deposition unit is displaced by d1 in either direction in the width direction of the electrically insulating bands in the same manner. Alternatively, the positions of the electrically insulating bands of two (or more) consecutive deposition units can be the same position, and the position of the electrically insulating band of the third (or more) deposition unit can be displaced in the width direction of the electrically insulating band. When the deposition positions are substantially the same position, a recess may be generated in the electrically insulating band on a surface of the layered product. Therefore, when mounting the layered product onto a printed circuit board with a solder, the handling properties may be poor and the wettability of the solder may be adversely affected. In addition, when such a recess is generated, as the depth of the recess is larger, it is more difficult to apply a patterning material to the bottom of the recess as described later. Therefore, it is difficult to form a good electrically insulating band or electrically insulating portion having a constant width. Moreover, the generation of the recess causes inclination of the dielectric layer and the metal thin film layer deposited on the recess at both sides of the electrically insulating portion of the element layer, so that the thickness of the deposition becomes small. Therefore, a reduction of the withstand voltage as a capacitor, a pin-hole in the dielectric layer and poor conductivity of the metal thin film layers are likely to occur.

On the other hand, when the displacement amount d1 is too large, not only is the effect of eliminating the recess on the upper surface of the layered product insignificant, but also the above-described problems occur due to the generation of the recess on the surface of the layered product when the deposition position of the electrically insulating band matches the deposition position of the electrically insulating portion. Moreover, when the first metal layer and the second metal layer of adjacent deposition units overlap, the overlapped portion forms a capacitor, which may cause a problem in the design of the capacitance or the like.

Figure 30:
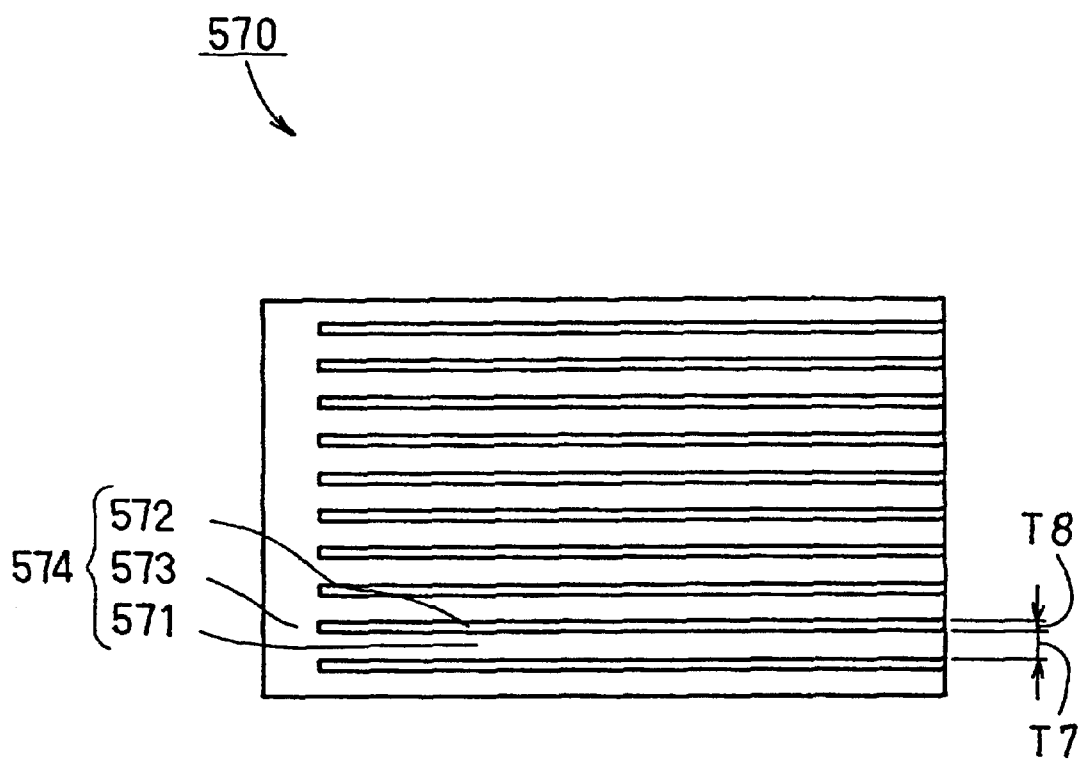
FIG. 30 is a cross-sectional view taken in the thickness direction (deposition direction) schematically illustrating an example of a reinforcement layer where a plurality of deposition units having the structure D are deposited of the layered product of the second invention.

FIG. 30 is a cross-sectional view taken in the thickness direction (deposition direction) schematically illustrating an example of a reinforcement layer comprising a plurality of deposition units having the structure D.

A reinforcement layer 570 of this example includes a plurality of deposition units 574 comprising a resin layer 571 and a metal layer 572 deposited on one surface of the resin layer. A metal layer is not provided in a belt-shaped electrically insulating band portion 573 on one end of a surface of the resin layer.

Figure 31:
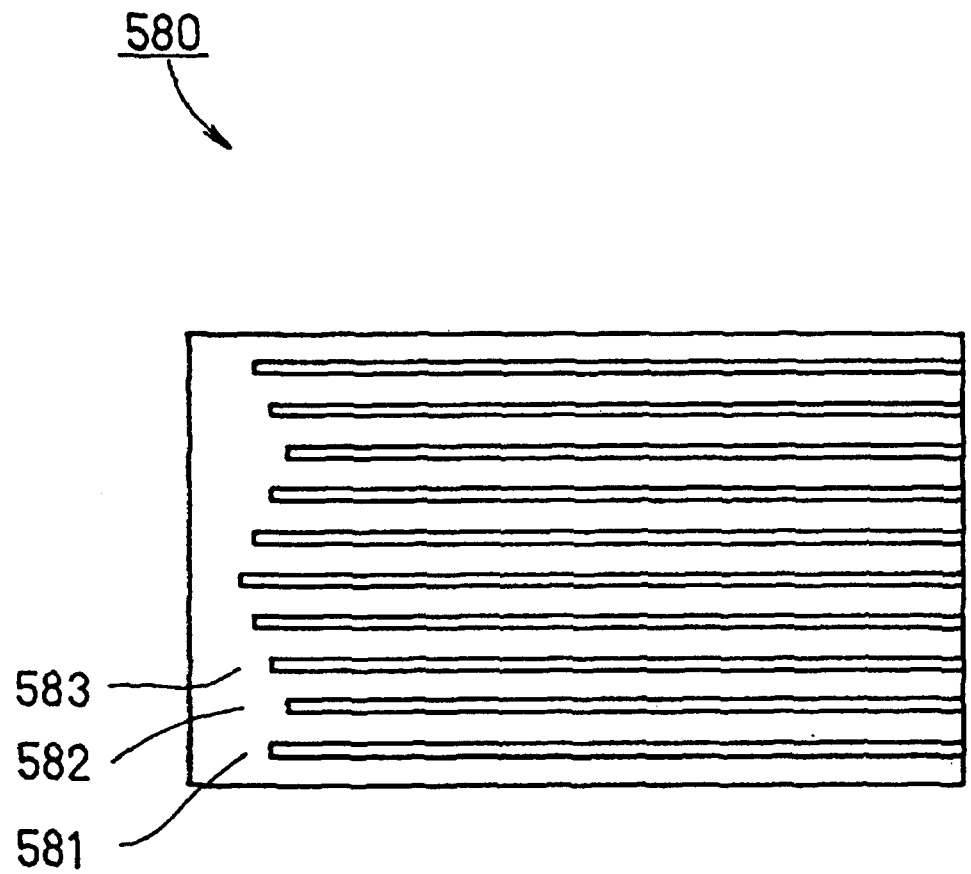
FIG. 31 is a cross-sectional view taken in the thickness direction (deposition direction) schematically illustrating another example of a reinforcement layer where a plurality of deposition units having the structure D are deposited of the layered product of the second invention.

When two or more deposition units having the structure D of the reinforcement layer are deposited, it is preferable that the widths of the electrically insulating bands are not the same over the reinforcement layer (the overall reinforcement layer on one side of the element layer). For example, as shown in FIG. 31, with respect to an electrically insulating band 581, the width of an electrically insulating band 582 of an adjacent deposition unit is changed and further the width of an electrically insulating band 583 of an adjacent deposition unit is changed. Subsequently, the widths of the electrically insulating bands are changed sequentially in the same manner. Alternatively, the widths of the electrically insulating bands of two (or more) consecutive deposition units can be the same, and the width of the electrically insulating band of the third (or more) deposition unit can be changed.

When all the widths of the electrically insulating bands are the same, the number of deposited metal thin film layers is small in the end portion where the electrically insulating bands are formed so that the deposition thickness in this portion is small relative to the overall layered product. Thus, a significant recess may be generated on an upper surface of the layered product. This recess may deteriorate the handling properties when mounting the layered product onto a printed circuit board with a solder and may adversely affect the wettability of the solder. In addition, when such a recess is generated, as the depth of the recess is larger, it is more difficult to apply a patterning material to the bottom of the recess as described later. Therefore, it is difficult to form a good electrically insulating band or electrically insulating portion having a constant width. Moreover, the generation of the recess causes inclination of the dielectric layer and the metal thin film layer deposited on the recess at a side of the electrically insulating portion of the element layer, so that the thickness of the deposition of the dielectric layer and the metal thin film layer becomes small locally. When the thickness of the deposition of the dielectric layer becomes small locally, the following problem arises. In the case where the layered product is used as a capacitor, the presence of that portion reduces the withstand voltage of the capacitor and causes a short-circuit due to a pin-hole in the dielectric layer. Moreover, when the thickness of the deposition of the metal thin film layer becomes small locally, poor conductivity is likely to occur in that portion.

The reinforcement layer does not necessarily form a capacitor generation portion as a capacitor when external electrodes are formed, but can be adapted to form the capacitance generation portion.

Figure 32:
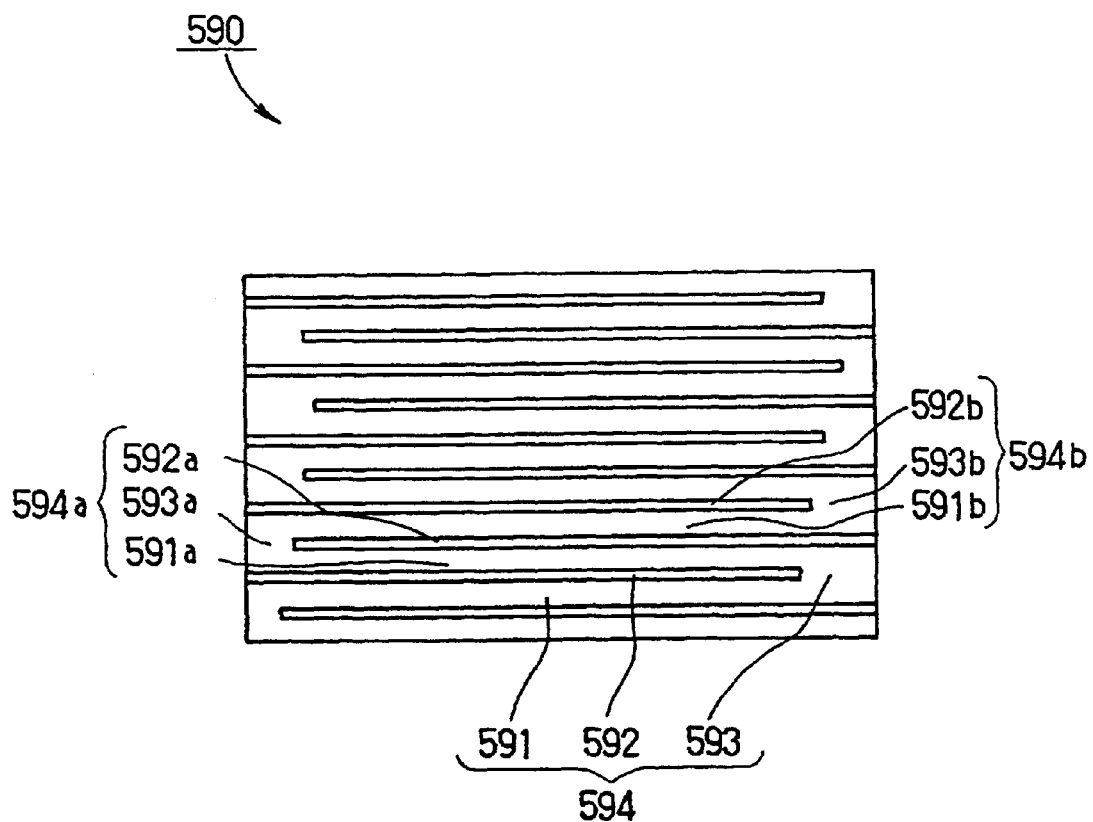
FIG. 32 is a cross-sectional view taken in the thickness direction (deposition direction) schematically illustrating still another example of a reinforcement layer where a plurality of deposition units having the structure D are deposited of the layered product of the second invention.

FIG. 32 is a cross-sectional view taken in the thickness direction (deposition direction) schematically illustrating an example of the reinforcement layer provided with a function as a capacitance generation portion of the capacitor.

A reinforcement layer 590 comprises a plurality of deposition units 594, each of which comprises a resin layer 591 and a metal layer 592 deposited on one surface of the resin layer. The metal layer 592 is not provided in a belt-shaped insulating band 593 on one end of the one surface of the resin layer. Furthermore, the electrically insulating bands of adjacent deposition units are positioned on opposite sides. More specifically, as shown in FIG. 32, in the case where a deposition unit 594*a* is deposited adjacent to the deposition unit 594, the electrically insulating band 593 of the deposition unit 594 is provided on the right end of the resin layer 591, an electrically insulating band 593*a* of the deposition unit 594*a* is provided on the left end of a resin thin film layer 591*a*. In this manner, the deposition units are deposited sequentially in such a manner that the positions of the electrically insulating portions are located on the opposite sides. Thus, when external electrodes are formed on the side portions of the layered product (see FIG. 33), the reinforcement layer can function as a capacitor generation portion.

In this case, it is preferable that the widths of the electrically insulating bands of every other deposition unit of the reinforcement layer are not the same over the reinforcement layer. More specifically, as shown in FIG. 32, with respect to the electrically insulating band 593 of the deposition unit 594, the width of an electrically insulating band 593*b* of the deposition unit 594*b*, which is one unit apart from the deposition unit 594, is different from that of the electrically insulating band 593. Thereafter, in the same manner, the width of the electrically insulating portion of the deposition unit that is one unit apart is changed sequentially. Alternatively, the width of the electrically insulating portion is the same as that of the electrically insulating portion of the deposition unit that is one unit apart, and the width of the electrically insulating portion of the deposition unit three units apart can be changed. This embodiment can prevent a recess from being generated on the upper surface of the element layer, so that the above problems hardly occur.

In the case where the resin layer is adapted to function as a capacitor generation portion of the capacitor, the deposition structure in FIGS. 22, 24 and 25 shown as the deposition structure of the element layer can be used instead of the structure in FIG. 32.

The materials for the resin layer and the metal layer of the reinforcement layer are not limited to particular materials, regardless of the structure C or D. However, the materials used for the dielectric layer and the metal thin film layer are preferable for the resin layer and the metal layer, respectively, in view of production efficiency. On the other hand, in some cases, materials different from those for the dielectric layer and the metal thin film layer are preferable for the purpose of adjusting the adhesion strength with external electrodes or adjusting the curing degree or the mechanical strength of the overall layered product or the like.

The curing degree of the resin layer of the reinforcement layer is preferably 50–95%, more preferably 70–90%. If the curing degree is smaller than these ranges, the layered product can be deformed easily, for example by an external pressure applied in a pressing step during production of the layered product or in a process for mounting the layered product. On the other hand, if the curing degree is larger than these ranges, sprayed metal particles hardly penetrate between the metal layers during formation of external electrodes so that the adhesion strength of the external electrodes becomes weak. Other problems such as cracking may arise, for example in the case where a cylindrical continuous layered product is removed from a can roller in the production process of the layered product, which will be described later, in the case where a flat layered base element is obtained by pressing, or in the case where an external pressure is applied in a process for mounting the layered product.

The thickness of the resin layer T5 (FIG. 28) and T7 (FIG. 30) is preferably 0.1 to 1 $\mu$m, and more preferably 0.1 to 0.6 $\mu$m. The thickness of the metal layer T6 (FIG. 28) and T8 (FIG. 30) is preferably 100 to 500 Å, and more preferably 200 to 400 Å. The film resistance is preferably 1 to 10$\Omega$/□, and more preferably 2 to 6$\Omega$/□. In the case of FIG. 28, the thickness of the first metal layer can be different from that of the second metal layer, but the same thickness is preferable because a uniform thickness of the overall layered product can be obtained.

(Protective Layer)

The first layered product (FIG. 20) of the present invention is provided further with protective layers 504*a* and 504*b* on both sides of the reinforcement layer described above.

The protective layer is intended to prevent the element layer portion 502 from being damaged by thermal load or external pressure in the production process of the layered product, in the production process of an electronic component using the same, especially a capacitor, or in a process of mounting the same onto a printed board. Furthermore, with respect to improvement of the adhesion strength of the external electrodes, although the contribution level is smaller than that of the metal thin film layer or the metal layer, the protective layer provides a certain effect.

The protective layers 504*a* and 504*b* are required to be provided on both sides of the reinforcement layers 503*a* and 503*b* to achieve sufficient protection of the element layer portion 502. The protective layer can be in contact with the reinforcement layer or have another layer therebetween.

The thickness of the protective layer is not limited to a particular value and can be determined suitably depending on the environment to which the layered product is exposed. However, in order to provide the above-described effect sufficiently, the thickness is preferably 2 $\mu$m or more, more preferably 2 to 100 $\mu$m, and most preferably 4 to 30 $\mu$m.

The material for the protective layer is not limited to a particular material, but when the material used for the dielectric layer and/or the resin layer is used, the production efficiency can be improved. On the other hand, a material different from that used for the dielectric layer and/or the resin layer can be used to provide a specific function for the protective layer. For example, epoxy ester such as 2-hydroxy-3-phenoxypropyl acrylate is preferable for better adhesion between the protective layer and the reinforcement layer.

The curing degree of the protective layer is preferably 50–95%, more preferably 70–90%. If the curing degree is smaller than these ranges, the layered product can be deformed easily, for example by an external pressure applied in a pressing step during production of the layered product or in a mounting process of the layered product. On the other hand, if the curing degree is larger than these ranges, problems such as cracking may arise in the case where a cylindrical continuous layered product is removed from a can roller in the production process of the layered product, which will be described later, in the case where a flat layered base element is obtained by pressing, or in the case where an external pressure is applied in a mounting step of the layered product.

The protective layer can be colored to a specific color. This allows an improvement in accuracy of pattern recognition when mounting the layered product on a printed circuit board as an electronic component or facilitates the identification of each product. For example, coloring can be performed by mixing a colorant such as a pigment or coating the outer surface with a paint. Moreover, the protective layer can be made transparent, if necessary.

The protective layer is not indispensable to the second layered product (FIG. 21) of the present invention. However, the second layered product is required to satisfy at least one of E and F described below.

E: The thickness of the dielectric layer is different from that of the resin layer.

F: The thickness of the metal thin film layer is different from that of the metal layer.

More specifically, the thickness T1 (FIG. 22) or T3 (FIG. 25) of the dielectric layer of the element layer is required to be different from the thickness T5 (FIG. 28) or T7 (FIG. 30) of the resin layer of the reinforcement layer. In particular, it is preferable that the thickness T5 (FIG. 28) or T7 (FIG. 30) of the resin layer of the reinforcement layer is larger than the thickness T1 (FIG. 22) or T3 (FIG. 25) of the dielectric layer of the element layer.

Furthermore, the thickness T2 (FIG. 22) or T4 (FIG. 25) of the metal thin film layer of the element layer is required to be different from the thickness T6 (FIG. 28) or T8 (FIG. 30) of the metal layer of the reinforcement layer. In particular, it is preferable that the thickness T6 (FIG. 28) or T8 (FIG. 30) of the metal layer of the reinforcement layer is larger than the thickness T2 (FIG. 22) or T4 (FIG. 25) of the metal thin film layer of the element layer.

As described above, the reinforcement layer is provided for the purpose of protecting the element layer and improving the adhesion strength of the external electrodes. The protective layer is provided mainly for the purpose of protecting the element layer and with some expectation for the effect of improving the adhesion strength of the external electrodes. Therefore, in the second layered product (FIG. 21) of the present invention that is not provided with the protective layer, the reinforcement layer is required to function as the protective layer as well. Thus, it is useful to change the thickness of each layer of the element layer portion and the reinforcement layer portion. In particular, making the thickness of the resin layer or the metal layer of the reinforcement layer larger than that of the dielectric layer or the metal thin film layer of the element layer is effective for protection of the element layer and improvement of the external electrodes. In other words, the larger the thickness of the resin layer or the metal layer of the reinforcement layer is, the more effectively a buffer function against external pressure or thermal stress is provided. Furthermore, the external electrodes are formed by metal spraying, and the particles of the sprayed metal are relatively rough so that the particles hardly penetrate between the metal thin film layers of the element layer. However, the thickness of the dielectric layer cannot be large to ensure the capacitance for a capacitor. Therefore, making the thickness of the resin layer of the reinforcement layer large facilitates the penetration of the sprayed metal and improves the adhesion strength of the external electrodes easily. Furthermore, the larger the area of the metal layer exposed to the side is, the larger the contact area with the external electrodes is. Therefore, the adhesion strength of the external electrodes can be improved by making the thickness of the metal layer of the reinforcement layer large.

Therefore, also for the first layered product (FIG. 20) of the present invention that is provided with the protective layer, it is preferable that the thickness T1 (FIG. 22) or T3 (FIG. 25) of the dielectric layer of the element layer is different from the thickness T5 (FIG. 28) or T7 (FIG. 30) of the resin layer of the reinforcement layer. In particular, it is preferable that the thickness T5 (FIG. 28) or T7 (FIG. 30) of the resin layer of the reinforcement layer is larger than the thickness T1 (FIG. 22) or T3 (FIG. 25) of the dielectric layer of the element layer. Furthermore, it is preferable that the thickness T2 (FIG. 22) or T4 (FIG. 25) of the metal thin film layer of the element layer is different from the thickness T6 (FIG. 28) or T8 (FIG. 30) of the metal layer of the reinforcement layer. In particular, it is preferable that the thickness T6 (FIG. 28) or T8 (FIG. 30) of the metal layer of the reinforcement layer is larger than the thickness T2 (FIG. 22) or T4 (FIG. 25) of the metal thin film layer of the element layer in view of the protection of the element layer and the improvement of the adhesion strength of the external electrodes.

In the first and second layered products (FIGS. 20 and 21) of the present invention, the element layer has either one of the structures A and B and the reinforcement layer has either one of the structures C and D. Therefore, the deposition structure can be one of four combinations and any combination can be used and determined suitably based on the intended application of the layered product or required characteristics.

For example, in the case where the adhesion strength of the external strength is particularly required, it is preferable to choose A as the element layer and C as the reinforcement layer. This is because the adhesion strength of the external electrodes depends significantly on the connection strength with the metal thin film layer or the metal layer, and the connection strength with the dielectric layer or the resin thin film layer does not significantly contribute to it. Therefore, selecting A and C that have a larger number of metal thin film layers and metal layers improves the adhesion strength of the external electrodes significantly.

In order to obtain large capacitance for a capacitor, it is preferable to choose B as the element layer, because this allows a larger area of the dielectric layer that provides a capacitance generation portion.

Furthermore, for convenience of production, in many cases, it is preferable to choose C as the reinforcement layer when A is chosen as the element layer, and to choose D as the reinforcement layer when B is chosen as the element layer.

(External Electrodes)

The layered products of the first and second layered products of the present invention can be used as an electronic component or the like easily by forming external electrodes on both sides thereof that are opposed to each other.

Figure 33:
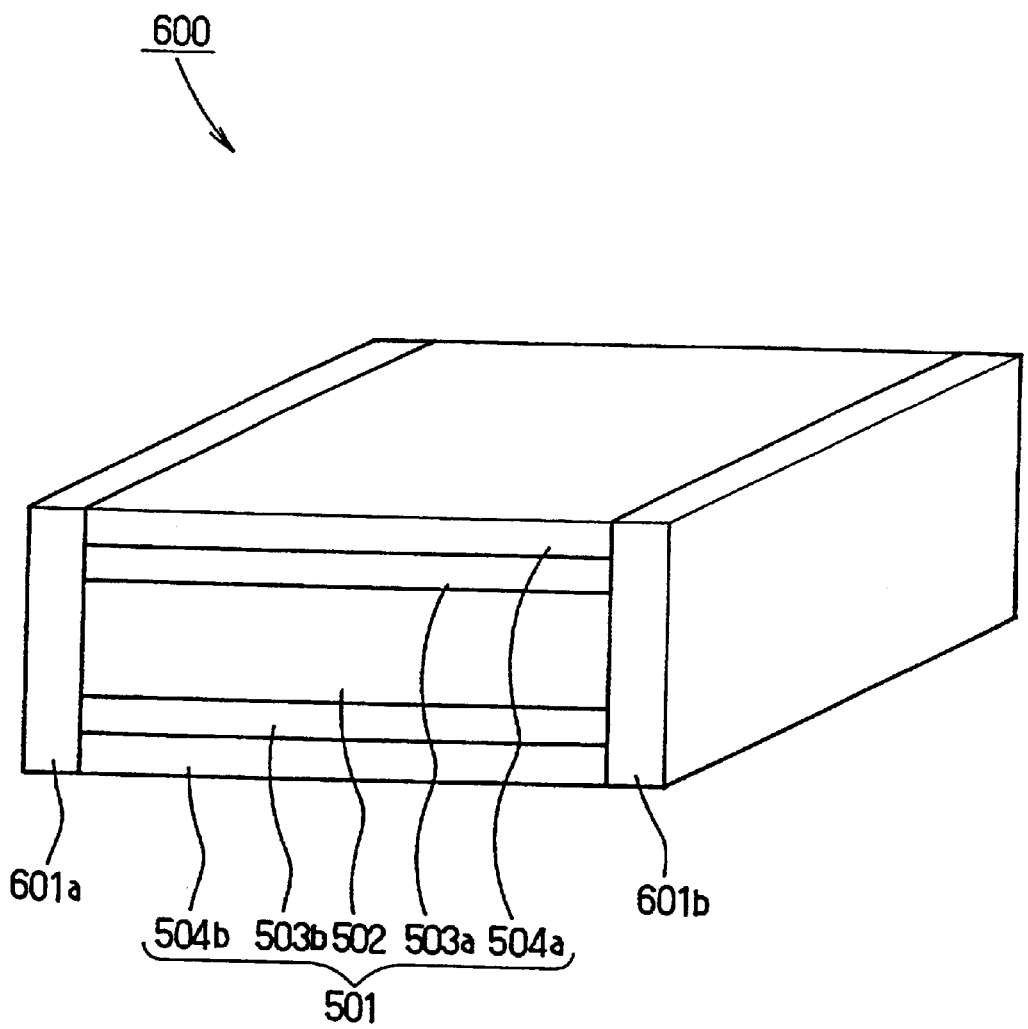
FIG. 33 is a schematic perspective view of an example where external electrodes are formed in the first layered product (FIG. 20) of the second invention.

FIG. 33 is a schematic perspective view of an example where external electrodes are formed in the first layered product (FIG. 20) of the second invention. In the case where the element layer 502 has the structure A, the first metal thin film layer and the second metal thin film layer are electrically connected to external electrodes 601*a* and 601*b*, respectively. In the case where the element layer 2 has the structure B, the metal thin film layers of adjacent deposition units are electrically connected to external electrodes 601*a* and 601*b* alternately. Similarly, in the case where the reinforcement layers 503*a* and 503*b* have the structure C, the first metal layer and the second metal layer are electrically connected to external electrodes 601*a* and 601*b*, respectively. In the case where the reinforcement layers 503*a* and 503*b* have the structure D, the metal layers are electrically connected to either one of the external electrodes 601*a* and 601*b* in the case of the deposition forms in FIGS. 30 and 31, and the metal layers of adjacent deposition units are electrically connected to the external electrodes 601*a* and 601*b* alternately in the case of the deposition forms in FIG. 32.

Also in the case where the external electrodes are to be formed in the second layered product (FIG. 21) of the present invention, the metal thin film layer and the metal layer are electrically connected to both external electrodes, as in the case of FIG. 33.

The external electrodes can be formed by metal spraying with brass or the like. Furthermore, the external electrodes can be constituted of a plurality of layers. For example, an underlying layer that is electrically connected to the metal thin film layer of the element layer is formed by metal spraying, and another layer can be provided thereon by metal spraying, plating, coating or the like. More specifically, a metal having good adhesion strength with the layered product can be selected to form the underlying layer, and a metal having good adhesiveness with various metals or resin that is to be contacted (deposited) thereon can be selected to form the upper layer.

Furthermore, melt solder plating, melt tinning, electroless solder plating or the like can be performed for a soldering property at the time of mounting. In this case, as an underlying layer, the following layer can be formed: a layer obtained by applying a conductive paste where copper powder or the like has been dispersed in a thermosetting phenol resin and heating for curing; or a layer obtained by spraying a metal such as an alloy comprising copper/phosphorus/silver.

Furthermore, a bump electrode can be provided in the external electrode to facilitate the mounting onto a circuit board further. The bump electrode can be formed by selecting a material suitably from known materials or shapes.

Furthermore, a necessary outer package can be provided depending on the application. For example, a coating about several tens of angstroms thick is provided using a surface treatment agent such as a silane coupling agent for the purpose of improving the resistance against humidity of the layered product or protecting exposed metal thin film layers and/or metal layers. Alternatively, a layer obtained by applying a photocurable or thermosetting resin to a thickness of about several hundreds $\mu$m and curing the resin can be provided.

The thus obtained layered product of the present invention can be used as a chip capacitor, a chip coil, a chip resistor, and a composite element including these, and used suitably as an electronic component such as a capacitor. In particular, the layered product of the present invention can be a capacitor having high capacitance, although it is small. Therefore, when it is used as a chip capacitor, the practical value is high.

(Production Method)

Next, a method for producing the layered product of the present invention will be described.

Figure 34:
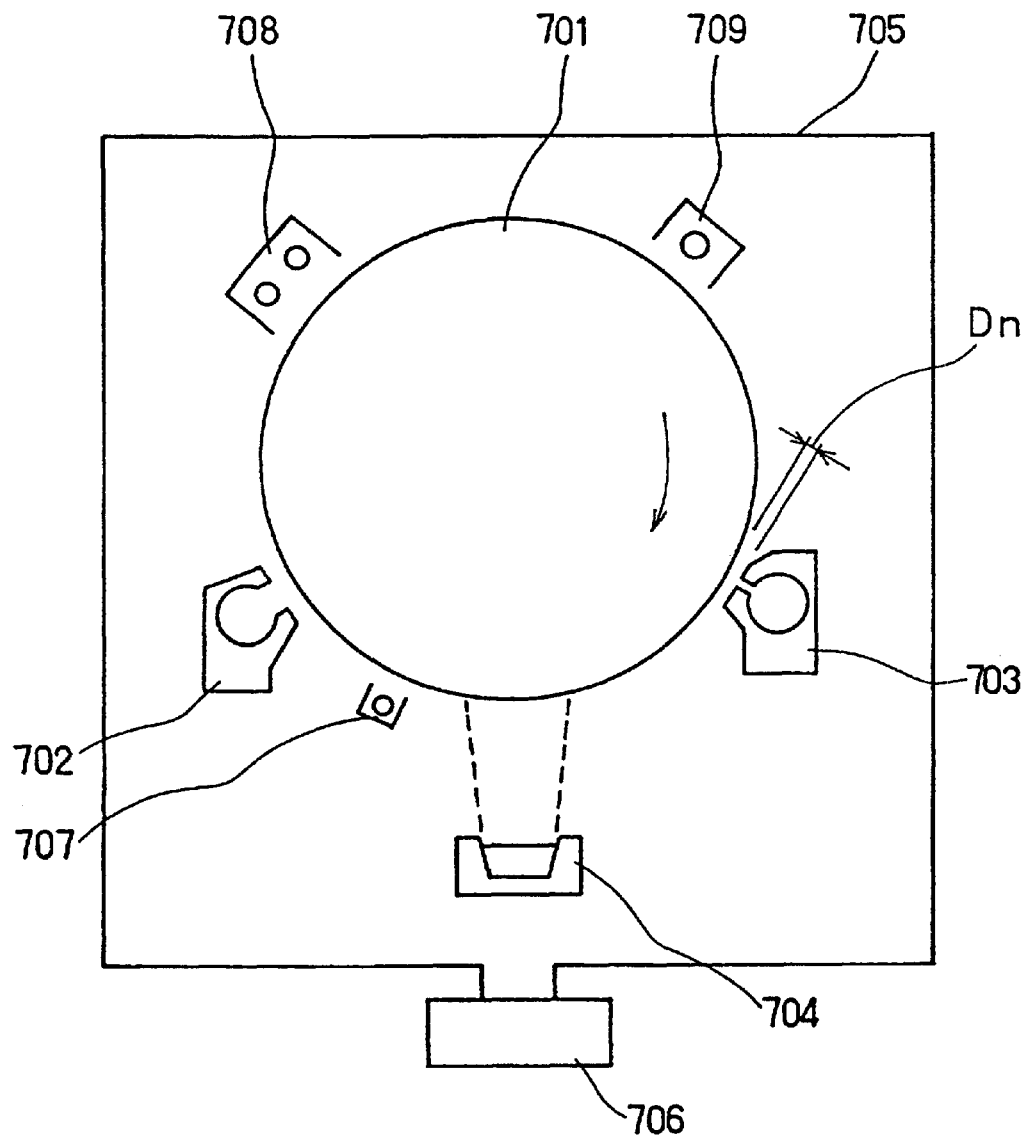
FIG. 34 is a schematic view illustrating an example of a production apparatus for producing the layered product of the second invention.

FIG. 34 is a schematic view illustrating an example of a production apparatus for producing the layered product of the present invention.

A metal evaporation source 704 is provided at a lower portion of a can roller 701, which rotates in the direction of the arrow in FIG. 34 with constant angular velocity or constant circumferential velocity. A resin evaporation source 702 is provided downstream in the rotation direction of the can roller 701, and an apparatus 703 for applying patterning material is provided upstream thereof.

In this example, an apparatus 707 for removing patterning material is provided between the metal evaporation source 704 and the resin evaporation source 702, and an apparatus 708 for curing resin and an apparatus 709 for treating a resin surface are provided between the resin evaporation source 702 and the apparatus 703 for applying patterning material. However, these apparatuses can be provided, if necessary.

The apparatuses are installed inside a vacuum container 705, wherein a vacuum is maintained with a vacuum pump 706.

The circumferential surface of the can roller 701 is smooth, preferably mirror-finished, and cooled preferably to −20° C. to 40° C., more preferably −10° C. to 10° C. The rotation velocity can be adjusted freely, but preferably about 15 to 70 rpm.

The metal evaporation source 704 allows metal evaporation toward the surface of the can roller 701 to form the metal thin film layer of the element layer and the metal layer of the reinforcement layer. As the evaporation metal, for example, at least one selected from the group consisting of Al, Cu, Zn, Sn, Au, Ag, and Pt can be used. Instead of evaporation, the metal thin film can be formed by a known technique such as sputtering, ion plating or the like.

The resin evaporation source 702 allows a reactive monomer resin to evaporate and vaporize toward the surface of the can roller 701. The resin is deposited so as to form the dielectric layer of the element layer, the resin layer of the reinforcement layer and the protective layer.

If necessary, the deposited reactive monomer resin can be polymerized and/or cross-linked with the apparatus 708 for curing resin and cured to a predetermined curing degree. As the apparatus for curing resin, an electron beam irradiation device or a UV beam irradiation device can be used, for example.

If necessary, the surface of the formed resin thin film is treated with the apparatus 709 for treating a resin surface. For example, the surface of the resin layer can be activated with an oxygen plasma to increase the adhesiveness with the metal thin film.

The apparatus 703 for applying patterning material deposits a patterning material on the surface of the resin thin film in a belt-shape. At the portions where the patterning material has been deposited, no metal thin film is formed, so that these portions become the electrically insulating portions of the element layer and the electrically insulating bands of the reinforcement layer. As the patterning material, for example, oil can be used. To apply the patterning material, evaporated and vaporized patterning material can be ejected from a nozzle and condensed on the surface of the resin thin film, or liquid patterning material can be ejected. Besides these examples of contactless application methods, other application methods such as reverse coating or die coating are possible, but for the present invention, contactless application methods are preferable because no external pressure is applied to the resin surface. Especially, a method of condensing the evaporated patterning material on the surface of the resin thin film is preferable because the structure is relatively simple.

Figure 35:
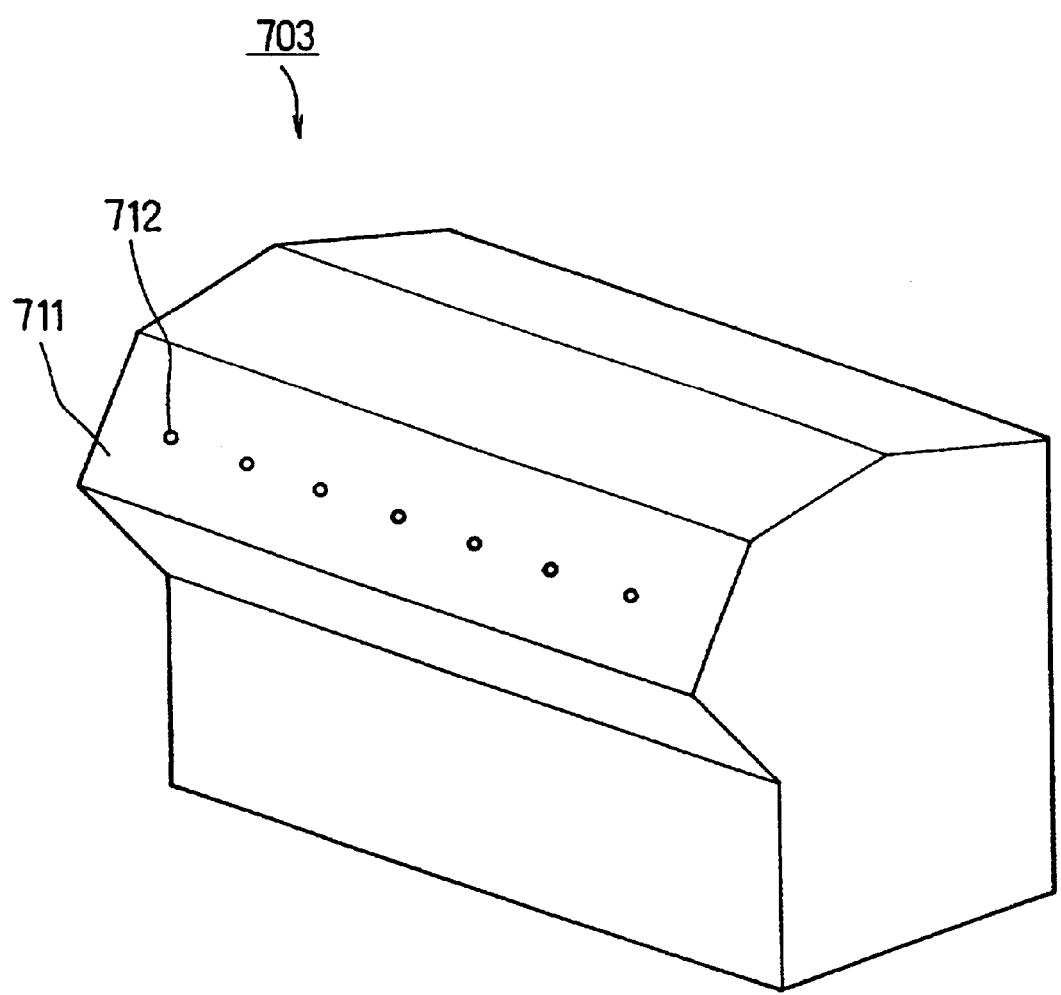
FIG. 35 is a schematic perspective view of an apparatus for applying patterning material.

FIG. 35 is a schematic perspective view of an apparatus for applying patterning material that applies a belt-shaped oil film on a surface of a resin thin film by ejecting evaporated oil as an example of the apparatus for applying patterning material. The apparatus is provided in such a manner that a plane 711 of the apparatus 703 for applying patterning material is perpendicular to the normal line of the circumferential surface of the can roller 701. On the plane 711, a predetermined number of nozzles 712 for ejecting vaporized oil are arranged at predetermined intervals. The shape of the nozzle 712 can be round, as shown in FIG. 35, but elliptical, elongated, rectangular or other shapes are also possible. Alternatively, a plurality of elliptical, elongated or rectangular nozzles can be arranged in the travel direction of the surface of the can roller.

The patterning material applied with the apparatus 703 for applying patterning material can be removed by an apparatus 707 for removing patterning material, if necessary. There is no particular limitation regarding how the patterning material is removed. However, for example, when oil is used as the patterning material, the patterning material can be removed by heat evaporation by a heater, or decomposition by plasma irradiation, or a combination thereof. In this case, oxygen plasma, argon plasma, nitrogen plasma, or the like can be used for the plasma irradiation, but among these, oxygen plasma is most preferable.

In the layered product of the present invention, rotating the can roller 701 forms the protective layer, the reinforcement layer, the element layer, the reinforcement layer and the protective layer on the circumferential surface thereof in this order.

In order to form the element layer as shown in FIGS. 22, 24, 25 and 27, it is required to move the deposition position of the patterning material by a predetermined distance in the direction perpendicular to the travel direction of the circumferential surface of the can roller 701 for the purpose of changing the position of the electrically insulating portion, every time one deposition unit comprising the dielectric layer and the metal thin film layer is deposited. Similarly, in order to form the reinforcement layer as shown in FIGS. 29, 31 and 32, it is required to move the deposition position of the patterning material by a predetermined distance in the direction perpendicular to the travel direction of the circumferential surface of the can roller 701 for the purpose of changing the position of the electrically insulating band, every time one deposition unit comprising the resin layer and the metal layer is deposited.

Furthermore, in the process of producing the layered product, since the deposition thickness becomes larger as the deposition units are deposited sequentially, it is preferable to retract the apparatus 703 for applying patterning material as the deposition progresses, not only in the case where the patterning material is directly applied by coating or the like, but also in the case where deposition is performed by a contactless method. In other words, in FIG. 34, it is preferable to deposit layers while constantly maintaining a distance Dn between the circumferential surface of the layered product that is being formed on the can roller 701 and the end of the nozzles of the apparatus for applying patterning material at a predetermined interval. This is because the patterning material diffuses with a certain directivity especially when vaporized oil is ejected for deposition, so that a variation of the distance Dn changes the deposition width, whereby the electrically insulating portion having a predetermined width cannot be obtained stably.

Figure 36:
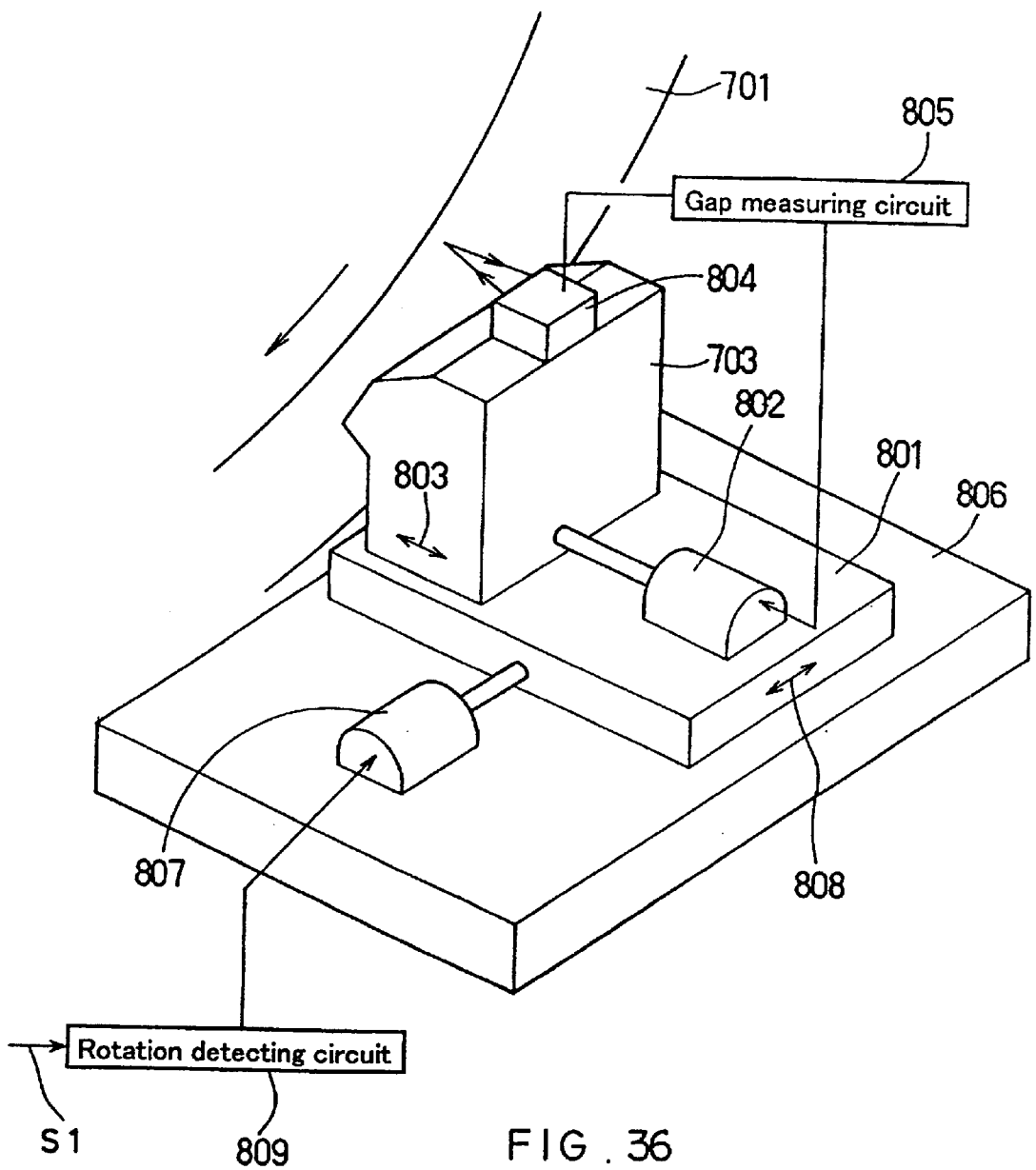
FIG. 36 is a schematic view illustrating a device for retracting the apparatus for applying patterning material and moving the application position of the patterning material.

The retraction of the apparatus for applying patterning material and the movement of the deposition position of the patterning material can be performed, for example by an apparatus as shown in FIG. 36.

First, the apparatus for applying patterning material is retracted in the following manner. An actuator A 802 is fixed on a movable base 801. The apparatus 703 for applying patterning material is attached to the mobile end of the actuator A 802. The actuator A 802 can move the apparatus 703 for applying patterning material in the direction of arrow 803 on the movable base 801. A gap measuring device 804 for measuring the distance to the surface of the can roller 701 (the circumferential surface of the layered product in the process of the formation of the layered product) is provided on the apparatus 703 for applying patterning material. A contactless measuring device, for example a measuring device using a laser, can be used for the gap measuring device 804. During the manufacturing of the layered product, the gap measuring device 804 keeps measuring the distance to the circumferential surface of the layered product on the surface of the can roller 701, and a signal corresponding to this measurement is sent to a gap measuring circuit 805. The gap measuring circuit 805 continuously checks whether the distance between the nozzle end of the apparatus 703 for applying patterning material and the surface of the can roller 701 (the circumferential surface of the layered product during the formation of layers) is within a predetermined range. When the deposition progresses and the gap measuring circuit 805 determines that this distance is smaller than the predetermined range, it instructs the actuator A 802 to retract the apparatus 703 for applying patterning material a predetermined distance, and based on this instruction, the apparatus 703 for applying patterning material is retracted a predetermined distance. Thus, the distance Dn between the nozzle end of the apparatus 703 for applying patterning material and the circumferential surface of the layered product on the can roller 701 always can be kept within a constant interval while the deposition progresses.

As an alternative to the control using the gap measuring device 804 and the gap measuring circuit 805 as described above, the apparatus for applying patterning material also can be retracted for a preset length based on the layering thickness, in accordance with the number of rotations of the can roller 701. Moreover, the distance measurement with the gap measuring device 804 described above can be used in this configuration for verification.

Next, the position where the patterning material is applied can be changed in the following manner. An actuator B 807 is attached to a support base 806. The movable base 801 is attached to the mobile end of the actuator B 807. The actuator B 807 can move the movable base 801 on the support base 806 in the direction indicated by arrow 808. The rotation of the can roller 701 is observed by a rotation detector (not shown in the drawing), which sends a rotation signal S1 to a rotation detecting circuit 809 whenever the can roller 701 has rotated one turn. When the rotation detecting circuit 809 has counted a predetermined number of detections of the rotation signal S1 (for example one detection), it instructs the actuator B 807 to move the movable base 801 for a predetermined distance in a predetermined direction as indicated by arrow 808. Thereby, the movable base 801, and thus the apparatus 703 for applying patterning material, is moved a predetermined distance in a predetermined direction as indicated by arrow 808. Thus, the position where patterning material is applied can be changed for every predetermined number of rotations of the can roller 701 for a predetermined distance in a direction that is perpendicular to the rotation and travel direction of the surface of the can roller 701.

In this manner, the reinforcement layer and the element layer are formed on the circumferential surface of the can roller 701. The reinforcement layer comprises a plurality of deposition units, each of which comprises the resin layer and the metal layer deposited in a portion except the belt-shaped electrically insulating band, and the element layer comprises a plurality of deposition units, each of which comprises the dielectric layer and the metal thin film layer deposited in a portion except the belt-shaped electrically insulating portion. In order to form the protective layer, before and after the formation of the reinforcement layer, only resin can be deposited with the resin evaporation source 702 by rotating the can roller 701 until a predetermined thickness is formed while providing shielding plates or the like to prevent the metal evaporation source 704 and the apparatus 703 for applying patterning material from functioning.

Thus, a cylindrical continuous product of the layered product of the present invention is formed on the circumferential surface of the can roller 701. This is divided in the radial direction (e.g., into 8 sections by every 45°) and removed from the can roller 701. The sections are pressed under heat and pressure, and flat layered base elements are obtained.

Figure 37:
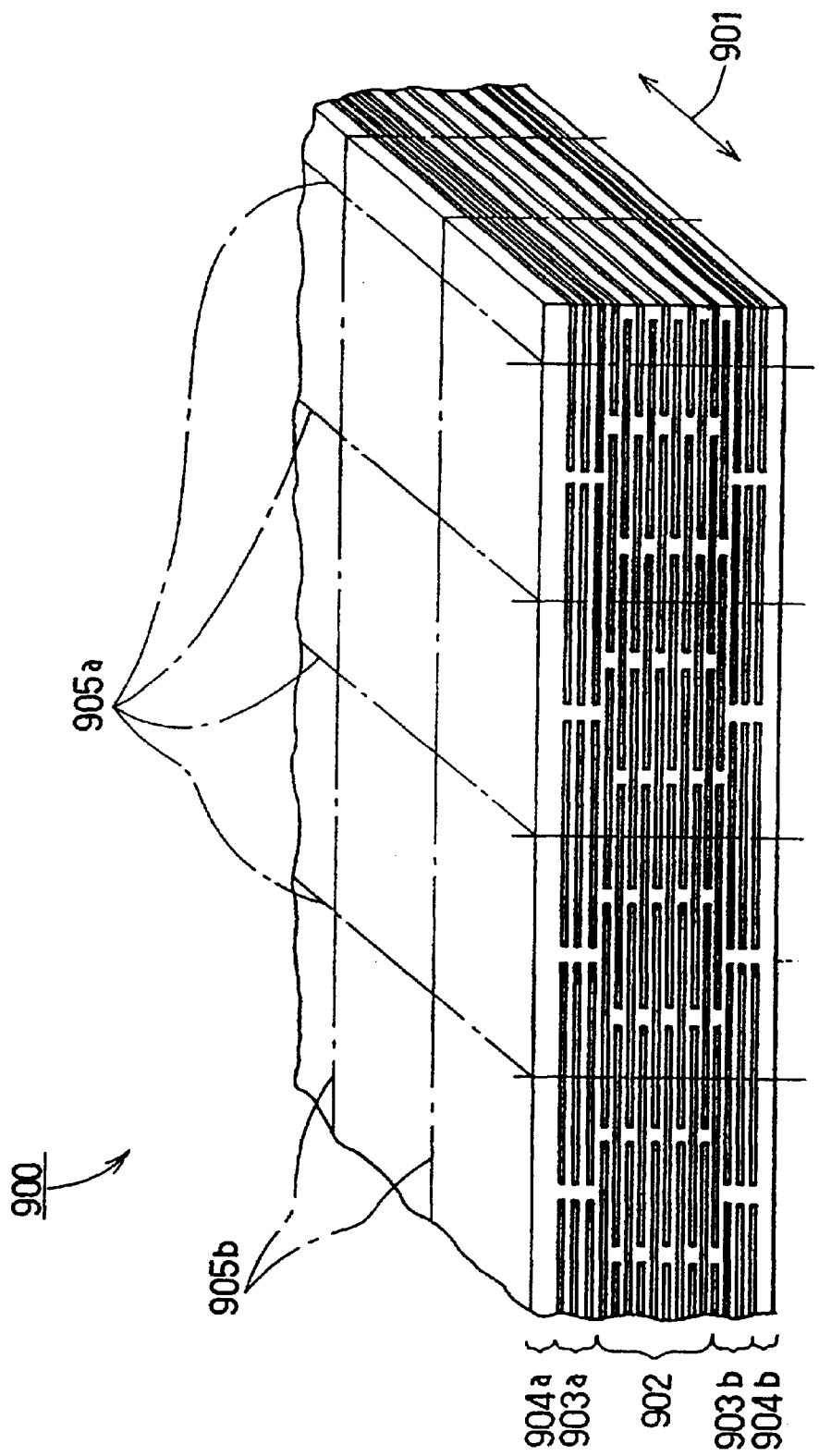
FIG. 37 is a partial perspective view illustrating an example of the structure of a flat layered base element.

FIG. 37 is a partial perspective view illustrating an example of the outline of the structure of the flat layered base element obtained in the above-described manner. In FIG. 37, arrow 901 indicates the travel direction (circumferential direction) on the can roller 701.

The layered base element 900 in FIG. 37 includes a protective layer 904b, a reinforcement layer 903b, an element layer 902, a reinforcement layer 903a and a protective layer 904a, which are deposited on the can roller 701 in this order.

Thereafter, the layered base element is cut along cutting planes 905a and 905b so that the layered product of the present invention is obtained. In this example, the first layered product (FIG. 20) where the element layer has the structure in FIG. 22 and the reinforcement layer has the structure in FIG. 28 can be obtained.

A layered product comprising various kinds of element layers or reinforcement layers can be obtained by suitably changing the position on which patterning material is applied and the positions of the cutting planes 905a.

The method described above can provide the layered product of the present invention efficiently and inexpensively in a simple method.

Hereinafter, the second invention will be described by way of examples more specifically.

EXAMPLE 6

The first layered product of the present invention as shown in FIG. 20 comprising "a protective layer/a reinforcement layer/an element layer/a reinforcement layer/a protective layer" was produced.

The production method thereof is as follows.

The layered product was produced using the apparatus shown in FIG. 34. A vacuum container 705 was evacuated to $2 \times 10^{-4}$ Torr, and the circumferential surface of the can roller 701 was maintained at 5° C.

First, a portion that is to serve as a protective layer was deposited on the circumferential surface of the can roller 701. Dicyclopentadiene dimethanol diacrylate was used as the material of the protective layer, and evaporated so as to be deposited on the circumferential surface of the can roller 701 with the resin evaporation source 702. Then, a UV curing device was used as the apparatus 708 for curing resin to polymerize and cure the protective layer material deposited in the above-described manner. This operation was repeated by rotating the can roller 701 so that the protective layer having a thickness of 15 µm was formed on the circumferential surface of the can roller 701.

Then, a portion that is to serve as a reinforcement layer was deposited. The same material as that for the protective layer was used as the resin layer material, and evaporated so as to be deposited on the protective layer with the resin evaporation source 702. Then, a UV curing device was used as the apparatus 708 for curing resin to polymerize and cure the resin layer material deposited in the above-described manner. The thickness of the thus formed resin layer was 0.4 µm. Thereafter, the surface was treated with oxygen plasma with the apparatus 709 for treating resin surface. Next, a pattering material was applied in a portion corresponding to the electrically insulating band with the apparatus 703 for applying pattering material. A fluorocarbon oil was used as the pattering material, and evaporated and ejected from a nozzle having a diameter of 50 µm so as to be deposited in the form of a belt having a width of 150 µm. Then, aluminum was deposited with the metal evaporation source 704. The deposition thickness was 300 Å, and the film resistance was 3Ω/□. Thereafter, the residual patterning material was removed by heating with a far infrared radiation heater and a plasma discharge treatment using the apparatus 707 for removing patterning material. This operation was repeated 500 times by rotating the can roller 701 so that the reinforcement layer having a total thickness of 215 µm was formed. The movement of the apparatus for applying patterning material in the direction perpendicular to the travel direction of the circumferential surface of the can roller 701 (the direction indicated by arrow 808 in FIG. 36) was performed with the device shown in FIG. 36 in the following pattern. When the can roller 701 had rotated one turn, the apparatus moved 60 µm in a first direction. Then, the apparatus was shifted 60 µm in the same first direction after the next rotation; it was shifted 60 µm in a second direction opposite to the first direction after the next rotation; and then it was shifted 60 µm in the same second direction after the next rotation. These shifts constituted one cycle, which was repeated thereafter. The distance Dn between the nozzle 712 of the apparatus for applying patterning material and the adherence surface was controlled to be maintained constantly at 250 to 300 µm. Thus, the reinforcement layer portion as shown in FIG. 29 was obtained.

Next, the element layer portion comprising dielectric layers and metal thin film layers was deposited. The same material as that for the protective layer and the resin layer was used as the dielectric layer material, and evaporated so as to be deposited on the reinforcement layer. Then, a UV curing device was used as the apparatus 708 for curing resin to polymerize and cure the dielectric layer material deposited in the above-described manner. The thickness of the thus formed dielectric layer was 0.4 µm. Thereafter, the surface was treated with oxygen plasma with the apparatus 709 for treating resin surface. Next, a pattering material was applied in a portion corresponding to the electrically insulating portion with the apparatus 703 for applying pattering material. A fluorocarbon oil was used as the pattering material, and evaporated and ejected from a nozzle having a diameter of 50 µm so as to be deposited in the form of a belt having a width of 150 µm. Then, aluminum was deposited with the metal evaporation source 704. The deposition thickness was 300 Å, and the film resistance was 3Ω/□. Thereafter, the residual patterning material was removed by heating with a far infrared radiation heater and a plasma discharge treatment using the apparatus 707 for removing patterning material. This operation was repeated 2000 times by rotating the can roller 701 so that the layered product portion having a total thickness of 860 µm was formed. The movement of the apparatus for applying patterning material in the direction perpendicular to the travel direction of the circumferential surface of the can roller 701 (the direction indicated by arrow 808 in FIG. 36) was performed with the device shown in FIG. 36 in the following pattern. When the can roller 701 had rotated one turn, the apparatus was shifted 1000 μm in a first direction; and after the next rotation, the apparatus was shifted 940 μm in a second direction opposite to the first direction; after the next rotation, it was shifted 1000 μm in the first direction; after the next rotation, it was shifted 940 μm in the second direction; after the next rotation, it was shifted 1000 μm in the first direction; after the next rotation, it was shifted 1060 μm in the second direction; after the next rotation, it was shifted 1000 μm in the first direction; and after the next rotation, it was shifted 1060 μm in the second direction. These shifts constituted one cycle, which was repeated thereafter. The distance Dn between the nozzles 712 of the apparatus for applying patterning material and the adherence surface was controlled to be maintained constantly at 250 to 300 μm. Thus, the element layer portion as shown in FIG. 24 was obtained.

Next, a reinforcement layer portion having a thickness of 215 μm was formed on a surface of the element layer portion. The method thereof was exactly the same as the method for the reinforcement layer as described above.

Finally, a protective layer portion having a thickness of 15 μm was formed on a surface of the reinforcement layer. The method thereof was exactly the same as the method for the protective layer as described above.

Then, the obtained cylindrical layered product was cut into 8 sections in the radial direction (separated by 45°) and removed. The sections were pressed under heat, and flat layered base elements as shown in FIG. 37 were obtained (however, in reality, the deposition positions of the electrically insulating portions of the element layer portion and the electrically insulating band of the reinforcement layer portion are slightly displaced, as shown in FIGS. 24 and 29). The flat layered base elements were cut along the cutting planes 905*a*, and the cutting planes were metallized with brass so as to form external electrodes. An electrically conducting paste where copper powder had been dispersed in a thermosetting phenol resin was applied to the metallized surface, heat-cured, and the resulting resin surface was plated with molten solder. After that, the pieces were cut along the cutting planes 905*b* in FIG. 37, and immersed in a silane coupling agent to coat the circumferential surface, whereby chip capacitors were obtained.

The width of the electrically insulating portion of the element layer was 150 μm, and the displacement amount din the deposition position of the electrically insulating portion of every other deposition unit was 60 μm. The width of the electrically insulating band of the reinforcement layer was 150 μm and was positioned substantially in the center in the width direction, and the displacement amount d1 between the deposition positions of the electrically insulating bands of adjacent deposition units was 60 μm.

The obtained chip capacitor had a thickness in the deposition direction of 1.3 mm, a depth of 1.6 mm and a width (in the direction between the opposite external electrodes) of 3.2 mm, which was small, and yet the capacitance was 0.47 μF. The withstand voltage was 50V. Furthermore, roughness was not substantially observed on the upper and lower surfaces in the deposition direction. This was mounted onto a printed circuit board with a solder. There was no problems such as the external electrodes falling off. When the obtained chip capacitor was dismantled, and the surface roughnesses Ra of the surface of the dielectric layer and the surface of the metal thin film layer were measured, the results were 0.0051 μm and 0.005 μm, respectively. The curing degrees of the dielectric layer, the resin layer and the protective layer were 95%, 95% and 90%, respectively.

EXAMPLE 7

The first layered product of the present invention as shown in FIG. 20 comprising "a protective layer/a reinforcement layer/an element layer/a reinforcement layer/a protective layer" was produced in the same manner in Example 6.

However, the deposition conditions of the patterning material of the reinforcement layer and the element layer were changed as follows.

The diameter of the nozzle of the apparatus for applying patterning material was changed to 75 μm, and the patterning material was deposited in a belt shape having a width of 200 μm. The movement of the apparatus for applying patterning material in the direction perpendicular to the travel direction of the circumferential surface of the can roller 701 (the direction indicated by arrow 808 in FIG. 36) was performed with the device shown in FIG. 36 in the following pattern.

For the reinforcement layer portion, the apparatus was shifted 60 μm in a first direction after one rotation of the can roller 701; after the next rotation, it was shifted 60 μm in the same first direction; after the next rotation, it was shifted 60 μm in a second direction opposite to the first direction; and after the next rotation, it was shifted 60 μm in the same second direction. These shifts constituted one cycle, which was repeated thereafter. Thus, the reinforcement layer portion as shown in FIG. 31 was obtained.

For the element layer portion, the apparatus was shifted 1000 μm in a first direction after one rotation of the can roller 701; after the next rotation, it was shifted 940 μm in a second direction opposite to the first direction; after the next rotation, it was shifted 1000 μm in the first direction; after the next rotation, it was shifted 940 μm in the second direction; after the next rotation, it was shifted 1000 μm in the first direction; after the next rotation, it was shifted 1060 μm in the second direction; after the next rotation, it was shifted 1000 μm in the first direction; and after the next rotation, it was shifted 1060 μm in the second direction. These shifts constituted one cycle, which was repeated thereafter. Thus, the element layer portion as shown in FIG. 27 was obtained.

Figure 38:
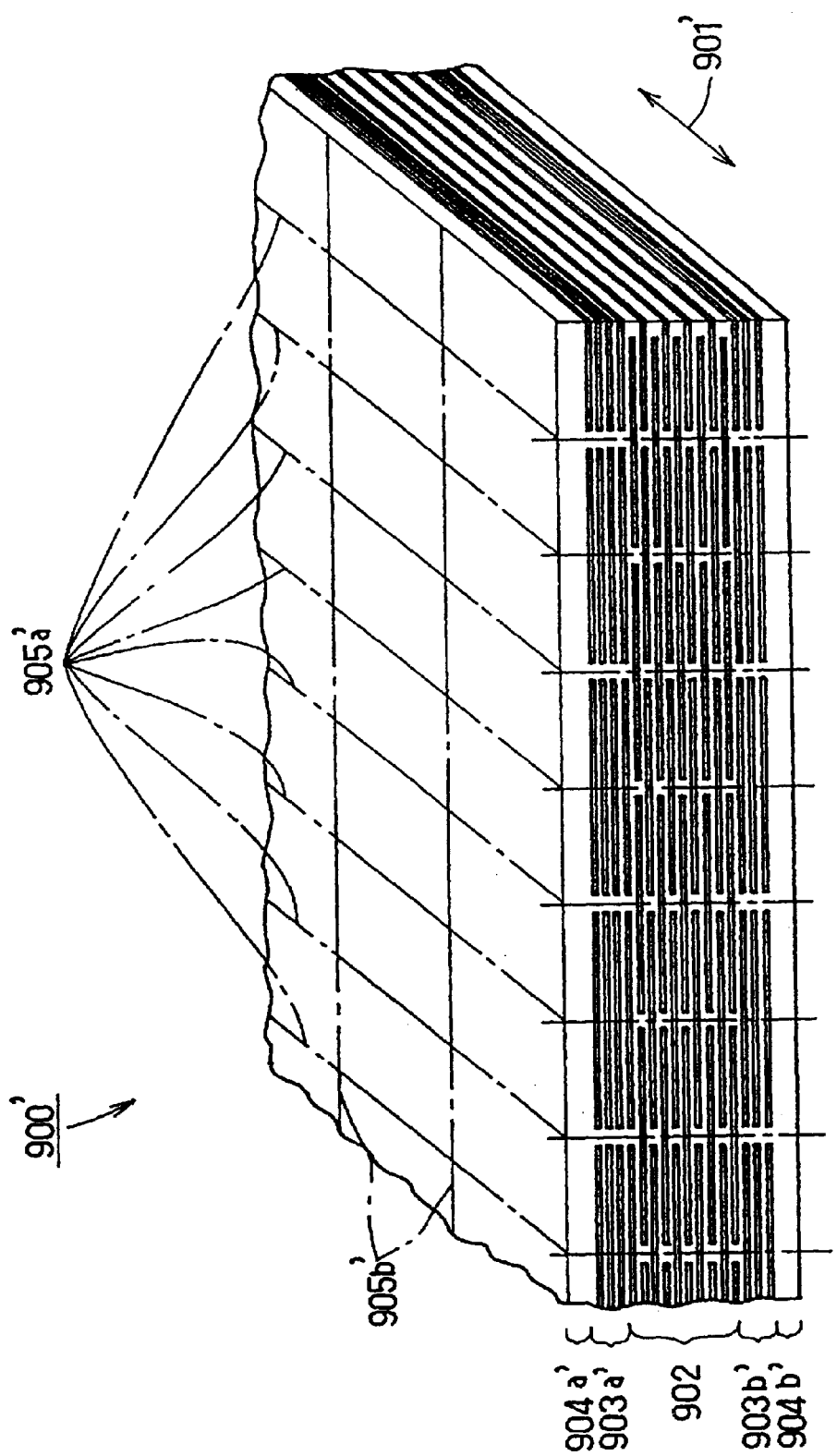
FIG. 38 is a partial perspective view illustrating another example of the structure of a flat layered base element.

Thereafter, flat layered base elements 900' as shown in FIG. 38 were obtained in the same manner as in Example 6. The direction of arrow 901' indicates the travel direction (circumferential direction) on the can roller 701. In the obtained layered base element, a protective layer 904*b'*, a reinforcement layer 903*b'*, an element layer 902', a reinforcement layer 903*a'*, and a protective layer 904*a'* are deposited in this order (however, in reality, the deposition positions of the electrically insulating portions of the element layer portion and the electrically insulating band of the reinforcement layer portion are slightly displaced, as shown in FIGS. 27 and 31). The flat layered base elements were cut along the cutting planes 905*a'*, and the cutting planes were metallized with brass so as to form external electrodes. An electrically conducting paste where copper powder had been dispersed in a thermosetting phenol resin was applied to the metallized surface, heat-cured, and the resulting resin surface was plated with molten solder. After that, the pieces were cut along the cutting planes 906*b'* in FIG. 38, and immersed in a silane coupling agent to coat the circumferential surface, whereby chip capacitors were obtained.

The average width of the electrically insulating portion of the element layer was 140 μm, and the largest width thereof was 200 μm and the smallest width was 80 μm.

The obtained chip capacitor had a thickness in the deposition direction of 1.5 mm, a depth of 1.6 mm and a width (in the direction between the opposite external electrodes) of 3.2 mm, which was small, and yet the capacitance was 0.47 µF. The withstand voltage was 50V. Furthermore, roughness was not substantially observed on the upper and lower surfaces in the deposition direction. This was mounted onto a printed circuit board with a solder. There was no problems such as the external electrodes falling off. Although the number of the metal thin film layers and the metal layers that are connected to the external electrodes is significantly smaller than that of Example 6, sufficient adhesion strength was obtained. This is believed to be because the interval between the metal thin film layers of the element layer is wide so that the sprayed metal particles can penetrate sufficiently between the metal thin film layers. When the obtained chip capacitor was dismantled, and the surface roughnesses Ra of the surface of the dielectric layer and the surface of the metal thin film layer were measured, the results were 0.005 µm and 0.005 µm, respectively. The curing degrees of the dielectric layer, the resin layer and the protective layer were 95%, 95% and 90%, respectively.

COMPARATIVE EXAMPLE 2

A chip capacitor using the layered product as shown in FIG. 21 was obtained in the same manner as in Example 6 except that the protective layer was not formed.

The obtained chip capacitor had a thickness in the deposition direction of 0.97 mm (this is thinner than in Example 6, because the protective layer was not formed), a depth of 1.6 mm and a width (in the direction between the opposite external electrodes) of 3.2 mm, which was small, and yet the capacitance was 0.40 µF. The withstand voltage was 35V. None of them were better than those in Example 6. This is believed to be because the layered product was damaged by thermal load or external pressure in the production process of the layered product. Roughness was not substantially observed on the upper and lower surfaces in the deposition direction. When this was mounted onto a printed circuit board with a solder, the external electrodes were missing in some chip capacitors. When the obtained chip capacitor was dismantled, and the surface roughnesses Ra of the surface of the dielectric layer and the surface of the metal thin film layer were measured, the results were 0.005 µm and 0.005 µm, respectively. The curing degrees of the dielectric layer and the resin layer were 95% and 95%, respectively.

EXAMPLE 8

A chip capacitor using the second layered product of the present invention (FIG. 21) was obtained in the same manner as in Comparative Example 2 except that the thicknesses of the resin layer and the metal layer of the reinforcement layer were made larger by adjusting the rotational speed of the can roller. The thickness of the resin layer of the reinforcement layer was 0.6 µm, the deposition thickness of the metal layer was 500 Å, and the film resistance was 2Ω/□. The number of depositions was the same as that of Comparative Example 2.

The obtained chip capacitor had a thickness in the deposition direction of 1.8 mm (this is thicker than in Comparative Example 2, because the thickness of each layer of the reinforcement layer is larger), a depth of 1.6 mm and a width (in the direction between the opposite external electrodes) of 3.2 mm, which was small, and yet the capacitance was 0.47 µF. The withstand voltage was 50V. All of them were better than those in Comparative Example 2. This is believed to be because the buffer function of the reinforcement layer served sufficiently against thermal load or external pressure in the production process of the layered product. Roughness was not substantially observed on the upper and lower surfaces in the deposition direction. When this was mounted onto a printed circuit board with a solder, external electrodes falling off or the like was not observed. The reason why the chip capacitor in this example is better than that in Comparative Example 2 is believed to be as follows. A larger thickness of the resin layer of the reinforcement layer facilitates the penetration by the sprayed metal particles of the external electrodes. In addition, a larger thickness of the metal layer enlarges the area of metal layer exposed to the sides so that the contact area with the external electrodes become large. When the obtained chip capacitor was dismantled, and the surface roughnesses Ra of the surface of the dielectric layer and the surface of the metal thin film layer were measured, the results were 0.005 µm and 0.005 µm, respectively. The curing degrees of the dielectric layer and the resin layer were 95% and 95%, respectively.

The embodiments and the examples disclosed in this application are intended to describe the technical idea of the first and second invention and are to be considered as illustrative and not limiting the present first and second inventions. The present invention may be embodied in other forms without departing from the spirit or essential characteristics thereof and the scope of the invention, and all changes which come within the meaning and range of equivalency of the claims are intended to be embraced therein.

Industrial Applicability

Regarding the First Invention

The layered product of the first present invention has good surface properties even if the deposition thickness is small and contains no foreign substance therein. Therefore, the requirements for a high performance thin layered product can be satisfied. Thus, the first present invention can be used in a wide range of applications that require high levels of these requirements, such as a magnetic recording medium such as a magnetic tape, a wrapping material, and an electronic component. In particular, when the present invention can be used suitably as a capacitor, especially as a chip capacitor, compact and high capacitance capacitors having stable qualities can be obtained at low cost. In addition, when the present invention is used to produce a chip coil, a noise filter, a chip resistor or other electronic components, the compactness and high performance of these electronic components can be achieved.

Regarding the Second Invention

The layered product of the second present invention has strong resistance against thermal load and external pressure, and therefore can be used in a wide range of applications that requires high levels of these requirements, such as a magnetic recording medium such as a magnetic tape, a wrapping material, and an electronic component. In particular, since the layered product of the second present invention has high adhesion strength when external electrodes are formed, it can be used suitably as an electronic component. For example, when it is used as a capacitor, especially as a chip capacitor, compact and high capacitance capacitors having good quality can be obtained. In addition, when the present invention is used to produce a chip coil, a noise filter, a chip resistor or other electronic components, the compactness and high performance of these electronic components can be achieved.

What is claimed is:

1. A layered product comprising an element layer, reinforcement layers deposited on both sides of the element layer, and protective layers deposited, further on both sides of the reinforcement layers, wherein the element layer comprises a plurality of deposition units, each deposition unit comprising a dielectric layer, and a metal thin film layer that is deposited on one surface of the dielectric layer, the metal thin film layer being absent from a belt-shaped electrically insulating portion at one end of the surface of the dielectric layer, and is deposited in such a manner that the electrically insulating portions of adjacent deposition units are position on opposite sides; and the reinforcement layer comprise a deposition unit that comprises a resin layer, and a first metal layer and a second metal layer that an deposited on one surface of the resin layer and separated by belt-shaped electrically insulating band; and at least one of the following conditions is satisfied:
a thickness of dielectric layer is different from a thickness of the resin layer;
a thickness of the first and second metal layers is different from a thickness of the metal thin film layer.

2. The layered product according to claim 1, wherein a thickness of at least one of the protective layers is not less than 2 µm.

3. The layered product according to claim 1, wherein a material of the protective layer is different from a material of the dielectric layer.

4. The layered product according to claim 1, wherein a curing degree of the protective layer is 50 to 95%.

5. A layered product comprising an element layer and reinforcement layers deposited on both sides of the element layer,
wherein the element later comprises a plurality of deposition units, each deposition unit comprising a dielectric layer and a metal thin film layer that is deposited on one surface of the dielectric layer, the metal thin film layer being absent from a belt-shaped electrically insulating portion it one end of the surface of the dielectric layer, and is deposited in such a manner that the electrically insulating portions of adjacent deposition units are positioned on opposite sides; and the reinforcement layers comprise a deposition unit that comprises a resin layer, and a first metal layer and a second metal layer that are deposited on one surface of the resin layer and separated by a belt-shaped electrically insulating band; and at least one of the following conditions is satisfied:
a thickness of the dielectric layer is different from a thickness of the resin layer;
a thickness of the first and second metal layers is different from a thickness of the metal thin film layer.

6. The layered product according to claim 1 or 5, wherein widths of electrically insulating portions of every other deposition unit of the element layer are not the same over the element layer.

7. The layered product according to claim 1 or 5, wherein the element layer comprises at least 100 deposition units.

8. The layered product according to claim 1 or 5, wherein a thickness of the dielectric layer is not more than 1 µm.

9. The layered product according to claim 1 or 5, wherein a thickness of the dielectric layer is not more than 0.7 µm.

10. The layered product according to claim 1 or 5, wherein a film resistance of the metal thin film layer is not less than $2\Box/\Omega$.

11. The layered product according to claim 1 or 5, wherein (a thickness of the dielectric layer)/(a thickness of the metal thin film layer)$\leq 20$.

12. The layered product according to claim 1 or 5, wherein a curing degree of the dielectric layer is 50 to 95%.

13. The layered product according to claim 1 or 5, wherein the metal thin film layer comprises aluminum or an oxide thereof.

14. The layered product according to claim 1 or 5, wherein the reinforcement layer comprises a plurality of deposition units.

15. The layered product according to claim 14, wherein deposition positions of the electrically insulating bands are not the same over the reinforcement layer.

16. The layered product according to claim 1 or 5, wherein a thickness of each of the reinforcement layers is not less than 20 µm.

17. The layered product according to claim 1 or 5, wherein the electrically insulating band is provided substantially in a central portion of the layered product.

18. The layered product according to claim 1 or 5, wherein a material of the resin layer is different from a material of the dielectric layer.

19. The layered product according to claim 1 or 5, wherein a curing degree of the resin layer is 50 to 95%.

20. The layered product according to claim 1 or 5, wherein a thickness of the resin layer is larger than a thickness of the dielectric layer.

21. The layered product according to claim 1 or 5, wherein a thickness of the first and second metal layers is larger than a thickness of the metal thin film layer.

22. The layered product according to claim 1 or 5, further comprising external electrodes are formed on opposed sides of the layered product.

23. The layered product according to claim 22, wherein the external electrodes comprise a plurality of layers.

24. The layered product according to claim 23, wherein a layer of the external electrodes is electrically connected to the metal thin film layer, and is formed by metal spraying.

25. The layered product according to claim 21, wherein the external electrodes comprise a bump electrode.

26. The layered product according to claim 1 or 5, further comprising an outer package on an outer surface.

27. A capacitor produced using the layered product according to claim 1 or 5.

28. The capacitor according to claim 27, wherein the capacitor is a chip capacitor.

* * * * *